United States Patent
Li et al.

(10) Patent No.: US 10,631,319 B2
(45) Date of Patent: Apr. 21, 2020

(54) GRANT-LESS UPLINK TRANSMISSION FOR NEW RADIO

(71) Applicant: Convida Wireless, LLC, Wilmington, DE (US)

(72) Inventors: Qing Li, Princeton Junction, NJ (US); Guodong Zhang, Syosset, NY (US); Pascal M. Adjakple, Great Neck, NY (US); Lakshmi R. Iyer, King of Prussia, PA (US); Allan Y. Tsai, Boonton, NJ (US); Qian Zhang, Basking Ridge, NJ (US); Wei Chen, San Diego, CA (US); Joseph M. Murray, Schwenksville, PA (US); Tianyi Xu, San Diego, CA (US)

(73) Assignee: Convida Wireless, LLC, Wilmington, DE (US)

( * ) Notice: Subject to any disclaimer, the term of this patent is extended or adjusted under 35 U.S.C. 154(b) by 0 days.

(21) Appl. No.: 15/624,354

(22) Filed: Jun. 15, 2017

(65) Prior Publication Data
US 2017/0367110 A1 Dec. 21, 2017

Related U.S. Application Data

(60) Provisional application No. 62/350,550, filed on Jun. 15, 2016, provisional application No. 62/373,691, (Continued)

(51) Int. Cl.
*H04W 72/12* (2009.01)
*H04L 1/18* (2006.01)
(Continued)

(52) U.S. Cl.
CPC ....... *H04W 72/1268* (2013.01); *H04L 1/1887* (2013.01); *H04L 5/0007* (2013.01);
(Continued)

(58) Field of Classification Search
None
See application file for complete search history.

(56) References Cited

U.S. PATENT DOCUMENTS 8,902,773 B2 12/2014 Anderson et al.
9,002,979 B2 4/2015 Hansen
(Continued)

FOREIGN PATENT DOCUMENTS

EP 2464076 A2 6/2012
EP 2882110 A1 6/2015
(Continued)

OTHER PUBLICATIONS

3rd Generation Partnership Project (3GPP) TR 22.864 V14.1.0, Technical Specification Group Services and System Aspects, Feasibility Study on New Services and Markets Technology Enablers—Network Operation, Stage 1 (Release 14), Sep. 2016, 35 pages.
(Continued)

*Primary Examiner* — Saumit Shah
(74) *Attorney, Agent, or Firm* — BakerHostetler

(57) ABSTRACT

Current approaches to transmitting uplink data in a network often require resources to be granted. In an example, a node or apparatus may configure a plurality of devices to operate in a grant-less mode in accordance with a respective grant-less access allocation, such that, when the plurality of devices transmit messages uplink in the network, the messages are transmitted using frequency resources defined by the respective grant-less access allocation, and the plurality of devices transmit the messages without being granted access to transmit the messages, so as to operate in the grant-less mode.

19 Claims, 59 Drawing Sheets

Related U.S. Application Data filed on Aug. 11, 2016, provisional application No. 62/399,921, filed on Sep. 26, 2016, provisional application No. 62/401,062, filed on Sep. 28, 2016.

(51) Int. Cl.
  *H04W 74/08* (2009.01)
  *H04W 4/70* (2018.01)
  *H04L 5/00* (2006.01)

(52) U.S. Cl.
  CPC ............ *H04W 4/70* (2018.02); *H04W 74/08* (2013.01); *H04W 74/0816* (2013.01); *H04W 72/1247* (2013.01)

(56) References Cited

U.S. PATENT DOCUMENTS

| | | |
|---|---|---|
| 9,198,181 B2 | 11/2015 | Blankenship et al. |
| 9,338,700 B2 | 5/2016 | Schulist et al. |
| 9,413,451 B2 | 8/2016 | Park et al. |
| 10,306,671 B2 | 5/2019 | Li et al. |
| 2008/0205351 A1 | 8/2008 | Lindoff et al. |
| 2009/0298497 A1 | 12/2009 | Lee |
| 2009/0323607 A1 | 12/2009 | Park et al. |
| 2010/0027466 A1 | 2/2010 | Mustapha |
| 2010/0035611 A1 | 2/2010 | Montojo et al. |
| 2010/0061361 A1 | 3/2010 | Wu |
| 2010/0227611 A1 | 9/2010 | Schmidt et al. |
| 2011/0077013 A1 | 3/2011 | Cho et al. |
| 2011/0222428 A1 | 9/2011 | Charbit et al. |
| 2011/0242997 A1 | 10/2011 | Yin |
| 2012/0009963 A1 | 1/2012 | Kim et al. |
| 2013/0017833 A1 | 1/2013 | Sakamoto et al. |
| 2013/0034071 A1 | 2/2013 | Lee et al. |
| 2013/0155847 A1 | 6/2013 | Li et al. |
| 2013/0225184 A1 | 8/2013 | Liu et al. |
| 2013/0265932 A1 | 10/2013 | Huang et al. |
| 2014/0036806 A1 | 2/2014 | Chen et al. |
| 2014/0086217 A1 | 3/2014 | Park et al. |
| 2014/0204854 A1 | 7/2014 | Freda et al. |
| 2014/0206854 A1 | 7/2014 | Bennett et al. |
| 2014/0223095 A1 | 8/2014 | Storm et al. |
| 2014/0254544 A1 | 9/2014 | Kar et al. |
| 2014/0293901 A1 | 10/2014 | Hegde |
| 2014/0315593 A1 | 10/2014 | Vrzic et al. |
| 2014/0321375 A1 | 10/2014 | Agiwal et al. |
| 2014/0369201 A1 | 12/2014 | Gupta et al. |
| 2015/0103725 A1 | 4/2015 | Sun et al. |
| 2015/0223279 A1 | 8/2015 | Jiao et al. |
| 2015/0234708 A1 | 8/2015 | Storm et al. |
| 2015/0282130 A1 | 10/2015 | Webb et al. |
| 2015/0326484 A1 | 11/2015 | Cao et al. |
| 2015/0327245 A1 | 11/2015 | Zhu et al. |
| 2016/0020877 A1 | 1/2016 | Koutsimanis et al. |
| 2016/0036578 A1 | 2/2016 | Malladi et al. |
| 2016/0073302 A1 | 3/2016 | Yang et al. |
| 2016/0113039 A1 | 4/2016 | Hole et al. |
| 2016/0135153 A1 | 5/2016 | Suzuki et al. |
| 2016/0156397 A1 | 6/2016 | Onggosanusi et al. |
| 2016/0234736 A1 | 8/2016 | Kubota et al. |
| 2016/0234759 A1 | 8/2016 | Kubota et al. |
| 2016/0270102 A1 | 9/2016 | Zeng et al. |
| 2016/0352545 A1 | 12/2016 | Johnson |
| 2016/0353343 A1 | 12/2016 | Rahman et al. |
| 2017/0013598 A1 | 1/2017 | Jung et al. |
| 2017/0034845 A1 | 2/2017 | Liu et al. |
| 2017/0118054 A1 | 4/2017 | Ma et al. |
| 2017/0134913 A1 | 5/2017 | Cui et al. |
| 2017/0164212 A1 | 6/2017 | Opsenica et al. |
| 2017/0164349 A1 | 6/2017 | Zhu et al. |
| 2017/0201980 A1 | 7/2017 | Hakola et al. |
| 2017/0230985 A1 | 8/2017 | Yamada et al. |
| 2017/0273063 A1 | 9/2017 | Kim et al. |
| 2017/0289791 A1 | 10/2017 | Yoo et al. |
| 2017/0290052 A1* | 10/2017 | Zhang ................ H04W 74/004 |
| 2017/0331670 A1 | 11/2017 | Parkvall et al. |
| 2017/0331785 A1 | 11/2017 | Xu et al. |
| 2017/0359731 A1 | 12/2017 | Soldati et al. |
| 2018/0076994 A1 | 3/2018 | Lee et al. |
| 2018/0123763 A1* | 5/2018 | Yu ........................ H04L 1/0061 |
| 2018/0124598 A1 | 5/2018 | Zeng |
| 2018/0139656 A1 | 5/2018 | Xu et al. |
| 2018/0167938 A1 | 6/2018 | Stephenne et al. |
| 2018/0184415 A1 | 6/2018 | Rong et al. |
| 2018/0198504 A1 | 7/2018 | Li et al. |
| 2018/0199361 A1* | 7/2018 | Zhang .................... H04W 74/00 |
| 2018/0220407 A1 | 8/2018 | Xiong et al. |
| 2018/0242304 A1* | 8/2018 | Rong et al. ........ H04W 28/0247 |
| 2018/0287722 A1 | 10/2018 | Takano |
| 2018/0294860 A1 | 10/2018 | Hakola et al. |
| 2018/0338277 A1 | 11/2018 | Byun et al. |
| 2018/0368018 A1 | 12/2018 | Kim et al. |
| 2019/0045340 A1 | 2/2019 | Zhu et al. |
| 2019/0045577 A1 | 2/2019 | Kim et al. |
| 2019/0159107 A1 | 5/2019 | Kim et al. |
| 2019/0190579 A1 | 6/2019 | Wang et al. |
| 2019/0208474 A1 | 7/2019 | Ali et al. |
| 2019/0281623 A1 | 9/2019 | Andgart et al. |

FOREIGN PATENT DOCUMENTS

| | | |
|---|---|---|
| EP | 3051906 A1 | 8/2016 |
| EP | 3082362 A1 | 10/2016 |
| EP | 3101971 A1 | 12/2016 |
| EP | 3420659 A1 | 1/2019 |
| JP | 2010-508789 A | 3/2010 |
| JP | 2010-519838 A | 6/2010 |
| JP | 2016-504798 A | 2/2016 |
| JP | 2016-504851 A | 2/2016 |
| JP | 2016-514416 A | 5/2016 |
| KR | 10-2008-0109535 A | 12/2008 |
| KR | 10-2009-0085640 A | 8/2009 |
| KR | 10-2010-0097625 A | 9/2010 |
| KR | 10-2011-0063565 A | 6/2011 |
| WO | 2007/052753 A1 | 5/2007 |
| WO | 2007/125910 A1 | 11/2007 |
| WO | 2010/001474 A1 | 1/2010 |
| WO | 2014/090200 A1 | 6/2014 |
| WO | 20141/090208 | 6/2014 |
| WO | 2014/135126 A1 | 9/2014 |
| WO | 2015/045658 A1 | 4/2015 |
| WO | 2015/067196 A1 | 5/2015 |
| WO | 2015/080646 A1 | 6/2015 |
| WO | 2015/100533 A1 | 7/2015 |
| WO | 2015/113205 A1 | 8/2015 |
| WO | 20151141982 A1 | 9/2015 |
| WO | 2017/147515 A1 | 8/2017 |

OTHER PUBLICATIONS

3rd Generation Partnership Project (3GPP) TR 22.863 V14.1.0, Technical Specification Group Services and System Aspects, Feasibility Study on New Services and Markets Technology Enablers—Enhanced Mobile Broadband, Stage 1 (Release 14), Sep. 2016, 21 pages.

3rd Generation Partnership Project (3GPP) TR 22.863 V0.3.1, Technical Specification Group Services and System Aspects, Feasibility Study on New Services and Markets Technology Enablers—Enhanced Mobile Broadband; Stage 1 (Release 14), Feb. 2016, 13 pages.

3rd Generation Partnership Project (3GPP) TR 22.862 V14.1.0, Technical Specification Group Services and System Aspects, Feasibility Study on New Services and Markets Technology Enablers for Critical Communications, Stage 1 (Release 14), Sep. 2016, 31 pages.

3rd Generation Partnership Project (3GPP) TR 22.861 V14.1.0, Technical Specification Group Services and Systems Aspects, Feasibility Study on New Services and Markets Technology Enablers for Massive Internet of Things, Stage 1 (Release 14), Sep. 2016, 28 pages.

(56) References Cited

OTHER PUBLICATIONS

3rd Generation Partnership Project (3GPP) SA WG2 Meeting #115 S2-162511 "Common CP functions and dedicate CP function for simultaneous multiple Network Slice (update of solution 1.3)" May 23-27, 2016, 4 pages.
3rd Generation Partnership Project (3GPP) S2-162982 was S2-162717-MDD and Slice Selection in core and RAN V1, 3rd vol. SA WG2, , Nokia et al., no. Nanjing, P.R. China; May 27, 2016, 13 pages.
3rd Generation Partnership Project (3GPP) S2-161324 SA WG2 Meeting #113, Solution to Key Issue on Mobility Framework, Sophia Antipolis, FR, Feb. 23-26, 2016, 3 pages.
3rd Generation Partnership Project (3GPP) S2-161198 SA WG2 Meeting #113AH, Solution for optimized UE sleep state and state transitions, Sophia Antipolis, France, Feb. 23-26, 2016, 3 pages.
3rd Generation Partnership Project (3GPP) S1-161323 TSG-SA WG1 Meeting #74, Editorial cleanup and alignment of eMBB TR22.863, Venice, Italy, May 9-13, 2016, 4 pages.
3rd Generation Partnership Project (3GPP) S1-152395 Revision of S1-152074, ZTE Corporation et al., "Update the network slicing use case in Smarter", ZTE Smarter Update the Network Slicing Use case REV3, vol. SA WG1, No. Belgrade Serbia, Aug. 24, 2015, 3 pages.
3rd Generation Partnership Project (3GPP) RP-161214 TSG RAN Meeting #72, Revision of SI: Study on New Radio Access Technology, NTT DOCOMO, Busan, Korea, Jun. 13-16, 2016, 8 pages.
3rd Generation Partnership Project (3GPP) RP-160540 TSG RAN Meeting #71, New WI proposal: Signalling reduction to enable light connection for LTE, Gothenburg, Sweden, Mar. 7-10, 2016, 7 pages.
3rd Generation Partnership Project (3GPP) RP-160425 TSG RAN Meeting #71, Further enhancements on signaling reduction to enable light connection for LTE, Intel Corporation, Gothenburg, Sweden, Mar. 7-10, 2016, 7 pages.
3rd Generation Partnership Project (3GPP) RP-160301 TSG RAN Meeting #71, Motivation for new WI on Light Connection in LTE, Huawei, HiSilicon, Goteborg, Sweden, Mar. 7-11, 2016, 14 pages.
3rd Generation Partnership Project (3GPP) R2-162571 TSGRAN WG2 Meeting #93bis, Introduction of Virtual Cell, CATT, Dubrovnik, Croatia, Apr. 11-15, 2016, 3 pages.
Sesia et al., "LTE—The UMTS Long Term Evolution", Chapter 9.3.3., LTE—The UMTS Long Term Evolution : from theory to Practice; Jul. 20, 2011, pp. 198-200.
Samsung: "Signaling of Slot Structure", 3GPP Draft; R1-1609127, 3rd Generation Partnership Project (3GPP), Mobile Competence Centre; 650, Route Des Lucioles; F-06921 Sophia Anti Polis Ceo Ex ; France, RAN WG1, No. Lisbon, Portugal; 20161010—20161014 Sep. 30, 2016.
Qualcomm Incorporated: "Frame structure requirements", 3GPP Draft; vol. RAN WG1, No. Nanjing, China; May 14, 2016.
NGMN 5G Initiative White Paper v1.0, Feb. 17, 2015, 125 pages.
International Telecommunication Union (ITU-R), "IMT Vision—Framework and overall objectives of the future development of IMT for 2020 and beyond", Recommendation ITU-R M.2083-0, Sep. 2015, 21 pages.
IEEE P802.11, Wireless LANs, Proposed TGax draft specification, Comment Resolutions on UL MU Operation, Jul. 25, 2016, 27 pages.
Chu, David, "Polyphase Codes With Good Periodic Correlation Properties", IEEE Transactions on Information Theory, Jul. 1972, 531-532.
Budisin S. "Decimation Generator of Zadoff-Chu Sequences", In: Carlet C., Pott A. (eds) Sequences and Their Applications—SETA 2010. SETA 2010. Lecture Notes in Computer Science, vol. 6338. Springer, Berlin, Heidelberg, 2010, 40 pages.
3rd Generation Partnership Project; (3GPP) TSG-RAN WG1 #86bis, R1-1610177, "DL Control Channels Overview", Qualcomm Incorporated, Oct. 10-14, 2016, Lisbon, Portugal, Discussion, Oct. 1, 2016, 6 pages.
3rd Generation Partnership Project; (3GPP) TS 36.331 V13.0.0, Technical Specification Group Radio Access Network; Evolved Universal Terrestrial Radio Access (E-UTRA); Radio Resource Control (RRC); Protocol specification (Release 13), Dec. 2015, 507 pages.
3rd Generation Partnership Project; (3GPP) TS 36.304 V13.0.0, 3rd Generation Partnership Project; Technical Specification Group Radio Access Network; Evolved Universal Terrestrial Radio Access (E-UTRA); User Equipment (UE) Procedures in idle Mode (Release 13), Dec. 2015, 42 pages.
3rd Generation Partnership Project; (3GPP) TS 36.211 V13.1.0, 3rd Generation Partnership Project; Technical Specification Group Radio Access Network; Evolved Universal Terrestrial Radio Access (E-UTRA); Physical Channels and Modulation (Release 13), Mar. 2016, 155 pages.
3rd Generation Partnership Project; (3GPP) TR 38.913 V0.2.0, 3rd Generation Partnership Project; Technical Specification Group Radio Access Network; Study on Scenarios and Requirements for Next Generation Access Technologies; (Release 14), Feb. 2016, 19 pages.
3rd Generation Partnership Project; (3GPP) TR 23.799, "Technical Specification Group Services and System Aspects; Study on Architecture for Next Generation System (Release 14)", vol. SA WG2, No. V0.5.0, Jun. 8, 2016, pp. 1-179.
3rd Generation Partnership Project; (3GPP) TR 22.891 V1.1.0, 3rd Generation Partnership Project; Technical Specification Group Services and System Aspects; Feasibility Study on New Services and Markets Technology Enablers; Stage 1 (Release 14), Nov. 2015, 95 pages.
3rd Generation Partnership Project (3GPP), TSG RAN WG1 Meeting #86, "RAN1 Chairman's Notes", Gothenburg, Sweden, Aug. 22-26, 2016, 105 pages.
3rd Generation Partnership Project (3GPP), TS 36.212 V10.8.0, RAN WG1, Technical Specification Group Radio Access Network; Evolved Universal Terrestrial Radio Access (E-UTRA); Multiplexing and Channel Coding (Release 10), Jun. 17, 2013, pp. 1-79.
3rd Generation Partnership Project (3GPP), RI-165027, vol. RAN WG1, Nokia et al: "Basic frame structure 1 principles for 5G", 3GPP Draft; No. Nanjing, P.R. China; May 23, 2016-May 13, 2016.
3rd Generation Partnership Project (3GPP) TSG-RAN WG2 Meeting #94, R2-163718 "Control Plane functions in NR", Nanjing, China; May 23-27, 2016, 4 pages.
3rd Generation Partnership Project (3GPP) TSG-RAN WG2 Meeting #94 R2-163371, "System Information Signalling Design in NR", May 23-27, 2016, 7 pages.
3rd Generation Partnership Project (3GPP) TSG-RAN WG1#85, R1-165363, Nokia, Alcatel-Lucent Shanghai Bell, Scalability of MIMO Operation Across NR Carrier Frequencies, Nanjing, P.R. China, May 23-27, 2016, 5 pages.
3rd Generation Partnership Project (3GPP) T-RAN WG1#85 R1-165027 "Basic Frame Structure Principles for 5G" May 23-27, 2016, 6 pages.
3rd Generation Partnership Project (3GPP) TSG-RAN WG1 #85, R1-164628, Frame Structure for NR, Ericsson, Nanjing, China, May 23-27, 2016, 3 pages.
3rd Generation Partnership Project (3GPP) TSG RAN WG1 Meeting #86bis R1-1610524, WF on NR RS Definition, Huawei, HiSilicon, Lisbon, Portugal, Oct. 10-14, 2016, Agenda Item: 8.1.4.4, 4 pages.
3rd Generation Partnership Project (3GPP) TSG RAN WG1 Meeting #85, R1-165174, Uplink Multiple Access Schemes for NR, May 23-27, 2016, 4 pages.
3rd Generation Partnership Project (3GPP) TSG RAN WG1 Meeting #85 R1-164871 "Frame structure for new radio interface", May 23-27, 2016, 3 pages.
3rd Generation Partnership Project (3GPP) TSG RAN WG1 Meeting #84bis, R1-162379, Overview of New Radio Access Technology Requirements and Designs, Apr. 11-15, 2016, 4 pages.
3rd Generation Partnership Project (3GPP) TSG RAN WG1 Meeting #84bis R1-162797, "Harq Enhancement for Improved Data Channel Efficiency", Busan, Korea, Apr. 11-15, 2016, 3 pages.
3rd Generation Partnership Project (3GPP) TSG RAN WG1 Meeting #83 R1-157351, Initial Views on Technical Design for NB-IoT, Nov. 15-22, 2015, 3 pages.
3rd Generation Partnership Project (3GPP) TSG RAN WG1 #85, R1-165669, Way Forward on Frame Structure, Qualcomm and etc., Nanjing, China, May 23-27, 2016, Agenda Item 7.1.4, 2 pages.

(56) References Cited

OTHER PUBLICATIONS

3rd Generation Partnership Project (3GPP) TSG RAN WG1 #85, R1-164014, Discussion on RS for Beamformed Access, Samsung, Nanjing, China, May 23-27, 2016, 3 pages.
3rd Generation Partnership Project (3GPP) TSG RAN WG1 #85, R1-164013, Framework for Beamformed Access, Samsung, Nanjing, China, May 23-27, 2016, 4 pages.
3rd Generation Partnership Project (3GPP) TSG RAN WG1 #84bis Meeting, R1-163757, Way Forward on Channel Coding Evaluation for 5G New Radio, Busan, Korea, Apr. 11-15, 2016, Agenda Item 8.1.6.1, 5 pages.
3rd Generation Partnership Project (3GPP) TS 36.321 V13.0.0, Technical Specification Group Radio Access Network, Evolved Universal Terrestrial Radio Access (E-UTRA), Medium Access Control (MAC) protocol specification (Release 13), Dec. 2015, 82 pages.
3rd Generation Partnership Project (3GPP) TS 36.300 V13.3.0, Technical Specification Group Radio Access Network, Evolved Universal Terrestrial Radio Access (E-UTRA) and Evolved Universal Terrestrial Radio Access Network (E-UTRAN), Overall description; Stage 2 (Release 13), Mar. 2016, 295 pages.
3rd Generation Partnership Project (3GPP) TS 36.213 V13.0.0, Technical Specification Group Radio Access Network, Evolved Universal Terrestrial Radio Access (E-UTRA), Physical layer procedures (Release 13), Dec. 2015, 326 pages.
3rd Generation Partnership Project (3GPP) TS 36.133 V14.7.0, Technical Specification Group Radio Access Network, Evolved Universal Terrestrial Radio Access (E-UTRA), Requirements for support of radio resource management (Release 14), Mar. 2018, 2997 pages.
3rd Generation Partnership Project (3GPP) TS 24.302 V135.0, Technical Specification Group Core Network and Terminals, Access to the 3GPP Evolved Packet Core (EPC) via non-3GPP access networks; Stage 3 (Release 13), Mar. 2016, 126 pages.
3rd Generation Partnership Project (3GPP) TS 23.401 V13.6.1, Technical Specification Group Services and System Aspects, General Packet Radio Service (GPRS) enhancements for Evolved Universal Terrestrial Radio Access Network (E-UTRAN) access (Release 13), Mar. 2016, 365 pages.
3rd Generation Partnership Project (3GPP) TS 23.060 V13.6.0, Technical Specification Group Services and System Aspects, General Packet Radio Service (GPRS), Service description, Stage 2 (Release 13), Mar. 2016, 362 pages.
3rd Generation Partnership Project (3GPP) TR 45.820 V13.1.0, Technical Specification Group GSM/EDGE Radio Access Network, Cellular system support for ultra-low complexity and low throughput Internet of Things (CIoT) (Release 13), Nov. 2015, 495 pages.
3rd Generation Partnership Project (3GPP) TR 38.913 V14.3.0, Technical Specification Group Radio Access Network, Study on Scenarios and Requirements for Next Generation Access Technologies, (Release 14), Jun. 2017, 39 pages.
3rd Generation Partnership Project (3GPP) TR 38.801 V0.2.0, Technical Specification Group Radio Access Network, Study on New Radio Access Technology: Radio Access Architecture and Interface (Release 14), Jun. 2016, 20 pages.
3rd Generation Partnership Project (3GPP) TR 36.912 V13.0.0, Technical Specification Group Radio Access Network, Feasibility study for Further Advancements for E-UTRA (LTE-Advanced) (Release 13), Dec. 2015, 273 pages.
3rd Generation Partnership Project (3GPP) TR 36.897 V13.0.0, Technical Specification Group Radio Access Network, Study on Elevation Beamforming/Full-Dimension (FD) Multiple Input Multiple Output (MIMO) for LTE; (Release 13), Jun. 2015, 58 pages.
3rd Generation Partnership Project (3GPP) TR 36.881 V14.0.0, Technical Specification Group Radio Access Network, Evolved Universal Terrestrial Radio Access (E-UTRA), Study on Latency Reduction Techniques for LTE (Release 14), Jun. 2016, 249 pages.
3rd Generation Partnership Project (3GPP) TR 23.720 V13.0.0, Technical Specification Group Services and System Aspects, Study on architecture enhancements for Cellular Internet of Things, (Release 13), Mar. 2016, 94 pages.
3rd Generation Partnership Project (3GPP) TR 22.891 V14.2.0, Technical Specification Group Services and System Aspects, Feasibility Study on New Services and Markets Technology Enablers, Stage 1 (Release 14), Sep. 2016, 95 pages.
3GPP TSG-RAN WG2 Meeting #95 R2-164693, Samsung, "System Information Signalling Design in NR" Aug. 2016, 6 pages.
3GPP TSG-RAN2 meeting #95bis R2-166202, Huawei et al., "Further Discussions of Minimum SI" Oct. 2016, 3 pages.
3GPP TSG-RAN2 Meeting #95bis R2-166203, Huawei et al., "Delivery of "Other SI" in NR", Oct. 2016, 5 pages.
3GPP TSG=RAN WG2 Meeting #95bis, ETSI MCC, "Skeleton report", Oct. 2016, 5 pages.
3rd Generation Partnership Project (3GPP) TSG-RAN WG1 #85, R1-164694, Frame Structure Requirements, Qualcomm, Nanjing, China, May 23-27, 2016, 5 pages.
Qualcomm, 3GPP R1-1612062, TSG-RAN WG1 #87, Control Channel for slot format indicator, Nov. 14-18, 2016 (Year: 2016).
3GPP TSG GERA1 Adhoc #3 GPC150521, Samsung Electronics, "Discussions of Grant-Free Multiple Access in CIoT (Update GPC150512)", Jul. 2015, 9 pages.
3GPP TSG RAN WG1 Meeting #84bis R1-163049, Design Options for Longer Cyclic Prefix for MBSFN Subframes, Apr. 2016, 3 pages.
ETRI, "FS_NEO updated requirement of network slicing", 3GPP TSG-SA WG1 #74 S1-161171, Apr. 29, 2016, URL:http://www.3gpp.org/ftp/tsg_sa/WG1_Serv/TSGS1_74_Venice/docs/SI-161171.zip, 6 pages.
ETRI, "High-level Functional Architecture for the Network Slicing", 3GPPTSG-SA WG2 #114 SZ-161833, Apr. 6, 2016, URL: http://www.3gpp.org/ftp/tsg_sa/WG2_Arch/TSGS2_114_Sophia_Antipolis/Docs/S2-161833.zip, 7 pages.
Huawei, "HiSilicon, UE Slice Association/Overload control Procedure", 3GPP TSG-SA WG2 #115 SZ-162605, May 17, 2016, URL:http://www.3gpp.org/ftp/tsg_sa/WG2_Arch/TSGS2_115_Nanjing_China/Docs/S2-162605.zip, 11 pages.
ITRI, "Updates to Solution 6. 1.3: Introducing Network Instance ID", 3GPP TSG-SAWG2 #115 SZ-162666, May 17, 2016, URL:http://www.3gpp.org/ftp/tsg_sa/WG2_Arch/TSGS2_115_Nanjing_China/Docs/S2-162666.zip>.
Nokia, "Solutions for Network Slice Selection", Alcatel-Lucent Shanghai Bell, 3GPP TSGG-RAN WG3 Meeting #92, R3-161356, China, May 23-27, 2016, 9 pages.
ZTE, "Consideration on RAN architecture impacts of network slicing", 3GPP TSG-RAN WG2 Meeting #93bis, R2-162627, Croatia, Apr. 11-15, 2016, 10 pages.

\* cited by examiner

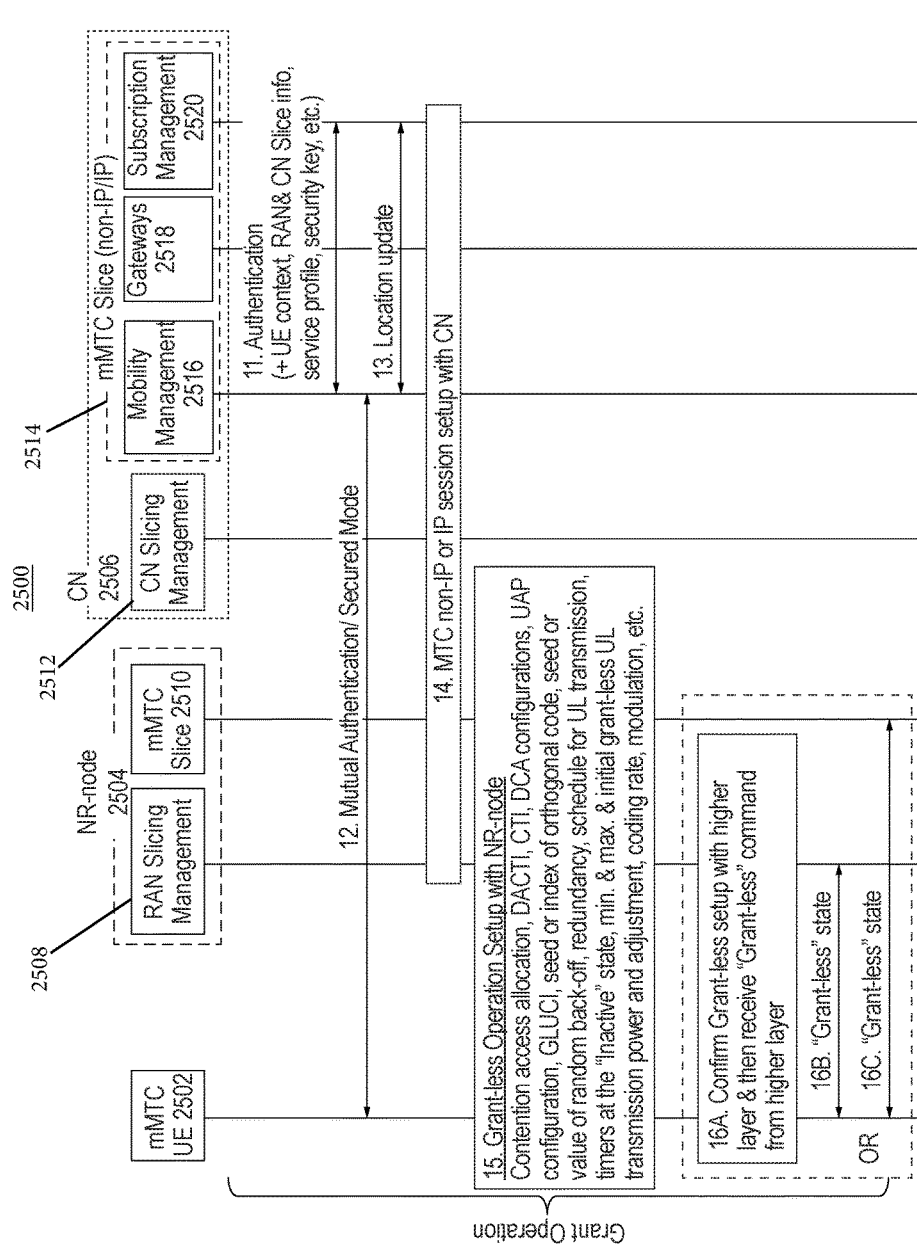

GRANT-LESS UPLINK TRANSMISSION FOR NEW RADIO

CROSS REFERENCE TO RELATED APPLICATIONS

This application claims the benefit of priority to U.S. Provisional Patent Application No. 62/350,550, filed Jun. 15, 2016, U.S. Provisional Patent Application No. 62/373,691 filed Aug. 11, 2016, U.S. Provisional Patent Application No. 62/399,921, filed Sep. 26, 2016, and U.S. Provisional Patent Application No. 62/401,062, filed Sep. 28, 2016, the disclosures of which are incorporated by reference in their entireties.

BACKGROUND

International Mobile Telecommunications (IMT) for 2020 and beyond (e.g., IMT 2020) is envisaged to expand and support diverse families of usage scenarios and applications that will continue beyond the current IMT. Furthermore, a broad variety of capabilities may be tightly coupled with these different usage scenarios. Example families of usage scenarios include enhanced Mobile Broadband (eMBB), Ultra-Reliable and Low Latency Communications (URLLC), massive Machine Type Communications (mMTC), and Network Operations. Example operating characteristics of eMBB may include macro and small cells, 1 ms Latency (air interface), support for high mobility, etc. Example operating characteristics of URLLC may include low to medium data rates (e.g., 50 kbps-10 Mbps), less than 1 ms air interface latency, 99.999% reliability and availability, low connection establishment latency, 0-500 km/h mobility, etc. Example mMTC operating characteristics may include low data date (e.g., 1-100 kbps), high density of devices (e.g., 200,000/km2), varying latency, low power required (e.g., up to 15 years battery autonomy), asynchronous access, etc. Network operations address various subjects such as Network Slicing, Routing, Migration and Interworking, Energy Saving, etc.

With respect to New Radio (NR) requirements, 3GPP TR 38.913 defines scenarios and requirements for New Radio (NR) technologies. Key Performance Indicators (KPIs) for URLLC and mMTC devices are summarized in Table 1 below:

TABLE 1

KPIs for URLLC and mMTC Devices

| Device | KPI | Description | Requirement |
|---|---|---|---|
| URLLC | Control Plane Latency | Control plane latency refers to the time to move from a battery efficient state (e.g., IDLE) to start of continuous data transfer (e.g., ACTIVE). | 10 ms |
| | Data Plane Latency | For URLLC the target for user plane latency for UL and DL. Furthermore, if possible, the latency should also be low enough to support the use of the next generation access technologies as a wireless transport technology that can be used within the next generation access architecture. | 0.5 ms |
| | Reliability | Reliability can be evaluated by the success probability of transmitting X bytes[NOTE1] within 1 ms, which is the time it takes to deliver a small data packet from the radio protocol layer 2/3 SDU ingress point to the radio protocol layer 2/3 SDU egress point of the radio interface, at a certain channel quality (e.g., coverage-edge).<br>[NOTE1]Specific value for X is FFS. | $1\text{-}10^{-5}$ within 1 ms. |
| mMTC | Coverage | "Maximum coupling loss" (MCL) in uplink and downlink between device and Base Station site (antenna connector(s)) for a data rate of [X bps], where the data rate is observed at the egress/ingress point of the radio protocol stack in uplink and downlink. | 164 dB |
| | UE Battery Life | User Equipment (UE) battery life can be evaluated by the battery life of the UE without recharge. For mMTC, UE battery life in extreme coverage shall be based on the activity of mobile originated data transfer consisting of [200 bytes] Uplink (UL) per day followed by [20 bytes] Downlink (DL) from Maximum Coupling Loss (MCL) of [tbd] dB, assuming a stored energy capacity of [5 Wh]. | 15 years |
| | Connection Density | Connection density refers to total number of devices fulfilling specific Quality of Service (QoS) per unit area (per km$^2$). QoS definition should take into account the amount of data or access request generated within a time t_gen that can be sent or received within a given time, t_sendrx, with x % probability. | $10^6$ devices/km$^2$ |

SUMMARY

In accordance with various embodiments, mechanisms for grant-less uplink transmissions are disclosed. In one embodiment, access allocation for grant-less uplink transmission may be static via a device graphical user interface (GUI) or an Open Mobile Alliance (OMA) Device Management (DM) system configuration. In another embodiment, access allocation for grant-less uplink transmission may be semi-static via the system broadcasting/multicasting and unicast or RRC/MAC messages. In yet another embodiment, access allocation may include a dynamic allocation via the downlink control signals or channel. Various mechanisms for grant-less contention based uplink transmissions are disclosed herein. A two-dimensional (e.g., time and frequency) priority collision avoidance scheme is disclosed herein for contention based accessing.

In an example embodiment, a node or apparatus configures a plurality of devices to operate in a grant-less mode in accordance with a respective grant-less access allocation, such that, when the plurality of devices transmit messages uplink in the network, the messages are transmitted using frequency resources defined by the respective grant-less access allocation, and the plurality of devices transmit the messages without being granted access to transmit the messages, so as to operate in the grant-less mode.

In various embodiments described herein, grant-less uplink transmissions include Multi-user Orthogonality and Contention management, static contention space allocation via device GUI or OMA DM system configuration, Semi-static contention space allocation via the system broadcasting/multicasting and unicast or RRC/MAC messages, Dynamic contention space allocation via the downlink control signal or channel, and/or Multi-user orthogonality management via the contention space.

In an example embodiment, different configurations are used for Grant-less Slot in a subframe of a reference numerology. In some cases, a wide band Grant-less Slot is configured for high reliable and low latency use cases such as Ultra-Reliable and Low Latency Communications (URLLC), and a narrow band Grant-less Slot is configured for low data rate and latency tolerant use cases such as massive Machine Type Communications (mMTC). The Grant-less Slot may be configured using symbols in time and subcarriers in frequency of the reference numerology, or UE service specific numerology.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with accompanying drawings wherein:

FIGS. 25A-26B depict a call flow for grant-less UL transmission for massive Machine Type Communications (mMTC) devices in accordance with an example embodiment;

DETAILED DESCRIPTION OF ILLUSTRATIVE EMBODIMENTS

As an initial matter, for different RAN architectures, the mechanisms described herein may be conducted at, for example and without limitation, an NR-node, Transmission and Reception Point (TRP), or Remote Radio Head (RRH), as well as the central controller in RAN or control function in a RAN slice. Unless otherwise specified, the mechanisms described herein may applicable to TRP, RRH, central controller, and control functions in different RAN architectures.

Figure 1:
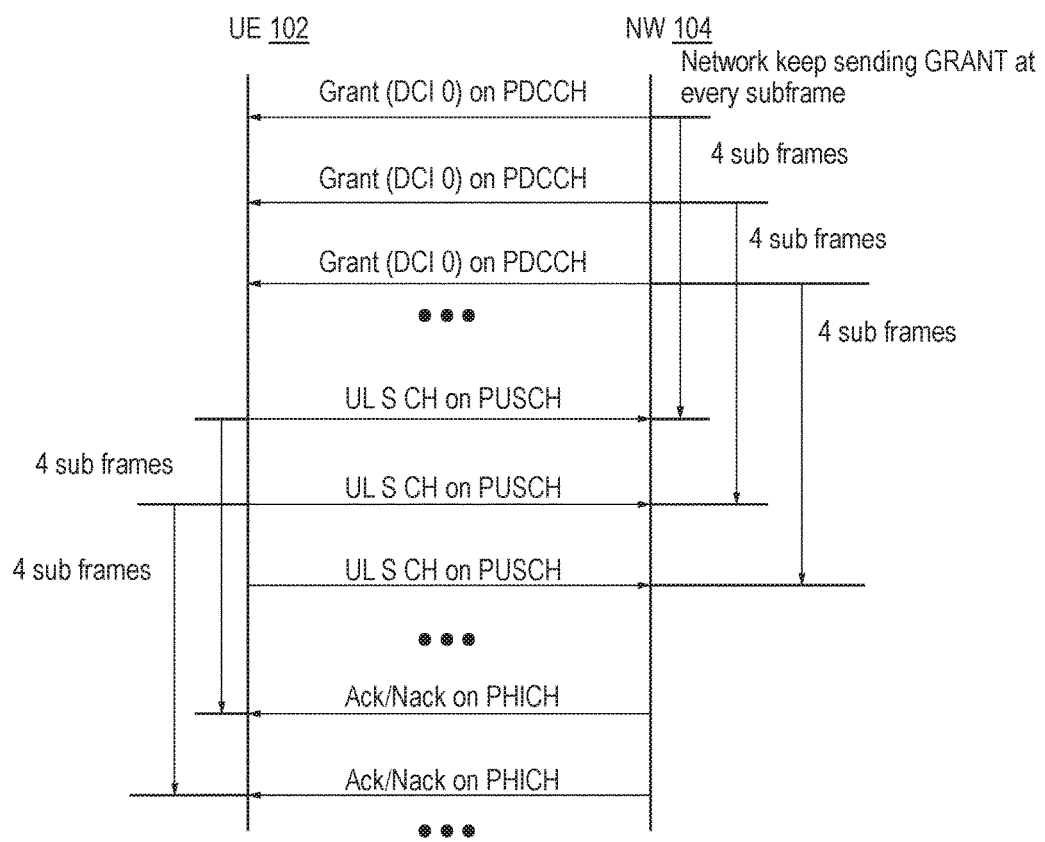
FIG. 1 is a call flow that shows an example of an uplink (UL) transmission with dynamic scheduling.

As specified in 3GPP TS 36.213, in order to transmit on the uplink shared channel (e.g., Physical Downlink Shared Channel (PDSCH)) using current approaches, a UE has a valid UpLink (UL) grant, which it may receive dynamically on the Physical Downlink Control Channel (PDCCH) or in a Random Access Response, or which may be configured semi-persistently. As shown in FIG. 1, a UL transmission with dynamic scheduling may include the following steps, for example. A Radio Access Network (RAN) 104 may send the first data on DL PDSCH and/or PDCCH that has Downlink Control Information (DCI) format 0 for UL Grant and DCI format 1 for DL Data Decoding. If there is no DL data, the radio access network 104 might transmit only DPCCH with DCI format 0 without any DPSCH data. A user equipment (UE) 102 may decode the Physical Control Format Indicator Channel (PCFICH) to figure a Control Format Indicator (CFI) value. The UE 102 may decode the PDCCH and get the information on DCI format 1. Based on DCI format 1, the UE 102 may decode the DL data. The UE 102 may decode the information on DCI format 0 from PDCCH. The UE 102 may send an ACK/NAK for DL data through Uplink Control Information (UCI) that is carried by Physical Uplink Control Channel (PUCCH). In the example, the UE 102 checks the Grant field in DCI format 0. If Grant is allowed, the UE 102 may transmit the UL data through the Physical Uplink Shared Channel (PUSCH) per the Grant. The Radio Access Network 104 decodes PUSCH data and sends an Acknowledgement (ACK)/Negative Acknowledgement (NACK) via Physical Hybrid ARQ Indicator Channel (PHICH). The UE 102 decodes PHICH and may retransmit the data, for example, if PHICH carries a NACK.

In some cases of semi-persistent scheduling, the radio access network 104 can assign a predefined group of radio resources for VoIP users with an interval of 20 ms, instead of scheduling each uplink or downlink transmission as described above. Therefore, the UE 102 is not required to request resources each TTI, which can reduce the scheduling assignment overhead significantly. This scheduling is semi-persistent in the sense that eNB can change the resource allocation type or location if required for link adaptation or for other factors.

Figure 2:
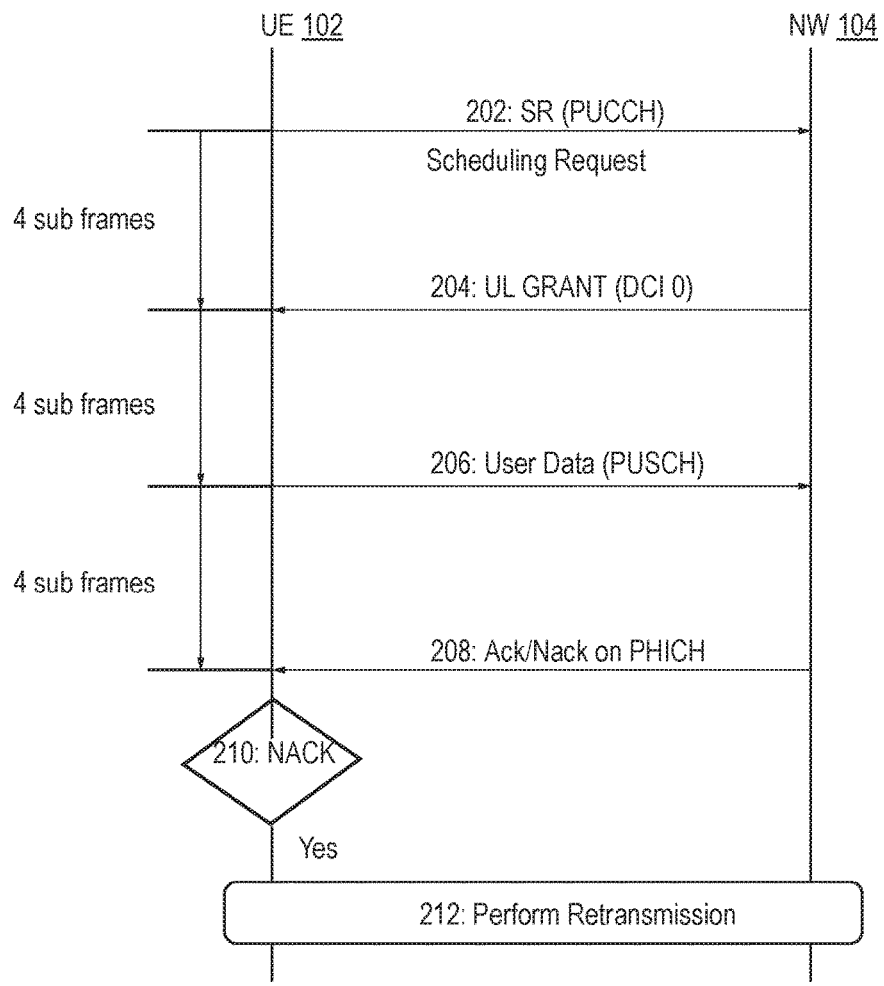
FIG. 2 is a call flow that shows an example of UL transmission with non-persistent scheduling.

Turning now to an example UL Transmission with Non-persistent Scheduling, as shown in FIG. 2, the UL transmission with non-persistent scheduling may include the following steps, for example. At 202, the UE 102 sends a Scheduling Request (SR) on PUCCH. At 204, the Radio Access Network 104 sends UL Grant (DCI 0) on PDCCH. At 206, the UE 206 decodes DCI 0 and transmits PUSCH based on the Resource Blocks (RBs) specified by DCI 0. The Radio Access Network 104 decodes the PUSCH. At 208, as shown, the Radio Access Network 104 sends ACK/NACK on PHICH. At 210, the UE 102 determines whether the message received at 208 is an ACK or a NACK. If the message is a NACK, the UE 102 may retransmit (at 212), which may be the same message as operation 202.

Turning now to Contention Based Multiple Access, in statistical time division multiplexing, contention is a media accessing method that is used to share a medium by multiple devices. In contention, any device in the network can transmit data at any time on the shared channel on a first-come, first-serve basis. This accessing system breaks down when two devices attempt to transmit at the same time. This is referred to as a collision. One approach to handle collisions in a contention based system is to optimize collision detection and the subsequent recovery. A collision can be detected by listening to the shared medium immediately after transmitting, and identifying collision characteristic. Alternatively, data can be collected from the medium and error detection can be performed. For recovery, some systems cause senders to re-transmit collided data (e.g., with backing-off algorithms that reduce the sender's re-transmit rate when collisions keep occurring) or use Error Correction techniques such as FEC for example. Examples of Collision Detection and Recovery multiple access protocols include Aloha, Slotted ALOHA, Reservation ALOHA, etc.

An alternative approach to handling collisions in a contention based system is to attempt to avoid them (collision avoidance). Some systems may utilize a strict scheduling guideline to identify who may use which resources when. Other systems may have the senders listen to the shared channel immediately prior to transmitting to determine suitable times to transmit. Examples of Collision Avoidance multiple access protocols include Carrier Sensing Multiple Access (CSMA), CSMA with Collision Detection (CSMA/CD), CSMA with Collision Avoidance (CSMA/CA), etc. With respect to a CSMA accessing scheme, each device listens to the network before attempting to transmit. If the network is busy, the device waits until the network quiets down.

Figure 3:
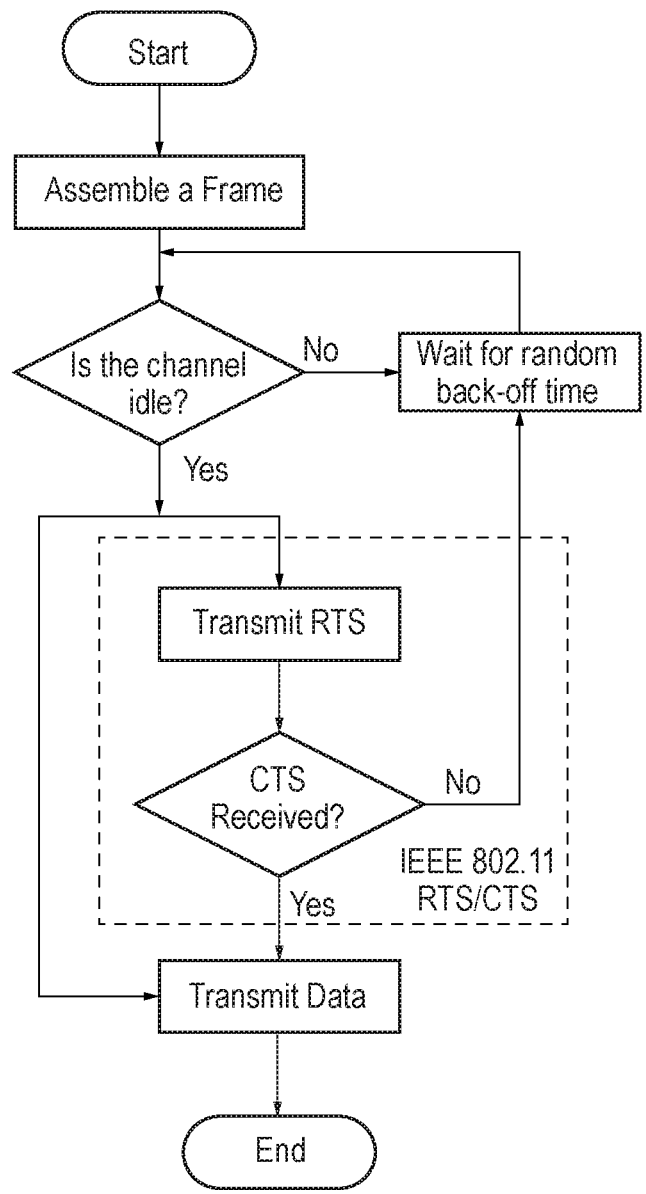
FIG. 3 is an example CSMA/CA algorithm.

With respect to Collision Detection (CD), devices continue to listen to the network as they transmit. If the device detects another signal that interferes with the signal it is sending, it stops transmitting, for example, to shorten the time required before a retry can be attempted. Both devices may wait for a random amount of time, referred to as a back-off time, and then attempt to transmit again. With respect to Collision Avoidance (CA), a device may attempt to avoid collisions by transmitting only when the channel is sensed to be "idle". If the transmission channel is sensed to be busy before transmission, then the transmission is deferred for a random interval. This random interval reduces the likelihood that two or more nodes that are waiting to transmit will simultaneously begin transmission upon termination of the detected transmission, thus reducing the incidence of collision. When transmitting, the device transmits its packet data entirely. A typical algorithm of CSMA/CA used in 802.11 is illustrated in FIG. 3, for purposes of example, where Request to Send (RTS) and Clear to Send (CTS) are used between a Base Station (BS) and an Access Point (AP) to solve the hidden terminal problem.

Turning now to random access, two typical random access schemes in an Orthogonal Frequency Division Multiplex (OFDM) System are now described. With respect to Random Access in LTE, Random Accessing in LTE is initiated by a random access preamble. As specified in TS 36.211, the random access opportunities for each Physical Random Access Channel (PRACH) configuration shall be allocated in time first and then in frequency if and only if time multiplexing is not sufficient to hold all opportunities of a PRACH configuration needed for a certain density value without overlap in time. For preamble format 0-3, the frequency multiplexing is performed done according to:

$$n_{PRB}^{RA} = \begin{cases} n_{PRBoffset}^{RA} + 6\left\lfloor\dfrac{f_{RA}}{2}\right\rfloor, & \text{if } f_{RA} \bmod 2 = 0 \\ N_{RB}^{UL} - 6 - n_{PRBoffset}^{RA} - 6\left\lfloor\dfrac{f_{RA}}{2}\right\rfloor, & \text{otherwise} \end{cases}$$

where $N_{RB}^{UL}$ is the number of uplink resource blocks, $n_{PRB}^{RA}$ is the first physical resource block allocated to the PRACH opportunity considered, and where $n_{PRB\ offset}^{RA}$ is the first physical resource block available for PRACH.

For preamble format 4, the frequency multiplexing is performed according to $$n_{PRB}^{RA} = \begin{cases} 6f_{RA}, & \text{if}(n_f \bmod 2) \times (2 - N_{SP}) + t_{RA}^{(1)}) \bmod 2 = 0 \\ N_{RB}^{UL} - 6(f_{RA} + 1), & \text{otherwise} \end{cases}$$

where $n_f$ is the system frame number, and where $N_{SP}$ is the number of DL to UL switch points within the radio frame. Each random access preamble occupies a bandwidth corresponding to 6 consecutive resource blocks for both frame structures.

With respect to random accessing 802.11, the UL OFDM-based random access is specified as the following. UL OFDMA-based distributed random access is a random access mechanism for High Efficient (HE) Stations (STAs) that randomly select Resource Units (RUs) assigned by an Access Point (AP) for transmission of UL PLCP Protocol Data Unit (PPDUs). The HE AP may indicate a parameter in the Trigger frame for HE STAs to initiate random access following the Trigger Frame transmission. An HE AP may indicate the value of OCWmin for the random access operation. The random access procedure initiates with an HE STA receiving a Trigger frame for random access.

For an initial UL PPDU transmission, when an HE STA obtains the value of OCWmin from the HE AP, it may set the value of OCW to the OCWmin and shall initialize its OFDM Backoff (OBO) counter to a random value in the range of 0 and OCWmin.

Figure 4:
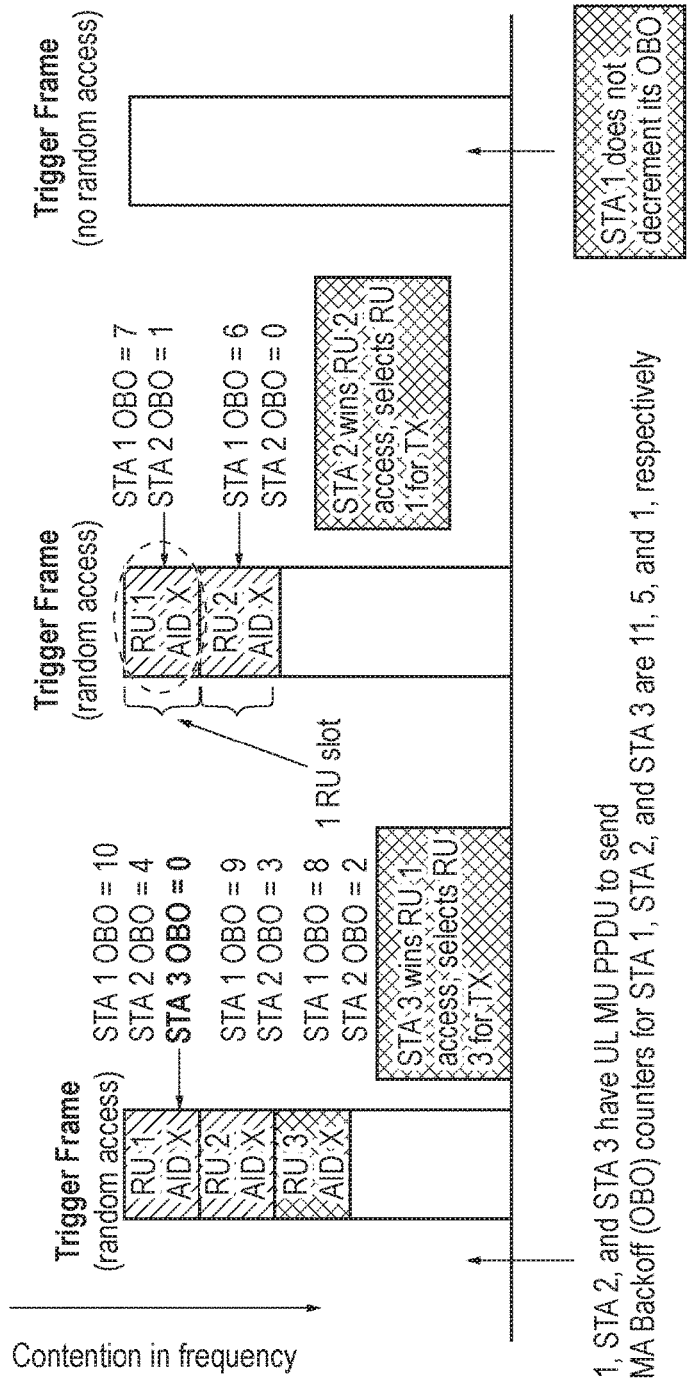
FIG. 4 shows an example of a UL OFDMA-based Random Access procedure.

If the OBO counter for an HE STA is smaller than the number of RUs assigned to Association Identifier AID value in a Trigger frame, then the HE STA may decrease its OBO counter to zero. Otherwise, the HE STA decreases its OBO counter by a value equal to the number of RUs assigned to the AID value in a Trigger frame. For instance, as shown in FIG. 4, the HE STA 1 and HE STA 2 may decrease their non-zero OBO counters by 1 in every RU assigned to AID value TBD for random access within the Trigger frame. If the OBO counter for an HE STA is a zero value, or if the OBO counter decreases s to 0, it randomly selects any one of the assigned RUs for random access and transmits its UL PPDU in the selected RU. Otherwise, the STA resumes with its OBO counter in the next Trigger frame for random access.

Turning to timing advance in LTE, timing advance is a negative offset, at the UE, between the start of a received downlink subframe and a transmitted uplink subframe. This offset at the UE ensures that the downlink and uplink subframes are synchronized at the eNodeB. For example, a given UE1 far from the eNodeB may encounter a larger propagation delay, such that its uplink transmission is advanced as compared to a given UE2 that is closer to the eNodeB as compared to UE1. Both UE1 and UE2 take the downlink subframe arrival (together with Timing Advance) as a reference to calculate uplink subframe timing so that their UL transmissions are synchronized and received at the same time at the eNodeB.

The eNodeB may estimates the initial Timing Advance from PRACH sent by the UE. PRACH is used as timing reference for uplink during UE's initial access. The eNodeB sends Timing advance command in Random Access Response (RAR). Once the UE is in connected mode, the eNodeB keep estimating Timing Advance and sends Timing Advance Command MAC Control Element to the UE, if correction is required. In examples, as long as a UE sends some uplink data (PUSCH/PUCCH/SRS), the eNodeB can estimate the uplink signal arrival time, which can then be used to calculate the required Timing Advance value.

With respect to transmit power control in LTE, the initial PRACH power control is conducted in an open loop, where a UE estimates the initial transmit power level based on path loss calculated from the referenceSignalPower broadcasted in SIB2 and the measured reference signal power received. Once initial PRACH is completed, the UE power may be controlled dynamically by Transmission Power Control (PCT) commands (MAC CE or TPC field in DCI 0). For example, the closed loop UL transmit power may be controlled by feedback input from the eNB.

Figure 5:
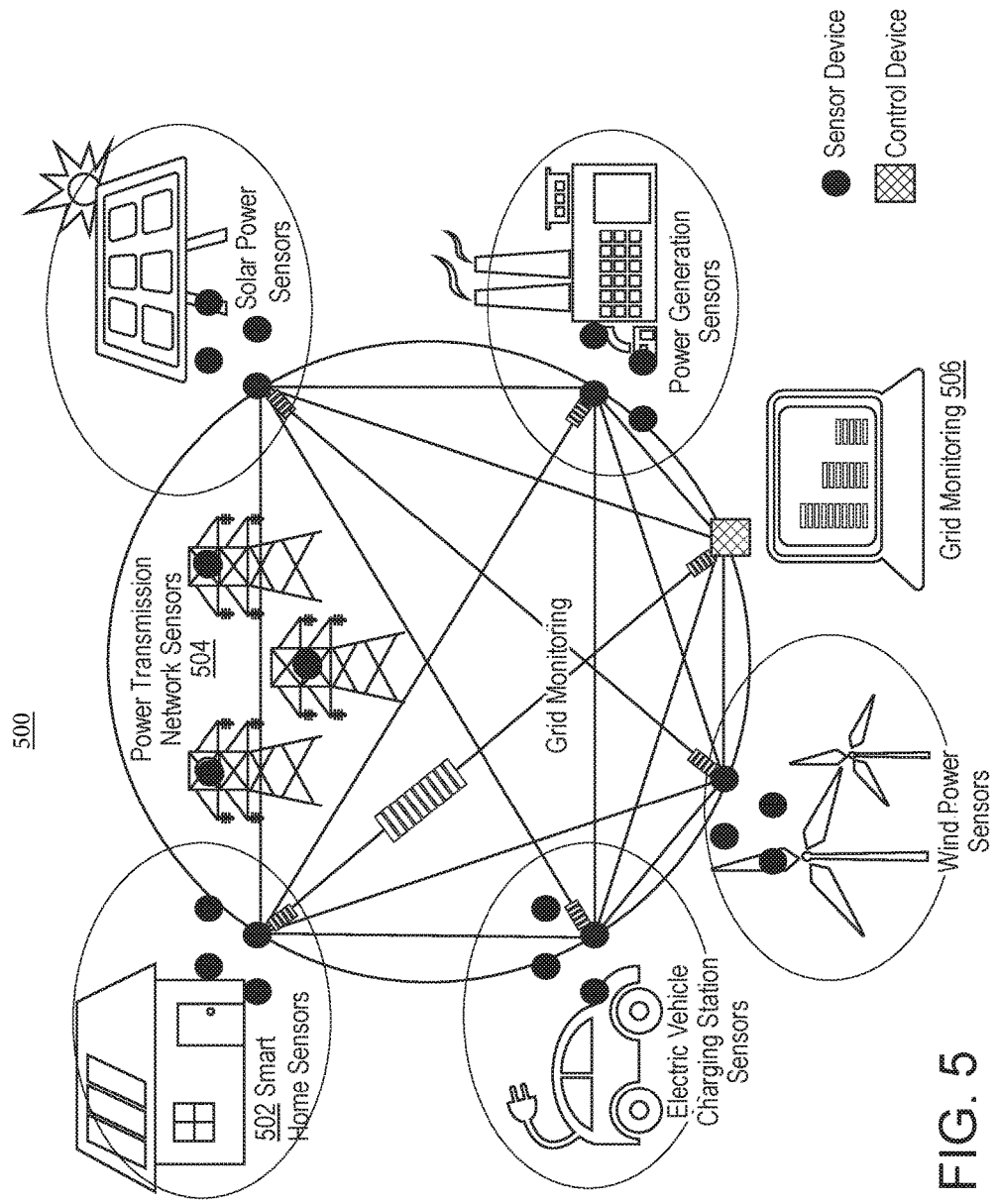
FIG. 5 shows an example use case that includes a power grid of a smart city.

Referring now to FIG. 5, an example use case is shown in which different sensors or monitoring devices of an example Smart City's power grid system 500 are illustrated. Sensors of a Smart Home 502 (e.g., massive Machine Type Communications (mMTC devices) may send electrical usage data once a week or a month with a very relaxed latency requirement. Sensors on a Smart City's Power Transmission Network 504 (e.g., Ultra-Reliable and Low Latency Communications (URLLC) devices) may monitor the power level continually and report to a Grid Monitoring System 506 periodically, but when an abnormal power level is detected, for example, it is recognized herein that the sensors 504 need to send the warning to the Grid Monitoring System 506 immediately so that the Grid Monitoring System 506 may shut down the malfunctioned power supply system, and so that a backup power supply system can be implemented instantly to avoid possible damage to the Smart City's power grid system 500 and to avoid negative impacts to the Smart City's operations.

By way of another example use case, forest fire monitoring sensors (e.g., mission critical MTC devices), can send small data periodically with a very low duty cycle, but they might need to send a fire warning message or messages immediately and reliably. These devices may be located sparsely and may cover a large area of the forest. The devices may also have constrained battery life (e.g., 15 or 20 years).

By way of yet another example use case, medical devices on an ambulance may be active while carrying the patient to the emergency room. For example, Ultra-Reliable and Low Latency Communications (URLLC) devices can send the patient's temperature and blood pressure data and heart monitoring images to the hospital and the doctor's office. It will be understood that embodiments described herein can be applied to a variety of use cases as desired.

The use cases may utilize URLLC and mMTC devices. For example, URLLC devices without battery constraint may support both small and medium UL data rate transmission with ultra-low latency and very high reliability. URLLC or mission critical MTC devices with battery constraint might support small UL data rate transmission with ultra-low latency and very high reliability. mMTC devices with battery constraint and dense connections might support small UL data rate transmission either prescheduled or tolerant to long latency.

As exemplified by the above uses cases, URLLC devices may fail the latency requirement for UL data transmission if the current grant-based UL data transmission in LTE systems is used. With respect to mMTC devices, the signaling overhead for UL grant messages may be very significant as compared to infrequent small UL data transmissions. It is recognized herein that this challenges the battery life requirement for mMTC devices. To reduce UL transmission signaling overhead for mMTC devices and to reduce UL transmission latency for URLLC devices, UL grant-less transmission (e.g., contention-based UL transmissions that do not undergo grant procedures performed by the UE and the network node, such as those illustrated in FIGS. 1 and 2) may be used. As described below, embodiments perform grant-less UL transmission that can meet the ultra-reliability and low latency requirements for non-power-constrained URLLC devices. Further, embodiments described herein perform grant-less UL transmission that meet the battery life requirement for mMTC devices Turning now to access allocation for grant-less UL transmission, in accordance with an example embodiment, a new radio (NR) radio access network node (a NR-node) manages the grant-less access allocations for UL transmissions to, for example and without limitation, ensure a high success rate for contention based accessing, to avoid unnecessary interference to the other devices of services, and to optimize the overall UL resource utilizations in the NR system. The access allocations may be managed by the NR-node statically or dynamically, as described in detail below. The sub-band or carrier is a region or group of continuous subcarriers in the frequency domain. Sub-band and carrier are used interchangeably herein, without limitation.

Turning now to Static or Semi-static Access Allocations, as exemplified in the use cases described above, the URLLC devices may require short latency and high reliability for delivering small or medium size data, and mMTC devices may require low signaling overhead and reasonable reliability for delivering small data. To meet these requirements, in some examples, with respect to UL resources, devices that require Ultra-Reliable and Low Latency Communications (referred to herein as URLLC devices) may use short transmitting time intervals over a wide bandwidth. In an example, URLLC devices use a small number of symbols that are scaled down via a decreased symbol length within a short transmitting time, for example, to meet latency requirements. Further, with respect to UL resources, URLLC devices may use a large number of subcarriers, which may provide sufficient bandwidth for small to medium data with frequency diversity and coding/spreading gains built in the frequency domain, for example, to meet ultra-reliable requirements. To meet various requirements, in some examples, with respect to UL resources, devices that may be classified as performing massive Machine Type Communications (referred to herein as mMTC devices) may use long transmitting time intervals over a narrow bandwidth. In an example, mMTC devices may use scaled up symbols with increased symbol length and coding/spreading/time diversity gains in the time domain within a longer transmitting time, for example, to meet low power consumption and reliability requirements. Further, with respect to UL resources, mMTC devices may use a small number of subcarriers, for example for small data to meet low complexity and lower power consumption requirements.

Figure 6:
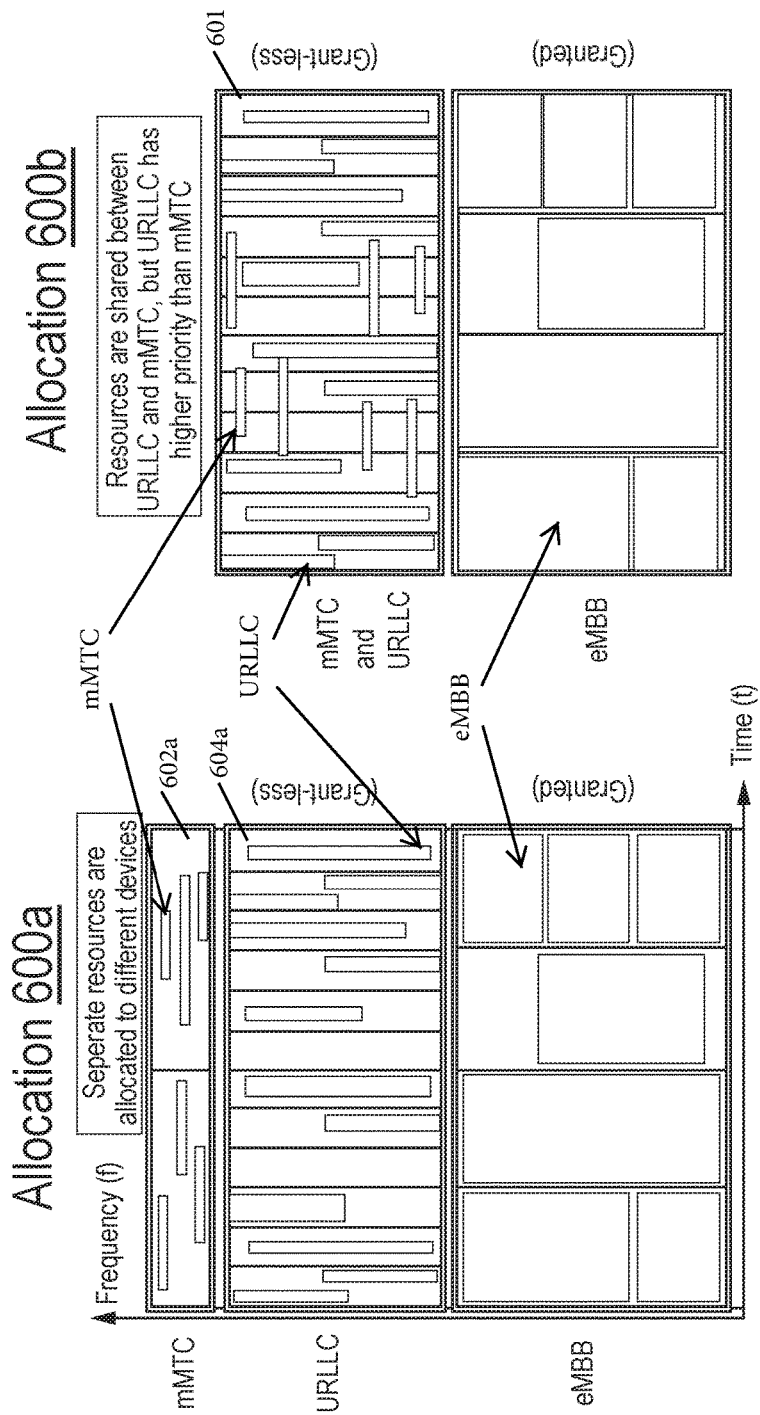
FIG. 6 shows dedicated sub-bands for grant-less access in accordance with an example embodiment.
Figure 7:
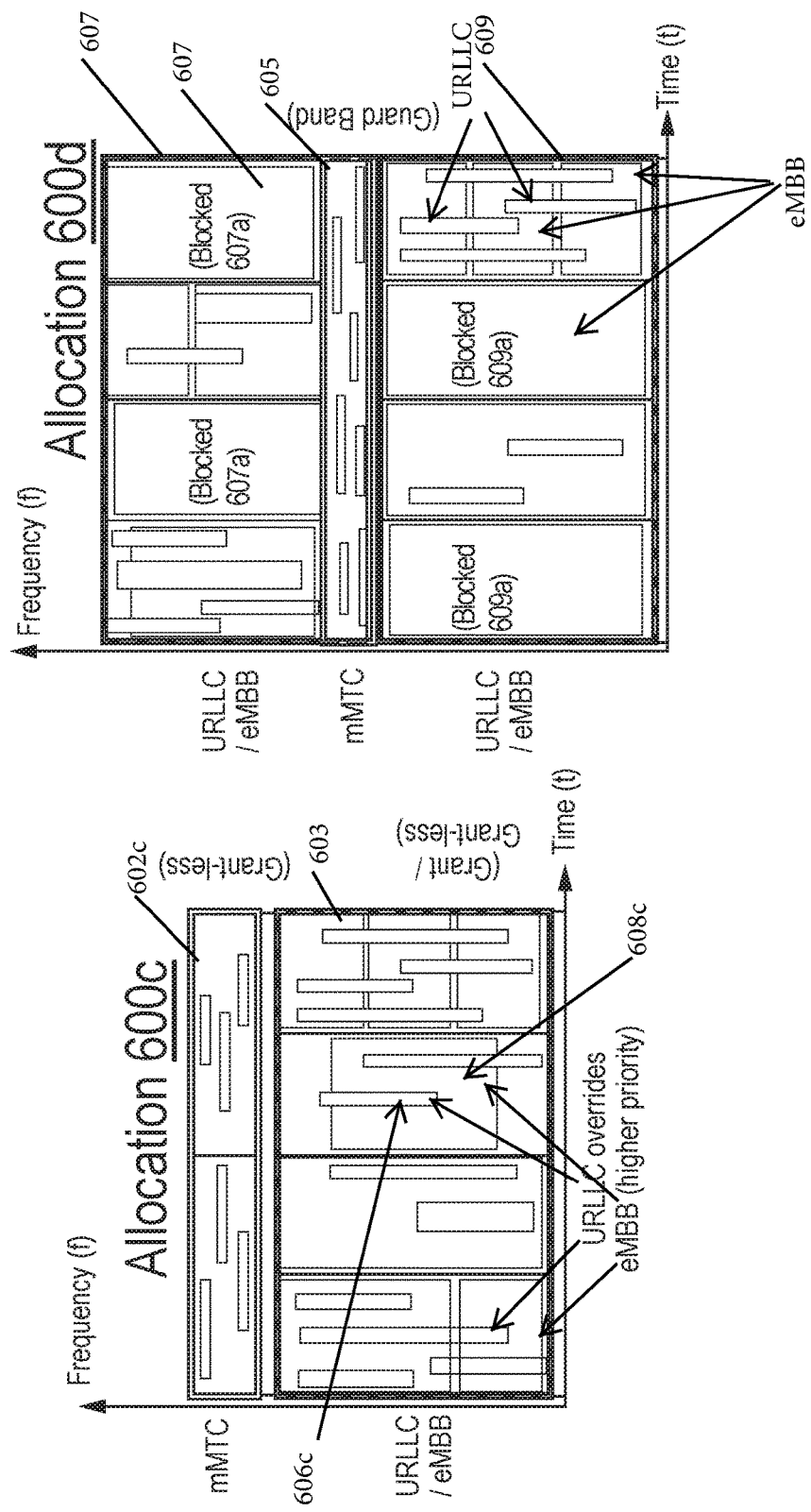
FIG. 7 shows example sub-bands for mixed grant and grant-less access in accordance with an example embodiment.

In accordance with the general UL resource mappings summarized above, example grant-less access allocations 600a and 600b are shown in FIG. 6, and example grant-less allocations 600c and 600d are shown in FIG. 7. The allocations 600a-d may be statically configured, for instance via a UE graphic user interface (GUI) or an Open Mobile Alliance (OMA) Device Management (DM) system, or semi-statically managed via periodic system information broadcasting and/or multi-casting. Such semi-static management may be based on the system traffic loading and resource status. Further, the allocations 600a-d may be semi-statically managed via aperiodic unicasting, for example, by system information on demand per a UE's request.

Referring in particular to FIG. 6, dedicated sub-band(s) for grant-less access are illustrated. In example allocation 600a, sub-band 602a for mMTC devices and sub-band 604a for URLLC devices are separated from each other with respect to the frequency domain. In some examples, allocation 600a optimizes grant-less access from the UE's perspective and/or a service's perspective. In an example, each sub-band 602a and 604a is a RAN slice optimized for a specific type of device or service. By way of example, the mMTC sub-band 602a may be optimized for saving battery life, and the URLLC sub-band 604a may be optimized for short latency and high reliability. Each of the sub-bands 602a and 604a may have the same or different numerology, which may depend, in some cases, on the optimization criteria.

In example allocation 600b, mMTC devices and URLLC devices use the same sub-band 601 with respect to the frequency and time domains. The example allocation 600b may optimize system resources for various example use cases, such as, for example, when both the URLLC and mMTC devices have low UL traffic, or when the mMTC devices and the URLLC devices have different schedules for UL traffic with respect to each other. By sharing the total grant-less resources between them, for instance in sub-band 601, mMTC and URLLC devices may have the advantage of wider system bandwidth as compared to approaches in which resources are not shared. The wider system bandwidth may allow high redundancy schemes to be used. Examples schemes may allow low coding rates, high spreading rates, and more frequency diversity, which may increase reliability for UL transmissions as compared to approaches in which resources are not shared. In an example embodiment, URLLC devices may have a higher access priority than mMTC devices, for example, due to more stringent latency and reliability requirements that may be placed on URLLC devices as compared to mMTC devices. In an example priority collision avoidance scheme, which is described further below, URLLC and mMTC devices may use the same or different numerologies for sub-carrier spacing, symbol length, and for the number of symbols in a transmitting time interval. Alternatively, URLLC and mMTC devices may use partially different numerologies. For example, URLLC and mMTC devices may use the same subcarrier spacing, but use a different number of symbols for the transmitting time interval with respect to each other.

FIG. 7 shows example allocations 600c and 600d in which sub-bands contain both mixed grant and grant-less access, which may maximize the utilization of the system resources in some cases. In accordance with the illustrated example, one or more URLLC devices may have UL grant-less transmitting time intervals or subframes that override a device using enhanced mobile broadband (eMBB) (referred to herein as an eMBB device), in particular the eMBB device's transmitting time interval or subframe. By way of example, a UE may be granted to transmit eMBB data using the resource 608c, and an URLLC grant-less UL transmission may be inserted at the resource 606c, which overlaps with 608c. If the same UE wants to transmit the eMMB data and the URLLC grantless-less UL transmission, for example, the URLLC data may pre-empt the eMBB data at 608c. If different UEs are sending the eMBB data and the URLLC data, the URLLC data may super position the eMBB data at 608c by, for example, using higher power, spreading code, spatial pre-coding, etc., as compared to the eMBB data.

In example allocation 600c, mMTC devices send UL messages via a dedicated sub-band 602c that is only for mMTC devices. Further, in the example allocation 600c, URLLC devices send grant-less UL via a shared sub-band 603, and eMBB devices send granted DL messages and/or UL messages in same sub-band 603. In this example scenario, URLLC devices may take advantage of the wide bandwidth of eMBB to meet or exceed reliability and latency requirements (e.g., with lower coding rate, higher spreading factor, more frequency diversity). With respect to the eMBB devices, in some cases, the impact of the shared sub-band 603 may be minimized due to wide frequency diversity, MIMO spatial gain, HARQ re-transmission, etc. For example, the eMBB data may be overridden by URLLC data at resource 608c, as shown in FIG. 7, and thus the eMBB data may be re-transmitted later, for example, if the original transmitted data is indicated to the UE as a failure (e.g., via a NACK or via a HARQ process)

In example allocation 600d, mMTC devices send grant-less messages via a guard band 605 of the eMBB devices. In an alternative example, mMTC devices may send grant-less messages via a band that is shared with granted DL and/or UL messages associated with eMBB devices. In accordance with the illustrated example allocation 600d, URLLC devices may send grant-less messages in one or more shared sub-bands with respect to the frequency domain, for instance shared subbands 607 and 609. The subbands 607 and 609 may also be used by eMMB devices for granted DL and/or UL messages. In some cases, using the allocation 600d, mMTC and URLLC devices may each achieve reliability gains, particularly when the traffic of mMTC devices is prescheduled and/or tolerant to long latency (e.g., by being scheduled at a time when there is very low eMBB traffic).

In some cases, certain times and frequency within the sub-bands shown in allocations 600c and 600d can be blocked out for grant-less access, for example, to reduce potential interference caused from the grant-less access, thereby ensuring QoS for certain eMBB devices. In accordance with the example, sub-bands 607 and 609 each include a plurality of blocked regions 607a and 609a, respectively.

Figure 36:
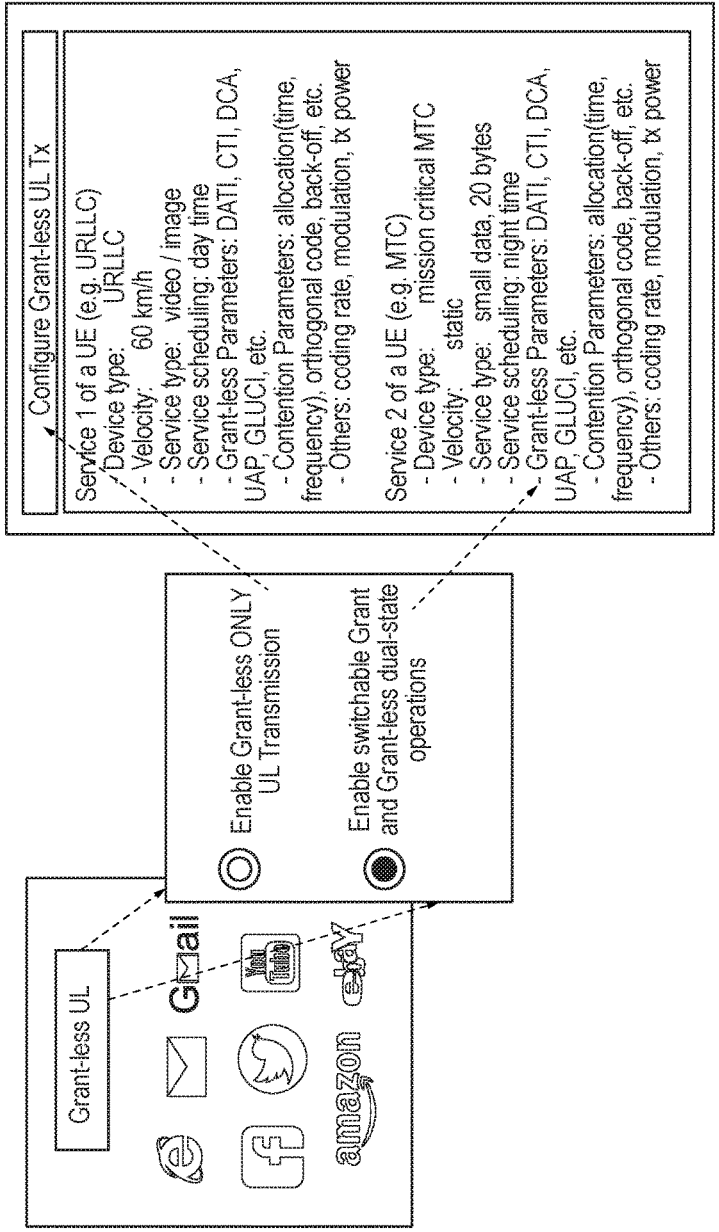
FIG. 36 is an example GUI for UE configuration in accordance with an example embodiment.

With respect to static allocation, the example allocations 600a-d, among others, may be preconfigured via a GUI on the devices, for instance GUI 3600 shown in FIG. 36. Alternatively, example allocations 600a-d may be configured by device manufacturers or service providers. Alternatively still, allocations 600a-d may be statically provisioned on the device using Open Mobile Alliance Device Management (OMA DM) protocol or any other Over-The-Air (OTA) device provisioning protocol. A static grant-less access allocation generally refers to an allocation that is known to the devices prior to the respective communication session being established.

With respect to semi-static allocation, the above example allocations 600a-d may also be signaled to the device sending the UL messages (e.g., a UE), for example and without limitation, via common RRC signaling, dedicated RRC signaling or MAC Control Element (MAC CE) signaling. For example, using a common RRC signaling mechanism, the allocations 600a-d may be periodically broadcast or multi-cast by an NR-node, for example, as part of System Information (SI). Similarly, using dedicated RRC signaling, the example allocations 600a-d may be, for example and without limitation, aperiodically unicasted by an NR-node in an RRC message or MAC CE message as System Info on-demand. In some cases, a given UE may acquire the access allocation information by searching the system information on a DL broadcasting or multicasting channel that is transmitted from an NR-node. In other cases, a UE may send a request to the NR-node for the access allocation information as on-demand system information. The NR-node, or apparatus, (e.g., a NextGen RAN Node) may signal the UL transmission grant-less (e.g., for use by a URLLC device) resource allocation (configuration) to the UE in a response to a request from the UE, or as result of an autonomous NR-node decision.

The example below shows an example of how the grant-less allocation may be signaled to UEs in RadioResourceConfigCommon System Information (SI), which may be indicated to a UE via an RRC signal. Additionally, or alternatively, the SI may be broadcast on a physical broadcast channel or a physical shared channel:

```
-- ASN1START
RadioResourceConfigCommonSIB ::=   SEQUENCE {
    rach-ConfigCommon              RACH-ConfigCommon,
    bcch-Config                    BCCH-Config,
    pcch-Config                    PCCH-Config,
```

```
    prach-Config                    PRACH-ConfigSIB,
    pdsch-ConfigCommon              PDSCH-ConfigCommon,
    pusch-ConfigCommon              PUSCH-ConfigCommon,
    pucch-ConfigCommon              PUCCH-ConfigCommon,
    soundingRS-UL-ConfigCommon      SoundingRS-UL-ConfigCommon,
    uplinkGrantlessControlCommon    uplinkGrantlessControlCommon
    uplinkPowerControlCommon        UplinkPowerControlCommon,
    ul-CyclicPrefixLength           UL-CyclicPrefixLength,
    ...,
    [[ uplinkGrantlessControlCommon-v1020(?)  UplinkPowerControlCommon-v1020(?)   OPTIONAL
-- Need
OR
    ]],
    [[ uplinkPowerControlCommon-v1020    UplinkPowerControlCommon-v1020   OPTIONAL    -- Need
OR
    ]],
    [[ rach-ConfigCommon-v1250           RACH-ConfigCommon-v1250      OPTIONAL    -- Need OR
    ]],
    [[ pusch-ConfigCommon-v1270          PUSCH-ConfigCommon-v1270     OPTIONAL    -- Need
OR
    ]]
}
RadioResourceConfigCommon ::=      SEQUENCE {
    rach-ConfigCommon               RACH-ConfigCommon                OPTIONAL,   -- Need
ON
    prach-Config                    PRACH-Config,
    pdsch-ConfigCommon              PDSCH-ConfigCommon               OPTIONAL,   -- Need
ON
    pusch-ConfigCommon              PUSCH-ConfigCommon,
    phich-Config                    PHICH-Config                     OPTIONAL,   -- Need
ON
    pucch-ConfigCommon              PUCCH-ConfigCommon               OPTIONAL,   -- Need
ON
    soundingRS-UL-ConfigCommon      SoundingRS-UL-ConfigCommon       OPTIONAL,   -- Need
ON
    uplinkGrantlessControlCommon    UplinkGrantlessControlCommon     OPTIONAL,   -- Need
ON
    uplinkPowerControlCommon        UplinkPowerControlCommon         OPTIONAL,   -- Need
ON
    antennaInfoCommon               AntennaInfoCommon                OPTIONAL,   -- Need ON
    p-Max                           P-Max                            OPTIONAL,   -- Need
OP
    tdd-Config                      TDD-Config                       OPTIONAL,   -- Cond
TDD
    ul-CyclicPrefixLength           UL-CyclicPrefixLength,
    ...,
    [[ uplinkGrantlessControlCommon-v1020  UplinkGrantlessControlCommon-v1020   OPTIONAL   -
- Need
ON
    ]],
    [[ uplinkPowerControlCommon-v1020      UplinkPowerControlCommon-v1020       OPTIONAL   -- Need
ON
    ]],
    [[ tdd-Config-v1130                    TDD-Config-v1130                     OPTIONAL   -- Cond TDD3
    ]],
    [[ pusch-ConfigCommon-v1270            PUSCH-ConfigCommon-v1270             OPTIONAL   -- Need
OR
    ]],
    [[ uplinkPowerControlCommon-v13xy      UplinkPowerControlCommon-v13xy       OPTIONAL   -- Need
ON
    ]]
}
RadioResourceConfigCommonPSCell-r12 ::= SEQUENCE {
    basicFields-r12                         RadioResourceConfigCommonSCell-r10,
    pucch-ConfigCommon-r12                  PUCCH-ConfigCommon,
    rach-ConfigCommon-r12                   RACH-ConfigCommon,
    uplinkGrantlessControlCommonPSCell-r12  UplinkGrantlessControlCommonPSCell-r12,
    uplinkPowerControlCommonPSCell-r12      UplinkPowerControlCommonPSCell-r12,
    ...,
    [[ uplinkPowerControlCommon-v13xy       UplinkPowerControlCommon-v13xy       OPTIONAL   -- Need
ON
    ]]
}
RadioResourceConfigCommonSCell-r10 ::= SEQUENCE {
    -- DL configuration as well as configuration applicable for DL and UL
    nonUL-Configuration-r10         SEQUENCE {
        -- 1: Cell characteristics
        dl-Bandwidth-r10                    ENUMERATED {n6, n15, n25, n50, n75, n100},
        -- 2: Physical configuration, general
```

```
        antennaInfoCommon-r10            AntennaInfoCommon,
        mbsfn-SubframeConfigList-r10     MBSFN-SubframeConfigList    OPTIONAL,   -- Need
OR
        -- 3: Physical configuration, control
        phich-Config-r10                 PHICH-Config,
        -- 4: Physical configuration, physical channels
        pdsch-ConfigCommon-r10           PDSCH-ConfigCommon,
        tdd-Config-r10                   TDD-Config                  OPTIONAL    -- Cond
TDDSCell
    },
    -- UL configuration
    ul-Configuration-r10                 SEQUENCE {
        ul-FreqInfo-r10                  SEQUENCE {
            ul-CarrierFreq-r10           ARFCN-ValueEUTRA            OPTIONAL,   -- Need
OP
            ul-Bandwidth-r10             ENUMERATED {n6, n15,
                                             n25, n50, n75, n100}   OPTIONAL,   -- Need
OP
            additionalSpectrumEmissionSCell-r10    AdditionalSpectrumEmission
        },
        p-Max-r10                        P-Max                       OPTIONAL,   -- Need OP
        uplinkGrantlessControlCommonSCell-r10   UplinkGrantlessControlCommonSCell-r10,
        uplinkPowerControlCommonSCell-r10       UplinkPowerControlCommonSCell-r10,
        -- A special version of IE UplinkPowerControlCommon may be introduced
        -- 3: Physical configuration, control
        soundingRS-UL-ConfigCommon-r10   SoundingRS-UL-ConfigCommon,
        ul-CyclicPrefixLength-r10        UL-CyclicPrefixLength,
        -- 4: Physical configuration, physical channels
        prach-ConfigSCell-r10            PRACH-ConfigSCell-r10       OPTIONAL,   -- Cond
TDD-OR-NoR11
        pusch-ConfigCommon-r10           PUSCH-ConfigCommon
    }                                                                OPTIONAL,   -- Need OR
    ...,
    [[ ul-CarrierFreq-v1090              ARFCN-ValueEUTRA-v9e0       OPTIONAL    -- Need
OP
    ]],
    [[ rach-ConfigCommonSCell-r11        RACH-ConfigCommonSCell-r11  OPTIONAL,   -- Cond
ULSCell
       prach-ConfigSCell-r11             PRACH-Config                OPTIONAL,   -- Cond
UL
       tdd-Config-v1130                  TDD-Config-v1130            OPTIONAL,   -- Cond TDD2
       uplinkGrantlessControlCommonSCell-v1130
                          UplinkGrantlessControlCommonSCell-v1130 OPTIONAL    -- Cond UL
       uplinkPowerControlCommonSCell-v1130
                          UplinkPowerControlCommonSCell-v1130 OPTIONAL    -- Cond UL
    ]],
    [[ pusch-ConfigCommon-v1270          PUSCH-ConfigCommon-v1270    OPTIONAL    -- Need
OR
    ]],
    [[ pucch-ConfigCommon-r13            PUCCH-ConfigCommon          OPTIONAL,   -- Cond UL
       uplinkGrantlessControlCommonSCell-v13xx UplinkGrantlessControlCommonPSCell-r12 OPTIONAL
       -- Cond UL
       uplinkPowerControlCommonSCell-v13xx UplinkPowerControlCommonPSCell-r12 OPTIONAL   --
Cond UL
    ]]
}
BCCH-Config ::=                          SEQUENCE {
    modificationPeriodCoeff              ENUMERATED {n2, n4, n8, n16}
}
PCCH-Config ::=                          SEQUENCE }
    defaultPagingCycle                   ENUMERATED {
                                             rf32, rf64, rf128, rf256},
    nB                                   ENUMERATED {
                                             fourT, twoT, oneT, halfT, quarterT, oneEighthT,
                                             oneSixteenthT, oneThirtySecondT}
}
UL-CyclicPrefixLength ::=                ENUMERATED {len1, len2}
-- ASN1STOP
```

Turning now to dynamic access allocations, in view of the dynamic pattern of traffic associated with different devices and services, in accordance with some examples, the UL access allocations (e.g., allocations 600a-d) may also be dynamically managed by a given NR-node, such that system resources are managed and/or grant-less UL transmissions are controlled to ensure that various performance requirements are met for different devices and services. As used herein, a Dynamic Access Configuration Time Interval (DACTI) refers to a fixed or variable time interval for which a specific Access Allocation scheme, which can apply to DL and/or UL messages, is applied. The length of the DACTI may be signaled to UEs via common RRC signaling, dedicated RRC signaling, or via MAC CE signaling. The NR-node (e.g., a RAN Node or apparatus) may also signal the DACTI to the UE as a response to a request from the UE, or as a result of an autonomous NR-node decision. In an example, the NR-node may be configured to periodically signal the DACTI to the UEs under its coverage. The DACTI may also be signaled dynamically on the down link control channel via the Downlink Control Information (DCI). As used herein, an Access Configuration Signal may be shared with other control signals (e.g., pilots for synchronization or reference signals for radio link estimation or measurements). Alternatively, an Access Configuration Signal may be a dedicated control signal for the access configuration (allocation).

Figure 8:
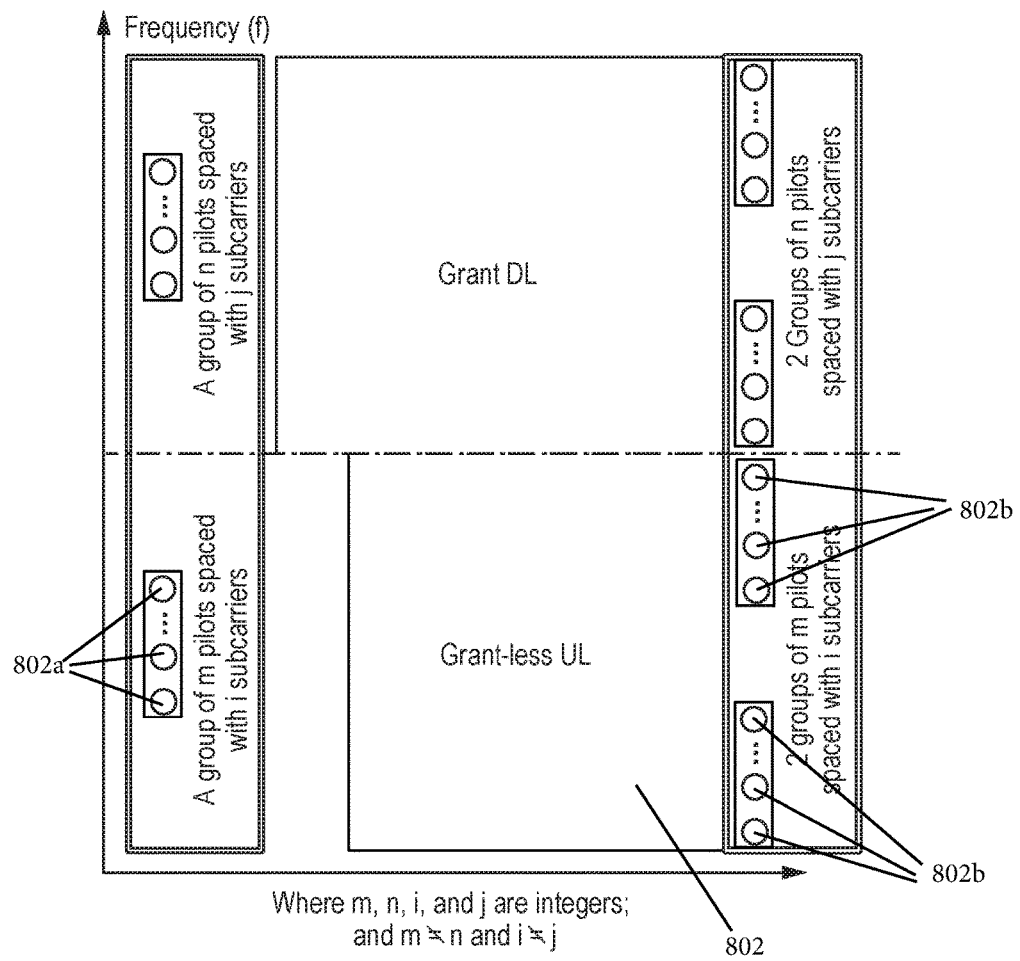
FIG. 8 depicts an example of access allocations indicated by pilot patterns in accordance with an example embodiment.

Referring to FIG. 8, if the access configuration signal is shared with other control signals, in an example, a pattern of pilot locations along the frequency axis (e.g., subcarriers in an OFDM grid) may be used for indicating the current DACTI's Dynamic Access Allocation. As shown in FIG. 8, a specific pattern of pilots 802a may be at the center of an access sub-band 802 with respect to frequency. Alternatively, or additionally, a pattern of pilots 802b may be at the edges of the sub-band 802. The pilots 802a and 802b may indicate the access type and allocation of the corresponding sub-band 802. The pilots 802a and 802b may be sent from an NR-node as a DL configuration signal, in an example of indicating the grant-less access allocation. The NR-node may configure this DL configuration signal (shared or dedicated) through system information broadcasting or RRC signaling message.

As used herein, an Access Configuration Channel, unless otherwise specified, may refer to a shared or dedicated control channel. If shared with other control channels, certain Information Elements (IEs) of the control channel message may be used for indicating the Dynamic Access Allocation. For example, the DCI of a Downlink Shared Control Channel may indicate the access type and location. A given NR node may configure this DL shared or dedicated control channel through system information broadcasting or RRC signaling message. In some cases, the NR node may configure more than one DL shared control channels for a UE. Once configured, the channel might be activated or deactivated for a dynamic indication of the grant-less access allocation. In some examples, the NR node may activate or deactivate the channel through MAC CE signaling or RRC signaling.

Figure 9:
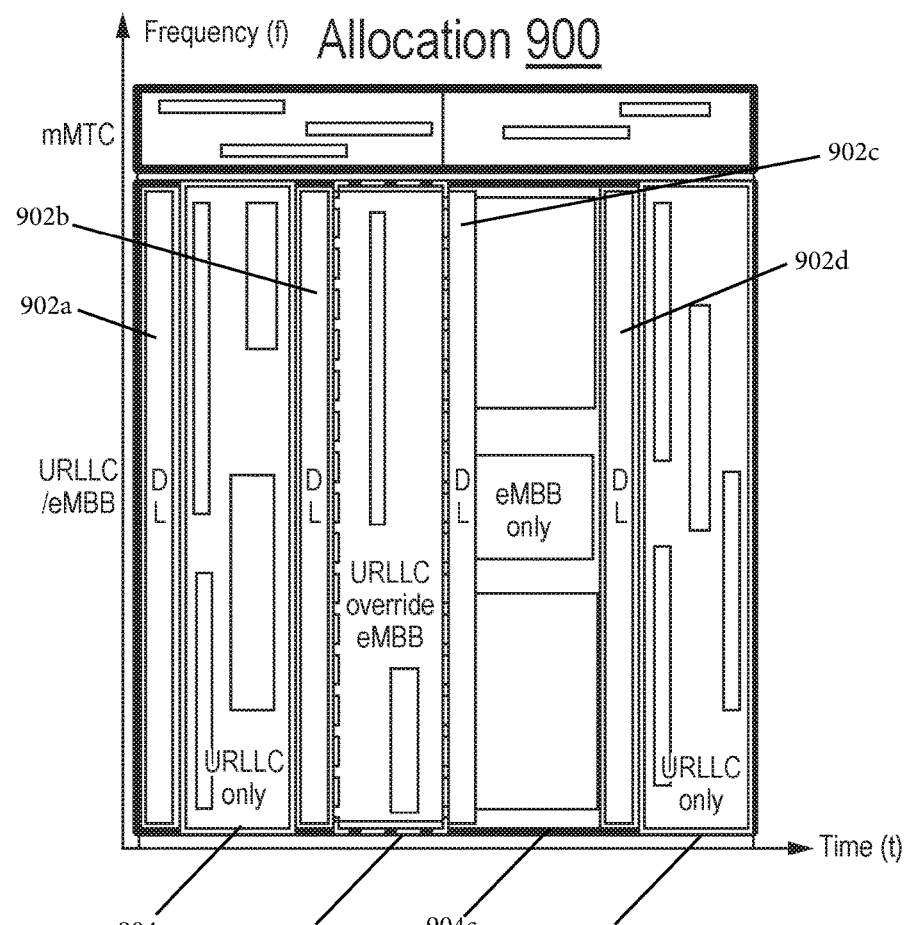
FIG. 9 shows an example dynamic allocation in accordance with an example embodiment.
Figure 10:
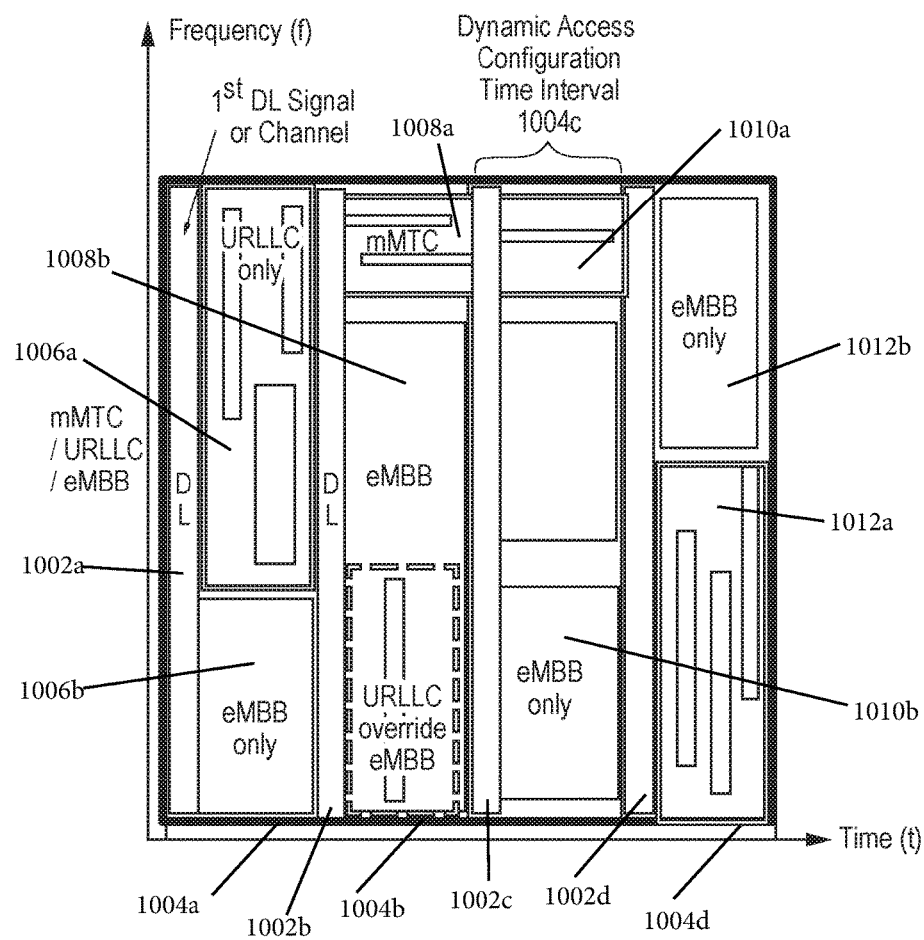
FIG. 10 shows another example dynamic allocation in accordance with another example embodiment.

As shown in FIGS. 9 and 10, the grant-less access allocation may be indicated at the first DL control signal or channel of a DACTI. These dynamic allocations may be signaled by a DL control channel, or a DL control channel may signal several allocations or allocation of several sub-bands. In some cases, a special, pre-defined Radio Network Temporary Identifier (RNTI) may be used on the DL control channel to indicate that this allocation is for DACTI.

Referring in particular to FIG. 9, an example allocation 900 represents an example full band allocation. A first DL control signal or channel 902a within a first DACTI 904a indicates that the DACTI 904a is allocated for URLLC grant-less UL only. In an example, the DCI 902a associated with the Grant-less UL configuration is decoded, and then the Grant-less UL allocation within the current DACTI 904a is decoded. In accordance with the illustrated example, a second DL control signal or channel 902b within a second DACTI 904b indicates that the second DACTI 904b is allocated for eMBB granted DL and/or UL communications mixed with URLLC grant-less UL messages. In accordance with the illustrated example, a third DL control signal or channel 902c within a third DACTI 904c indicates that the third DACTI 904c is allocated for eMBB grant DL and/or UL communications only. In accordance with the illustrated example, a fourth DL control signal or channel 902d within a fourth DACTI 904d indicates that the fourth DACTI 904d is allocated for URLLC devices grant-less UL only.

Referring also to FIG. 10, an example allocation 1000 represents an example partial band allocation. In accordance with the illustrated example, a first DL control signal or channel 1002a within a first DACTI 1004a indicates that the DACTI 1004a is split with respect to the frequency domain so as to include a URLLC device grant-less UL only sub-band 1006a and a eMBB DL and/or UL only sub-band 1006b. In some examples, the DCI of a Grant-less UL configuration is decoded, and then the Grant-less UL allocation within the current DACTI is decoded. In accordance with the illustrated example, a second DL control signal or channel 1002b within a second DACTI 1004b indicates that the DACTI 1004b is split with respect to the frequency domain so as to include a sub-band 1008a and/or 1010a for only mMTC device grant-less UL access, and a sub-band 1008b for eMBB grant DL and/or UL and URLLC device grant-less UL. In accordance with the illustrated example, a third DL control signal or channel 1002c within a third DACTI 1004c indicates that the DACTI 1004c is split with respect to the frequency domain so as to include a sub-band 1010a for only mMTC device grant-less UL access when no indicated by the second DL control signal or channel 1002b, and a sub-band 1010b for only eMBB grant DL and/or UL. In accordance with the illustrated example, a fourth DL control signal or channel 1002d within a fourth DACTI 1004d indicates that the DACTI 1004d is split with respect to the frequency domain so as to include a sub-band 1012a for only URLLC device grant-less UL messages and a sub-band 1012b for only eMBB grant DL and/or UL communications.

Figure 11A:
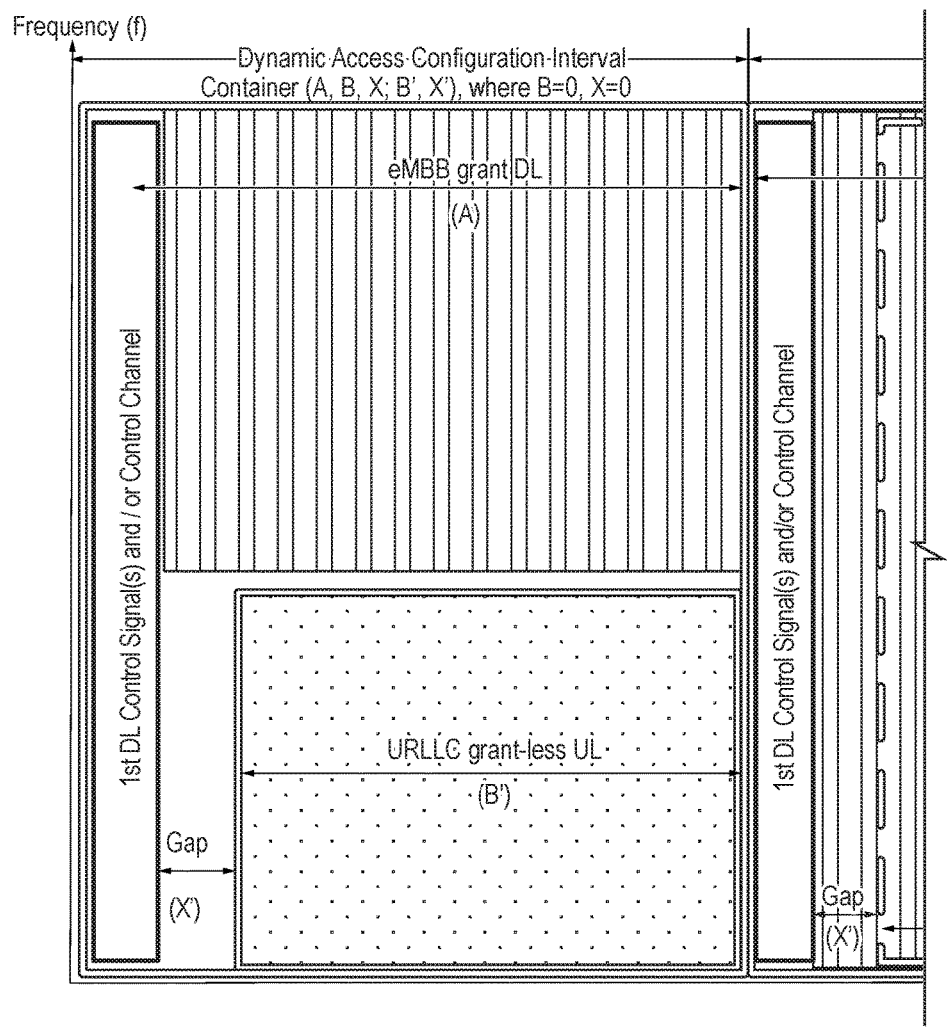
FIGS. 11A and 11B show example containers for a dynamic access allocation in accordance with an example embodiment.
Figure 11B:
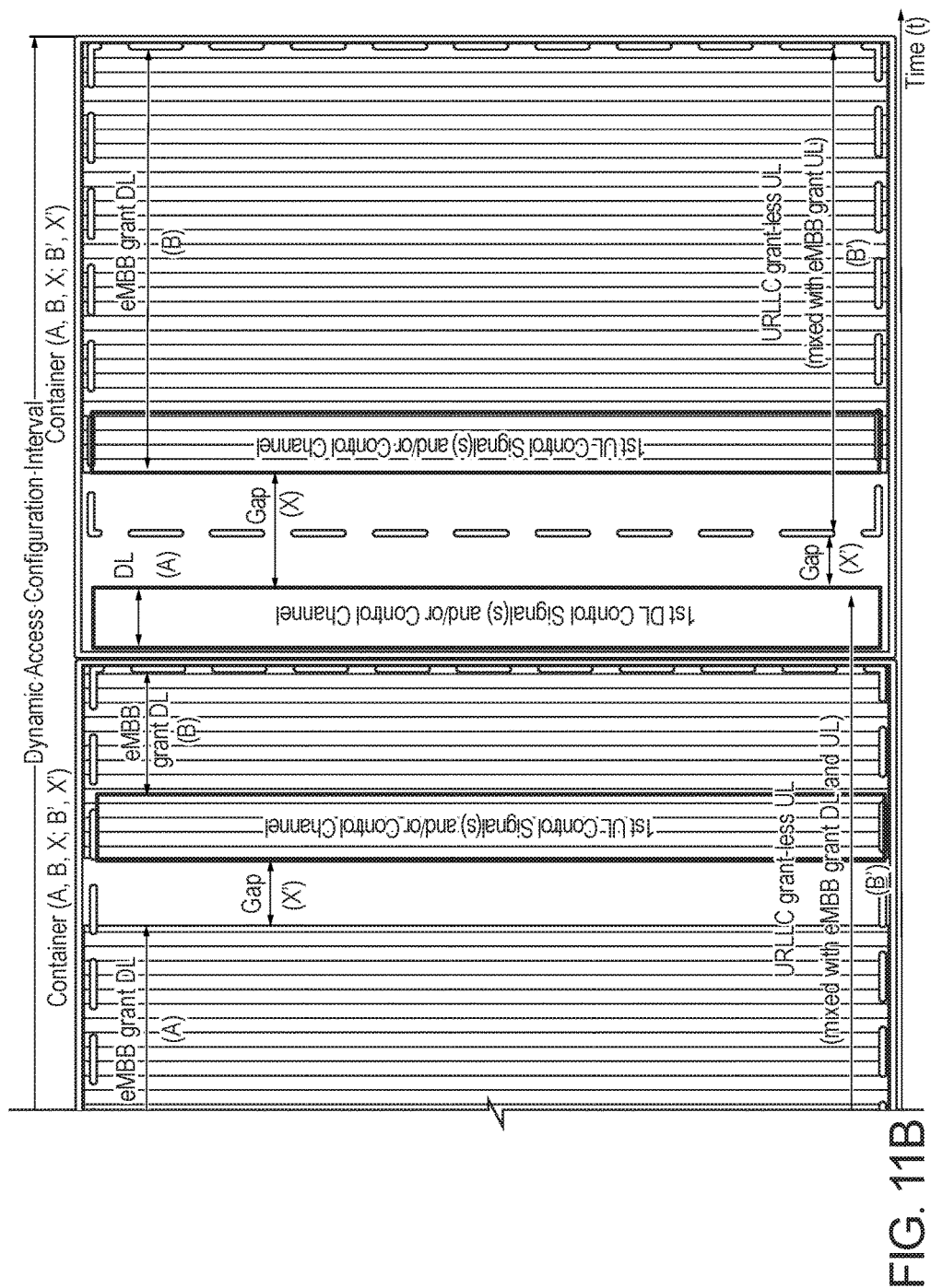

Turning now to FIGS. 11A and 11B, further details of dynamic access allocation in the time and frequency domains are illustrated in accordance with example embodiments. In accordance with the illustrated example: (A) represents a granted DL time interval; (B) represents a granted UL time interval, (B') represents a grant-less UL time interval; (X) represents a gap between granted DL and UL time intervals; and X' represents a gap (with respect to the time domain) between DL control signals and grant-less UL messages.

In some examples, a DL control channel may contain DCIs for DL TX, UL ACK/NACK, UL grant, NR-node defined UL grant-less configurations (e.g., NR-node defined code seed or index of the code book for UL multi-user multiplexing in code domain), etc. In some examples, a UL control channel may contain UCIs for UL grant-less transmission configuration, such as DL Ack/Nack, UL HARQ scheme, UE selected UL grant-less configurations (e.g., UE selected code seed or index of the code book for UL multi-user multiplexing in code domain), etc. In some cases, as shown in FIGS. 11A and 11B, each Interval or Container, (A, B, X; B', X') may coincide within each DACTI, and multiple Intervals may also coincide within one DACTI, for example, if the DCI(s) on the downlink for Grant-less UL configure multiple self-contained containers. In some examples, multiple DACTIs may also coincide within a Container, for example, for fast dynamic grant-less UL management. In some cases, a given NR-node may dynamically manage the grant-less UL access allocation for a given UE based on, for example and without limitation: the UE's device type and/or capabilities; the UE's service requirements; a connection density associated with the UE; a UL data traffic pattern or schedule associated with the UE; the UE's feedback regarding its failed contentions or its success rate of contention; the UE's report of radio link measurements; UE's report of mobility status associated with the UE; an amount of grant-less UL transmissions that the NR-node has received; the number of grant-less UL packets that the NR-node has decoded successfully or the number of NACKs that the NR-node has sent in order to receive UL re-transmissions; traffic loading associated with the system; the radio link budget, resource utilization, scheduling, and slicing associated with the system; and/or the interference or power control and management.

Figure 12:
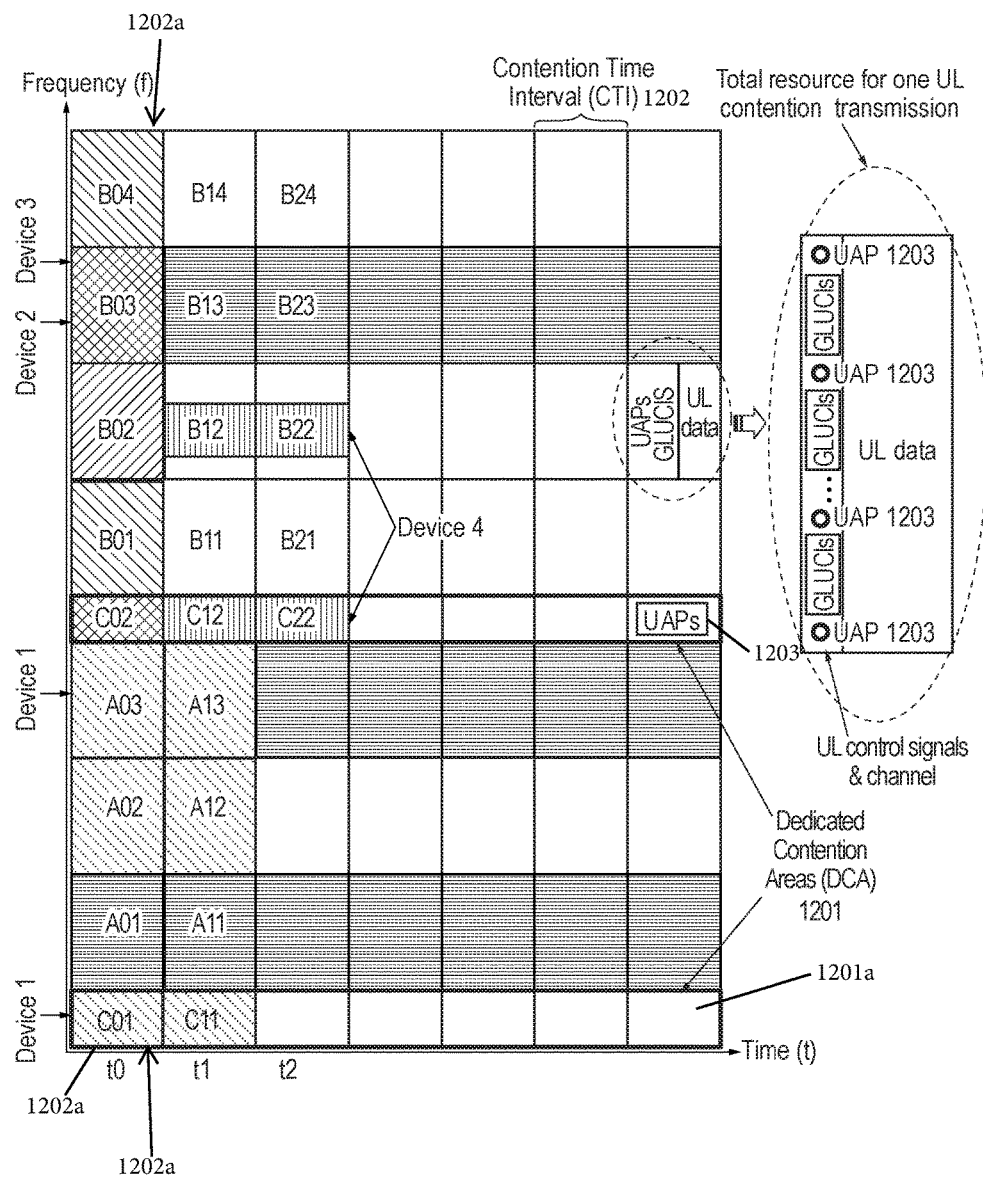
FIG. 12 shows an example of a two dimensional (2D) priority collision avoidance contention access in accordance with an example embodiment.

Turning now to Priority Collision Avoidance Contention Access, as described above, URLLC devices are required to meet very tight latency requirements, and therefore URLLC devices might need to have higher priority than other devices for contention based access. An example CSMA/CA based 2-dimensional (time and frequency) priority collision avoidance contention access mechanism is shown in FIG. 12, where Device 1, Device 2 and Device 3 have higher priority than Device 4 for UL contention access. The following terms are defined to help describe the illustrated example embodiment. In accordance with the illustrated example, a Contention Time Interval (CTI) refers to a time interval that UEs contend for UL transmission. In some examples, a UE may acquire the CTI from the system info or RRC signaling for static or semi-static configured CTI. In some cases, a UE may decode the CTI from the DL DCIs and dynamic grant-less UL transmission configurations. In another example, a UE may receive the CTI in a grant-less setup response from the NR-node.

With continuing reference to FIG. 12, in accordance with the example, a Dedicated Contention Area (DCA) 1201 may refer to an area (e.g., lean carrier) dedicated for UEs to detect UL resource availability of the current CTI. This area 1201 may be narrow in frequency, for example, such that it contains few subcarriers, for ease of detection and low overhead. The DCA 1201 may be located, for example, on either edge, or at the center, of a sub-band for contention detection. In FIG. 12, the DCA 1201a is located at the lower edge of the contention access sub-band. There may be one or more DCAs 1201 for an allocated contention based accessing area, and a UE may contend at one or more DCAs 1201, as directed by the NR-node for example. A UE may acquire the DCA 1201 from the system info or RRC signaling for static or semi-static configured DCA(s), may decode the DCA from the DL DCIs and dynamic grant-less UL transmission configurations for DCA(s), or may receive the DCA within a grant-less setup response from the NR-node.

A UE Access Pilot (UAP) 1203, unless otherwise specified, refers to a UE pilot or reference signal, which may be inserted at a given DCA 1201 to indicate that the UE is transmitting its data using the resources belonging to the given DCA 1201. The UAP 1203 may also be interleaved with the Grant-less UL Control Information (GLUCI) (e.g., mixed with the data on UL transmission) to help the NR-node decode the received GLUCI and demodulate the UL data. When interleaved with GLUCI, in some cases, the location of the UAPs may be different for each UE. A given UE may acquire the location for the UAPs from the system info or RRC signaling for static or semi-static configured UAP information. Alternatively, a given UE may decode UAP information from the DL DCIs and dynamic grant-less UL transmission configurations, or the UE may receive UAP information within a grant-less setup response from the NR-node. The UAP may be orthogonal among different UEs, such that a receiver at a given NR-node may use it to detect the UEs transmitting the UL data, and to estimate the channel for demodulating the UL data. The UAP may be designed with the UE ID in a sequence with the following properties, for example and without limitation: cyclically shifted versions of itself are orthogonal to one another, and cross-correlation between two prime lengths of the sequences is constant or near constant. An example of the implementation of orthogonal UAP may be a set of Zadoff-Chu sequences combined with UE IDs. The UAP at each DCA may also be used by other UEs to detect if the resources under the DCA are available or not for grant-less UL transmissions.

Unless otherwise specified, Grant-less UL Control Info (GLUCI) refers to information elements (IEs) containing various control information for UL grant-less transmissions, such as, for example and without limitation, coding rate, modulation, transmitting power level, UL transmission redundancy, code seed or index for UE defined multi-user multiplexing in code domain, etc.

Referring again to FIG. 12, in accordance with the illustrated example, at a first CTI 1202a for time interval $t_0$, across the frequency range, Device 1, Device 2, and Device 3 sense (listen to) the Dedicated DCA Areas (DCAs) indicated as C01 and C02, and determine that contention areas C01 and C02 are available for accessing by sensing that the C01 and C02 are below a predefined detection threshold, as an example. In the example, Device 4 senses at DCA C02 only, and also determines that C02 is available for accessing. In accordance with the illustrated example, Device 1 randomly selects UL resources belonging to DCA C01 by inserting its UAP at C01. Further, Device 1 transmits the first redundant version of its UL transmission at A02, and the second redundant version of its UL transmission at A03, for example, if its UL Transmission Redundancy value is two or more. In some cases, a UL transmission Redundancy value may be assigned by an NR-node dynamically via the DL control channel DCIs or an UL grant-less setup procedure, or defined by the UE and indicated to the NR-node via a GLUCI on the UL control channel. In the example, Device 2 and Device 3 both randomly select UL resources that belong to DCA C02, by inserting their UAPs at C02. Continuing with the example, Device 2 randomly selects B01 for its first redundant version of an UL transmission, B03 for its second redundant version, and B04 for its third redundant version, for example, if its UL Transmission Redundancy value is three or more. Device 3 randomly selects B03 for its first redundant version of UL transmission, and B02 for its second redundant version, for example, its UL Transmission Redundancy value is two or more.

Thus, as described above, in some cases, more than one Device may select the same frequency and time resource for transmitting a redundant version of their respective UL transmissions. In the illustrated example, Device 2 and Device 3 both select B03 for transmitting one of their redundant versions. In accordance with the illustrated example, in some cases, if enough orthogonality is built between the redundant version 2 transmission of Device 2 and the redundant version 1 of Device 3, the NR-node may be able to detect and differentiate the overlapped UL transmissions. Different non-orthogonal multiple access schemes have different mechanisms for building the multi-user orthogonality. For example, if the multi-user orthogonality is created in a code domain, then the NR-node and UEs for grant-less UL transmission may have an orthogonal code book. If the code book is not large enough to cover vast numbers of UEs such as mMTC devices, then the NR-node may assign the code to UEs based on their UL transmission schedule. For example, the NR-node may use a temporary code for the time duration that the UE is scheduled to set UL data; assign the code seed or index of the code book with the DL control channel Dices; assign the temporary code to UEs on demand; and/or assign a ground code seed or index to a group with each the UEs within the group may randomly generate code at different times if they have different schedules for grant-less UL transmission. The seed or index of the temporary code or group code of the code book may be assigned by NR-node dynamically via the DL control channel DCIs or an UL grant-less setup procedure, or defined by the UE and indicated to NR-node via a GLUCI on the UL control channel.

In other cases, for example, in which no orthogonality exists between two overlapped transmissions, the NR-node may still be able to decode the stronger UL data. The UL data may be stronger, for example, if is received with a higher signal to noise and interference ratio, as compared to other data, such that it can decoded by a receiver of the NR-node. If the NR-node is not able to decode the data, the NR-node may treat the overlapped transmissions as a collision and discard the received data. In such an example, with continuing reference to FIG. 12, the NR-node may still be able to successfully decode other non-overlapped transmissions from Device 2 and Devices 3. Further, the NR-node may combine UL transmission redundant versions 1 and 3 from Device 2. Therefore, devices that require ultra-high reliability may insert multiple redundant versions for their grant-less UL transmissions to avoid failures of UL data receptions due to, for example, poor channels or contention collisions. In accordance with the illustrated example, Device 4 waits for a back-off time, which may be randomly seeded by Device 4 or an NR-Node, before sensing that C02 has been taken by Device 2 and Device 3. Device 4 may sense that by determining that C02 is above a predefined detection threshold, for example. Accordingly, Device 4 may stop contention for C02 for the remaining time in the first CTI 1202*a*.

With continuing reference to the example illustrated in FIG. 12, at a second CTI 102*b* during time interval $d_1$, Device 1 continues its transmission over A1 and A3 by extending its UAP into DCA C1. Device 4 senses that DAC C12 is available and senses again that C12 is still available after a random back-off time. Device 4 inserts its UAP at C12 and randomly selects B1 for its UL transmission. At a third CTI 102*c* during time interval $2_T$, Device 4 continues its transmission over B2 by extending its UAP into DCA C2. In some cases, frequency hopping may be also applied in the 2D Priority Collision Avoidance Contention Access scheme described above. The hopping parameters may be statically or semi-statically configured, or may be assigned by an NR-node dynamically via the DL control channel DCIs or a UL grant-less setup.

Figures 13A, 13B:
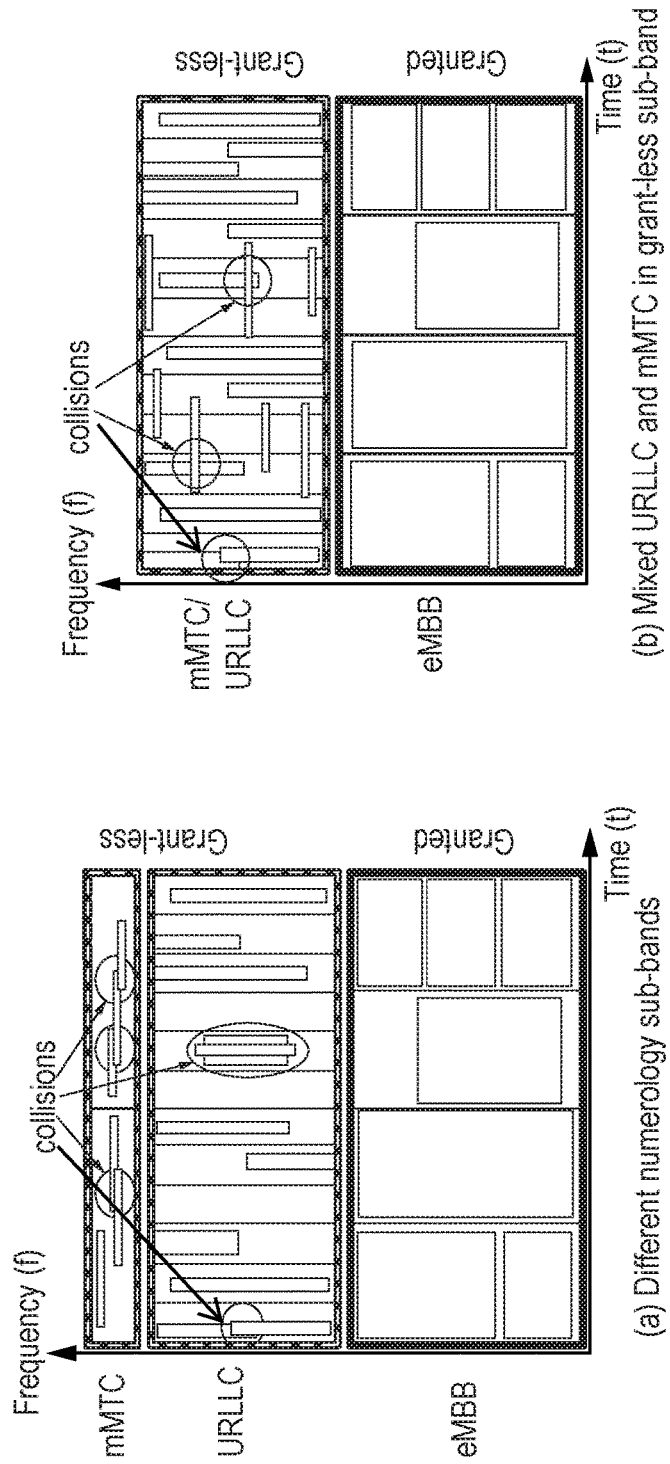
FIGS. 13A-C depict examples of contention-based access.
Figure 13C:
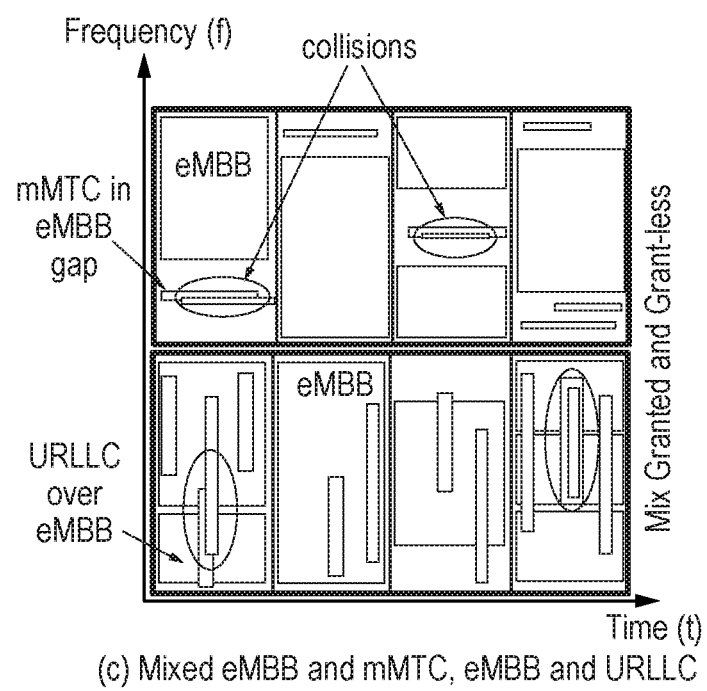

Turning now to Multi-user Orthogonality and Contention Management examples, with reference to FIGS. 13A-C, in accordance with grant-less UL transmissions, no UE is specifically granted UL transmission resources, or scheduled to use an UL transmission resource. Thus, in examples, grant-less UL transmissions are contention based, which may cause multiple UEs to contend for the same UL resources at the same time, thereby causing collisions as depicted in FIGS. 13A-C for different example scenarios.

If full or partial orthogonal multi-user multiplexing is applied, for example, it is recognized herein that advanced receivers at an NR-node of the access network may still be able to demodulate the collided messages from multiple UEs. But it is also recognized herein that collisions increase the inter-user interferences, which may degrade the system performance and also limit the system capacity. For example, the achievable SIR may be limited to a certain value, which may be dependent on the number of multiplexed UEs. In an example embodiment, to support ultra-reliable performance requirements for URLLC devices and massive connection requirements for mMTC devices, multi-user orthogonality with proper contention allocation is implemented in a NR network.

Non-Orthogonal Multiple Access (NOMA) schemes are generally code, sequence, or inter-leaver based. The multi-user orthogonality is realized by the orthogonal code book design, orthogonal or quasi-orthogonal sequence generation, or partial orthogonal inter-leaver pattern design. Therefore, multi-user orthogonality among large number of UEs is a challenge to build with limited orthogonal codes, sequences, or inter-leaver patterns. Building multi-user orthogonality with reduced collision possibility for contention based grant-less UL transmissions, in accordance with various embodiments, is now discussed.

In an example embodiment, multi-user orthogonality and contention management is implemented by reusing the code, sequence, or inter-leaver patterns in time, frequency, and space; and controlling the number of UEs that contend for the same resources at the same time for both collision based and collision avoidance multiple accessing schemes.

Figures 14A, 14B, 14C:
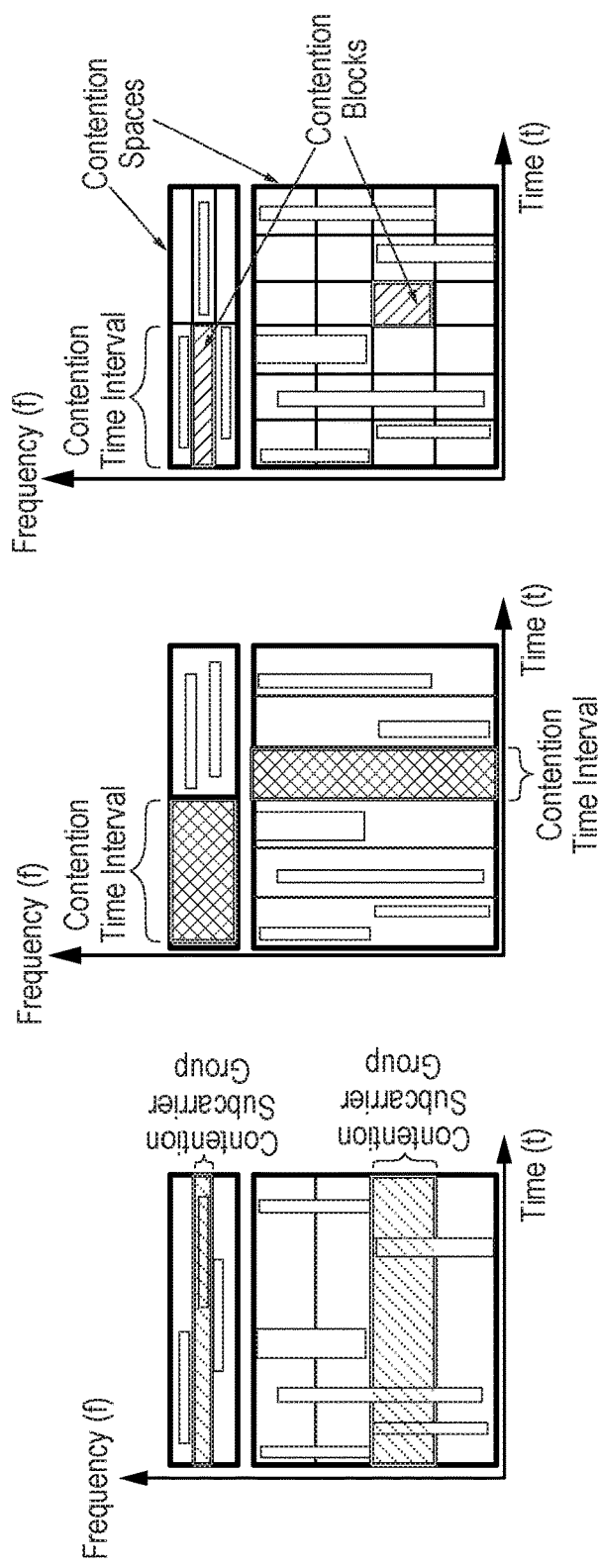
FIGS. 14A-C depict examples of contention spaces for grant-less access.

As used herein, unless otherwise specified, a Contention Subcarrier Group (COG) refers to a group of subcarriers allocated for contending for UL access. The COG may vary for different devices or services. For example, various contention subcarrier groups may have different system numerologies, as shown in FIG. 14A. As used herein, unless otherwise specified, the Contention Time Interval (CTI) refers to a time interval allocated for contending for UL access. This time interval may vary for different devices or services, and may have different system numerologies, as shown in FIG. 14B. As used herein, unless otherwise specified, a Contention Block (CB) refers to a block of resources defined by a specific Contention Timed Interval (CTI) and a specific Contention Subcarrier Group (COG). The size of the block may vary with respect to time and number of subcarriers for different devices or services, or for different system numerologies, as shown in FIG. 14C. As used herein, unless otherwise specified, a Contention Space (CS) refers to a set of Contention Blocks that UEs contend with the same spatial beams. A set of orthogonal or quasi-orthogonal codes, sequences, or inter-leaver patterns may be reused for different Contention Spaces.

With respect to a Multi-Dimension Contention Resource (MACRO): in a MIMO OFDM system, a UL resource may be defined in the dimensions of time, frequency and space. For example, micro (time(i), frequency(j), space(k)) may represent a resource of a Contention Block, which may be further described as: marc (CTI(i), COG(j), spatial-beam (k)), which is the unit that a UE contends for a UL transmission. A UE may contend for one or more contention blocks (CBs) in a Contention Space. For example, an mMTC device may contend for two CBs (e.g., CB(Cit$_i$, Cog) and CB(CTI$_{i+1}$, CSG$_j$)), for two contention time intervals CTI$_i$ and CTI$_{i+1}$ on the subcarrier group CSG$_j$, for an UL transmission in a Contention Space along the time axis with 1 spatial beam $b_k$, {mdrc[CB(CTI$_i$, CSG$_j$),$b_k$], mdrc [CB(CTI$_{i+1}$, CSG$_j$),$b_k$]}, using a set of codes, sequences, or inter-leaver patterns assigned by the NR-node. Continuing with the example, a URLLC device may contend for three CBs (e.g., CB(CTI$_i$, CSG$_j$), CB(CTI$_i$, CSG$_{j+1}$) and CB(CTI$_i$, CSG$_{j+2}$)) for three subcarrier groups CSG$_j$, CSG$_{j+1}$, and CSG$_{j+2}$ in the contention time interval CTI$_i$ in a Contention Space along the frequency axis for each of two spatial beams $b_k$ and $b_{k+1}$ for spatial redundance transmission, {mdrc[CB (CTI$_i$, CSG$_j$), $b_k$], mdrc[CB(CTI$_i$, CSG$_{j+1}$), $b_k$], mdrc[CB (CTI$_i$, CSG$_{j+2}$), $b_k$]; mdrc[CB(CTI$_i$, CSG$_j$), $b_{k+1}$], mdrc[CB (CTI$_i$, CSG$_{j+1}$), $b_{k+1}$], mdrc[CB(CTI$_i$, CSG$_{j+2}$), $b_{k+1}$]}, using a set of codes, sequences, or inter-leaver patterns assigned by the NR-node.

In some cases, to build multi-user orthogonality with a reduced collision possibility, the NR-node of a radio access network may define a Contention Space with a predetermined number of Contention Blocks dedicated to the Contention Space. Continuing with the example, the NR-node may further define a set of orthogonal or quasi-orthogonal codes, sequences, or inter-leaver patterns to be used by the group of UEs contending for this Contention Space. In some cases, the set of orthogonal or quasi-orthogonal codes, sequences, or inter-leaver patterns may be reused by different groups of UEs contending for different Contention Spaces. In this example, the collisions may occur only among the UEs contending in the same CS, and such collisions may be mitigated by multi-user orthogonality among the UEs contending in the same CS. In some examples, the Contention Spaces may be controlled and managed by a NR-node based on the following, presented by way of example and without limitation: access network available resources and accessibility; access network traffic characteristics and schedules; access network radio link measurements (e.g., link quality); the number of UEs in the relevant serving area; the total system through put, contention accessing delay, and contention failure rate; the device type and capabilities in the serving area; and/or other parameters associated with the UE, such as traffic type, data rate, data size, latency requirements, error rate, contention failure rate tolerance, and other service QoS requirements.

Turning now to static or semi-static multi-user orthogonality and contention configuration, as described above, URLLC devices may require short latency and high reliability for delivering small or medium size data, and mMTC devices may require low signaling overhead and reasonable reliability for delivering small data. To meet these requirements, among others, various UL contention allocations may be used, in accordance with various example embodiments, such as the example contention allocations depicted in FIGS. 13A-C. In some examples, a multi-user orthogonality and contention configuration may contain various parameters, such as, for example and without limitation: parameters that indicate a grant-less UL access allocation configuration and parameters that indicate a contention space allocation configuration. With respect to contention space allocation configurations, parameters may indicate, for example and without limitation, the available Contention Blocks (time, frequency); a set of orthogonal code indices, orthogonal sequence indices, or orthogonal interleaver pattern indices; types of devices and/or services to which the allocation applies, types of RAN slice to the which the allocation applies, a contention accessing type (e.g., collision based, contention avoidance, etc.); accessing priority and related random generation seed, code index, and/or other accessing parameters used for priority based contention accessing schemes; schedule or time duration allocated to this CS; numerologies supported; maximum CBs allowed in time and/or frequency per UE; and coding rate, modulation, etc. that is supported by the allocation.

With respect to a Static Configuration, the example allocations described herein may be preconfigured via a GUI (such as the GUI 3600) on the devices. In some cases, allocations may be configured by device manufacturers or service providers. Alternatively, an allocation may statically be provisioned on the device using Open Mobile Alliance Device Management (OMA DM) protocol or any other Over-The-Air (OTA) device provisioning protocol. This contention allocation, (e.g., contention space with the associated CBs and set of codes, sequences, or inter-leaver patterns) may be known to the devices prior to any communication session is established.

With respect to semi-static configuration, the example allocations described herein may also be broadcast to a UE through System Information, or signaled to a UE through common RRC signaling, dedicated RRC signaling, or MAC Control Element (MAC CE) signaling. For example, using common RRC signaling, an example allocation may be: periodically broadcasted or multi-casted by an NR-node as part of System Info in the RadioResourceConfigCommon-SIB as shown in Example A below; or aperiodically unicasted by an NR-node in an RRC message in the rrcConnectionReconfiguration message or MAC CE message as System Info on-demand.

In some examples, a UE may acquire the contention allocation information by searching the system information on a DL broadcasting or multicasting channel that is transmitted from an NR-node. In some examples, a given UE may send a request to the NR-node for the contention allocation information, as on-demand system information. The NR-node (e.g., NextGen RAN Node) may signal the contention configuration (allocation) to a UE in a response to a request from the UE, or as result of an autonomous NR-node decision.

EXAMPLE A

```
-- ASN1START
RadioResourceConfigCommonSIB ::=    SEQUENCE {
    rach-ConfigCommon               RACH-ConfigCommon,
    bcch-Config                     BCCH-Config,
    pcch-Config                     PCCH-Config,
    prach-Config                    PRACH-ConfigSIB,
    pdsch-ConfigCommon              PDSCH-ConfigCommon,
    pusch-ConfigCommon              PUSCH-ConfigCommon,
    pucch-ConfigCommon              PUCCH-ConfigCommon,
    soundingRS-UL-ConfigCommon      SoundingRS-UL-ConfigCommon,
    uplinkGrantlessControlCommon    uplinkGrantlessControlCommon
    uplinkGrantlessContentionCommon uplinkGrantlessContentionCommon
    uplinkPowerControlCommon        UplinkPowerControlCommon,
    ul-CyclicPrefixLength           UL-CyclicPrefixLength,
    ...,
    [[ uplinkGrantlessControlCommon-v1070   uplinkGrantlessControlCommon -v1070 OPTIONAL -- Need
    OR
    ]],
```

```
    [[ uplinkGrantlessContentionCommon-v1090   uplinkGrantlessContentionCommon -v1090 OPTIONAL
-- Need
OR
    ]],
    [[ uplinkPowerControlCommon-v1020   UplinkPowerControlCommon-v1020   OPTIONAL    -- Need
OR
    ]],
    [[ rach-ConfigCommon-v1250           RACH-ConfigCommon-v1250          OPTIONAL    -- Need OR
    ]],
    [[ pusch-ConfigCommon-v1270          PUSCH-ConfigCommon-v1270         OPTIONAL    -- Need
OR
    ]]
}
RadioResourceConfigCommon ::=      SEQUENCE {
    rach-ConfigCommon                RACH-ConfigCommon               OPTIONAL,  -- Need
ON
    prach-Config                     PRACH-Config,
    pdsch-ConfigCommon               PDSCH-ConfigCommon              OPTIONAL,  -- Need
ON
    pusch-ConfigCommon               PUSCH-ConfigCommon,
    phich-Config                     PHICH-Config                    OPTIONAL,  -- Need
ON
    pucch-ConfigCommon               PUCCH-ConfigCommon              OPTIONAL,  -- Need
ON
    soundingRS-UL-ConfigCommon       SoundingRS-UL-ConfigCommon      OPTIONAL,  -- Need
ON
    uplinkGrantlessControlCommon     UplinkGrantlessControlCommon    OPTIONAL,  -- Need
ON
    uplinkGrantlessContentionCommon  UplinkGrantlessContentionCommon OPTIONAL,  -- Need
ON
    uplinkPowerControlCommon         UplinkPowerControlCommon        OPTIONAL,  -- Need
ON
    antennaInfoCommon                AntennaInfoCommon          OPTIONAL,  -- Need ON
    p-Max                            P-Max                           OPTIONAL,  -- Need
OP
    tdd-Config                       TDD-Config                      OPTIONAL,  -- Cond
TDD
    ul-CyclicPrefixLength            UL-CyclicPrefixLength,
    ...,
    [[ uplinkGrantlessControlCommon-v1070  UplinkGrantlessControlCommon-v1070   OPTIONAL  -
- Need
ON
    ]],
    [[ uplinkGrantlessContentionCommon-v1090   UplinkGrantlessContentionCommon-v1090
       OPTIONAL       -- Need
ON
    ]],
    [[ uplinkPowerControlCommon-v1020   UplinkPowerControlCommon-v1020   OPTIONAL   -- Need
ON
    ]],
    [[ tdd-Config-v1130                 TDD-Config-v1130                 OPTIONAL   -- Cond TDD3
    ]],
    [[ pusch-ConfigCommon-v1270         PUSCH-ConfigCommon-v1270         OPTIONAL   -- Need
OR
    ]],
    [[ uplinkPowerControlCommon-v13xy   UplinkPowerControlCommon-v13xy   OPTIONAL   -- Need
ON
    ]]
}
RadioResourceConfigCommonPSCell-r12 ::= SEQUENCE {
    basicFields-r12                   RadioResourceConfigCommonSCell-r10,
    pucch-ConfigCommon-r12            PUCCH-ConfigCommon,
    rach-ConfigCommon-r12             RACH-ConfigCommon,
    uplinkGrantlessControlCommonPSCell-r17   UplinkGrantlessControlCommonPSCell-r17,
    uplinkGrantlessContentionCommonPSCell-r19  UplinkGrantlessContentionCommonPSCell-r19,
    uplinkPowerControlCommonPSCell-r12  UplinkPowerControlCommonPSCell-r12,
    ...,
    [[ uplinkPowerControlCommon-v13xy    UplinkPowerControlCommon-v13xy  OPTIONAL   -- Need
ON
    ]]
}
RadioResourceConfigCommonSCell-r10 ::= SEQUENCE {
    -- DL configuration as well as configuration applicable for DL and UL
    nonUL-Configuration-r10           SEQUENCE {
        -- 1: Cell characteristics
        dl-Bandwidth-r10                  ENUMERATED {n6, n15, n25, n50, n75, n100},
        -- 2: Physical configuration, general
        antennaInfoCommon-r10             AntennaInfoCommon,
        mbsfn-SubframeConfigList-r10      MBSFN-SubframeConfigList        OPTIONAL,  -- Need
```

```
OR
    -- 3: Physical configuration, control
        phich-Config-r10                    PHICH-Config,
    -- 4: Physical configuration, physical channels
        pdsch-ConfigCommon-r10              PDSCH-ConfigCommon,
        tdd-Config-r10                      TDD-Config                  OPTIONAL    -- Cond
TDDSCell
    },
    -- UL configuration
    ul-Configuration-r10                    SEQUENCE {
        ul-FreqInfo-r10                     SEQUENCE {
            ul-CarrierFreq-r10              ARFCN-ValueEUTRA            OPTIONAL,   -- Need
OP
            ul-Bandwidth-r10                ENUMERATED {n6, n15,
                                                n25, n50, n75, n100}    OPTIONAL,   -- Need
OP
            additionalSpectrumEmissionSCell-r10     AdditionalSpectrumEmission
        },
        p-Max-r10                           P-Max                       OPTIONAL,   -- Need OP
        uplinkGrantlessControlCommonSCell-r17   UplinkGrantlessControlCommonSCell-r17,
        uplinkGrantlessContentionCommonSCell-r19 UplinkGrantlessContentionCommonSCell-r19,
        uplinkPowerControlCommonSCell-r10       UplinkPowerControlCommonSCell-r10,
        -- A special version of IE UplinkPowerControlCommon may be introduced
        -- 3: Physical configuration, control
        soundingRS-UL-ConfigCommon-r10      SoundingRS-UL-ConfigCommon,
        ul-CyclicPrefixLength-r10           UL-CyclicPrefixLength,
        -- 4: Physical configuration, physical channels
        prach-ConfigSCell-r10               PRACH-ConfigSCell-r10       OPTIONAL,   -- Cond
TDD-OR-NoR11
        pusch-ConfigCommon-r10              PUSCH-ConfigCommon
    }                                                                   OPTIONAL,   -- Need OR
    ...,
    [[ ul-CarrierFreq-v1090                 ARFCN-ValueEUTRA-v9e0       OPTIONAL    -- Need
OP
    ]],
    [[ rach-ConfigCommonSCell-r11           RACH-ConfigCommonSCell-r11  OPTIONAL,   -- Cond
ULSCell
        prach-ConfigSCell-r11               PRACH-Config                OPTIONAL,   -- Cond
UL
        tdd-Config-v1130                    TDD-Config-v1130            OPTIONAL,   -- Cond TDD2
        uplinkGrantlessControlCommonSCell-v1170
                    UplinkGrantlessControlCommonSCell-v1170 OPTIONAL    -- Cond UL
        uplinkGrantlessContentionCommonSCell-v1170
                    UplinkGrantlessContentionCommonSCell-v1170   OPTIONAL    -- Cond
UL
        uplinkPowerControlCommonSCell-v1130
                    UplinkPowerControlCommonSCell-v1130 OPTIONAL    -- Cond UL
    ]],
    [[ pusch-ConfigCommon-v1270             PUSCH-ConfigCommon-v1270    OPTIONAL    -- Need
OR
    ]],
    [[ pucch-ConfigCommon-r13               PUCCH-ConfigCommon          OPTIONAL,   -- Cond UL
        uplinkGrantlessControlCommonSCell-v17xx UplinkGrantlessControlCommonPSCell-r17 OPTIONAL
    -- Cond UL
        uplinkGrantlessContentionCommonSCell-v19xx UplinkGrantlessContentionCommonPSCell-r19
    OPTIONAL    -- Cond UL
        uplinkPowerControlCommonSCell-v13xx UplinkPowerControlCommonPSCell-r12 OPTIONAL   --
Cond UL
    ]]
}
BCCH-Config ::=                 SEQUENCE {
    modificationPeriodCoeff         ENUMERATED {n2, n4, n8, n16}
}
PCCH-Config ::=                 SEQUENCE {
    defaultPagingCycle              ENUMERATED {
                                        rf32, rf64, rf128, rf256},
    nB                              ENUMERATED {
                                        fourT, twoT, oneT, halfT, quarterT, oneEighthT,
                                        oneSixteenthT, oneThirtySecondT}
}
UL-CyclicPrefixLength ::=       ENUMERATED {len1, len2}
-- ASN1STOP
BCCH-Config ::=                 SEQUENCE {
    modificationPeriodCoeff         ENUMERATED {n2, n4, n8, n16}
}
PCCH-Config ::=                 SEQUENCE {
    defaultPagingCycle              ENUMERATED {
                                        rf32, rf64, rf128, rf256},
    nB                              ENUMERATED {
```

```
                    fourT, twoT, oneT, halfT, quarterT, oneEighthT,
                    oneSixteenthT, oneThirtySecondT}
}
UL-CyclicPrefixLength ::=    ENUMERATED {len1, len2}
-- ASN1STOP
```

Turning now to Dynamic Multi-user Orthogonality and Contention Management, in addition to the static and semi-static configurations discussed above, the contention configuration (allocation) may also be conducted (e.g., activated and/or deactivated) dynamically via the DCIs on the DL control channel, in accordance with an example embodiment. It is recognized herein that various devices and services may have dynamic traffic patterns, availabilities, and the like, which may require that, in some cases, Multi-user Orthogonality and Contention is dynamically managed by an NR-node. Such dynamic management (e.g., activation, deactivation, re-configuration, etc.) may ensure that system resources are appropriately used to meet various grant-less UL performance requirements.

As used herein, unless otherwise specified, a Dynamic Access Configuration Time Interval (DACTI) refers to a fixed or variable time interval in which a specific Access Allocation scheme, either DL and/or UL, is applied. The length of a given DACTI may be signaled to UEs via common RRC signaling (e.g., in broadcasted or multi-casted system information), via dedicated RRC Connection Reconfiguration signaling, or via MAC CE signaling. A NR-node may also signal the DACTI to the UE as a response to a request from the UE, or as a result of an autonomous NR-node decision. By way of example of an autonomous NR-node decision, a NR-node may be configured to periodically signal a DACTI to the UEs under its coverage. The DACTI may also be signaled dynamically on the down link control channel via Downlink Control Information (DCI). As used herein, unless otherwise specified, an Access Configuration Signal refers to a signal that may be shared with other control signals or to a control signal that is dedicated to grant-less access configurations. As used herein, an Access Configuration Channel may be shared (e.g., shared between grant and grant-less) or dedicated (e.g., dedicated to grant or grant-less only) control channel. In some cases, Control Information Elements (IEs) of a DL control channel message may be used for indicating, for example and without limitation, a Dynamic Access Allocation configuration, a Contention Allocation configuration with the associated Contention Blocks, and orthogonal or quasi-orthogonal codes, sequences, or inter-leaver patterns. The NR-node may configure this DL shared or dedicated control channel through RRC signaling message. The NR-node may configure more than one DL shared or dedicated control channel for a UE. Once configured, the channel might be activated or deactivated. The NR node may activate or deactivate the channel through MAC CE signaling or RRC signaling.

Figure 15A:
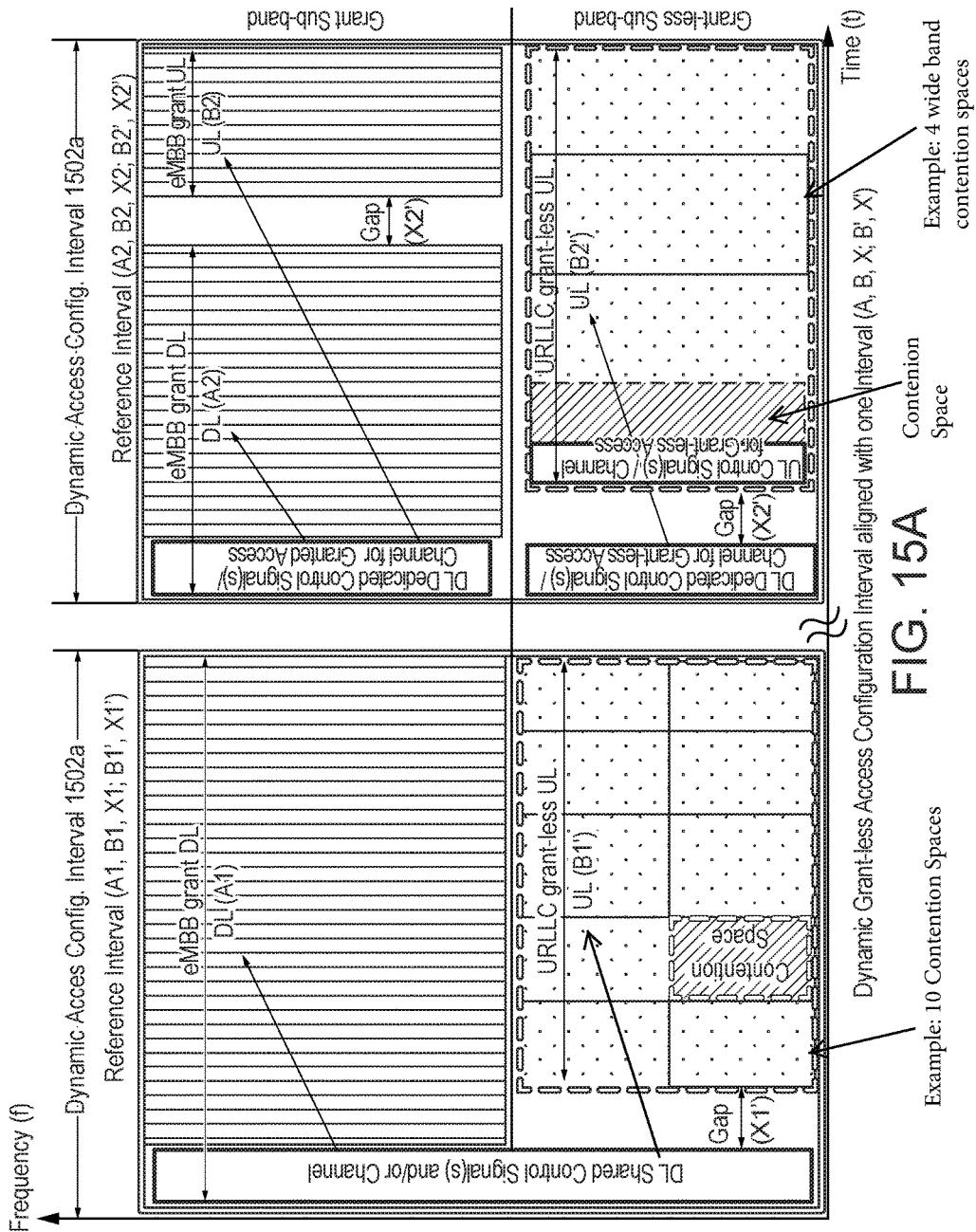
FIGS. 15A and 15B depict an example of a dynamic grant-less access configuration interval aligned with one and two intervals, respectively.
Figure 15B:
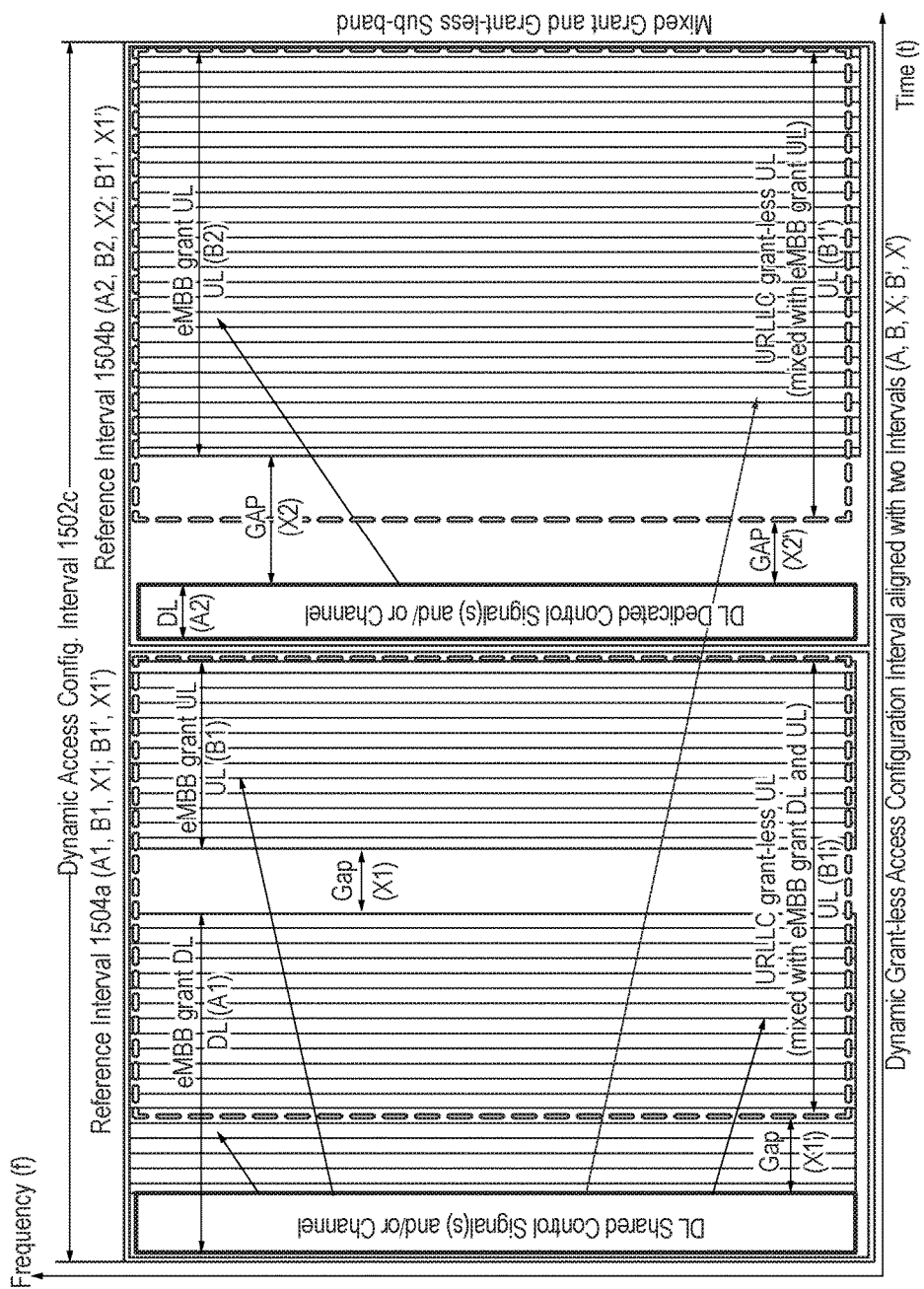

Referring now to FIGS. 15A and 15B, details of an example dynamic access allocation and contention allocation in the time and frequency domains are shown. As shown, the example Dynamic Access Configuration Time Intervals 1502a-c include the following variables: A, B, B', C, X, and X'. In accordance with the illustrated examples, A represents a grant DL time interval, B represents a grant UL time interval, B' represents a grant-less UL time interval, X represents a gap with respect to time between grant DL and UL intervals, and X' represents a gap with respect to time between grant DL control signal(s) (channels) and a grant-less UL interval.

The DL control channels may contain DCI for DL control and/or data configurations, UL control and/or data configuration (e.g., the grant-less access allocation, Contention Spaces with associated Contention Blocks, and orthogonal or quasi-orthogonal codes, UE sequences, or inter-lever patterns, etc.). The UL control channel may contain UCI for UL Tx configurations, DL Ack/Nack, etc.

In some cases, as shown in FIG. 15A, each Interval (A, B, X; B', X') may correspond within a respective DACTI 1502a and 1502b. In other examples, multiple containers, for instance intervals 1504a and 1504b, may be within one DACTI 1502c, for example, if the DCI for a given Grant-less UL are configured for multiple self-contained Intervals.

Figure 16A:
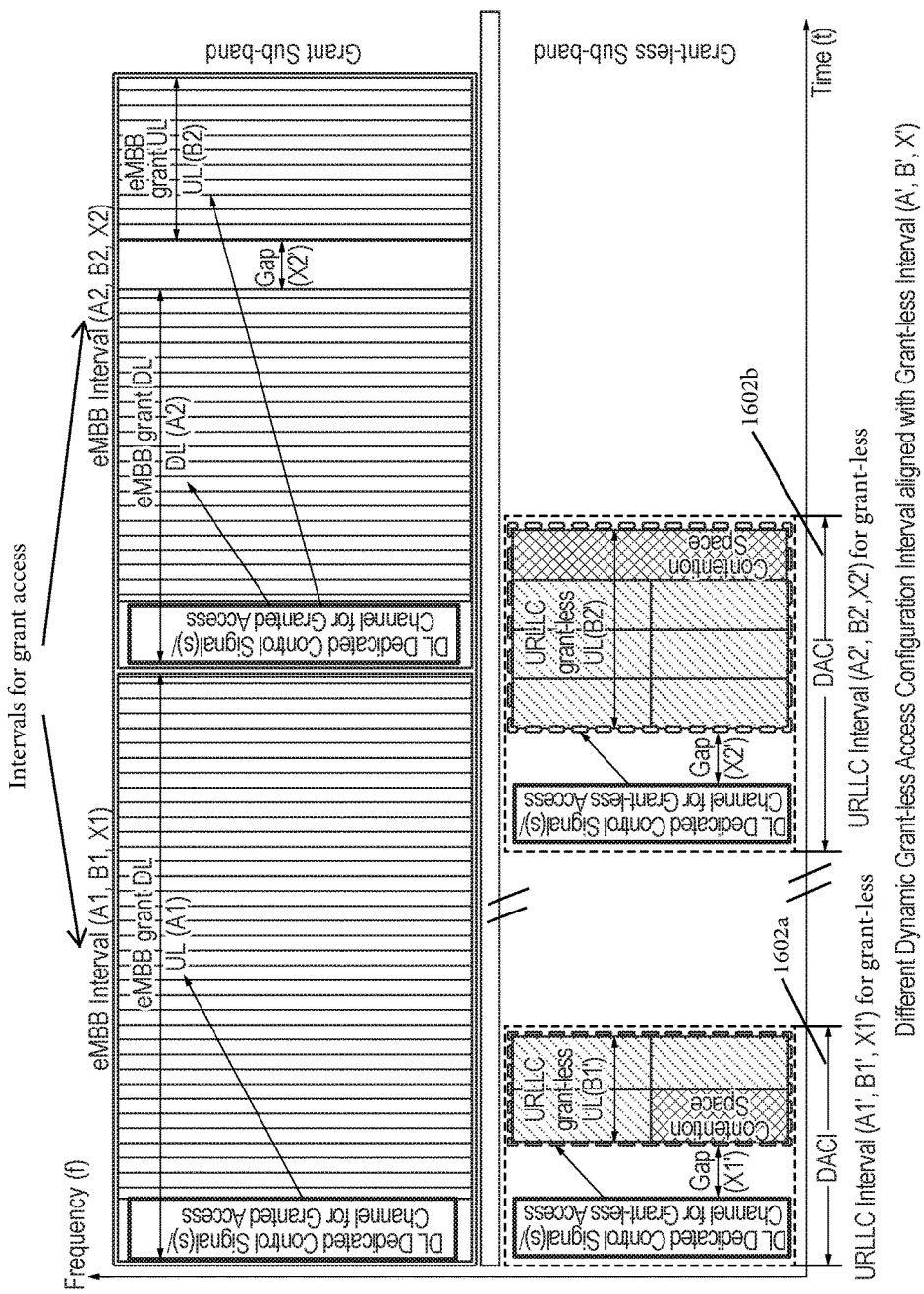
FIGS. 16A and 16B depict another example of a dynamic grant-less access configuration interval aligned with different grant-less intervals, such that the grant-less intervals are not aligned with the grant intervals.
Figure 16B:
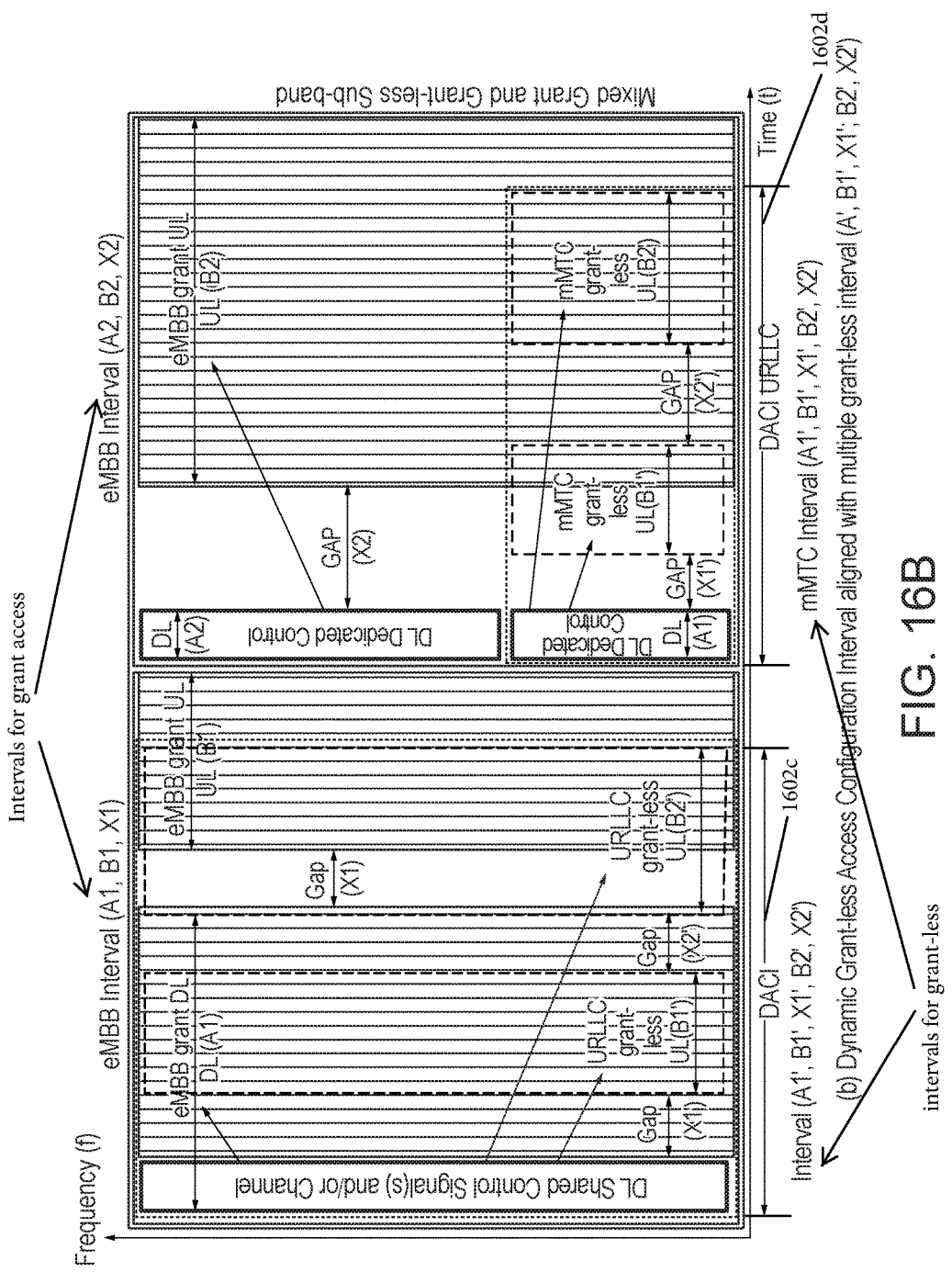

Another example of dynamic access allocation and contention allocation in the time and frequency domains is illustrated in FIGS. 16A and 16B, where the self-contained Intervals 1602a-d may include the following variables: A', B1', X1', B2', and X2'. In accordance with the illustrated examples, A' represents a grant-less DL time interval, B1' represents the grant-less first UL time interval, B2" represents the grant-less second UL time interval, X1' represents a gap with respect to time between the grant-less DL and the first UL, and X2' represents a gap with respect to time between a grant-less first UL and second UL.

Figure 17:
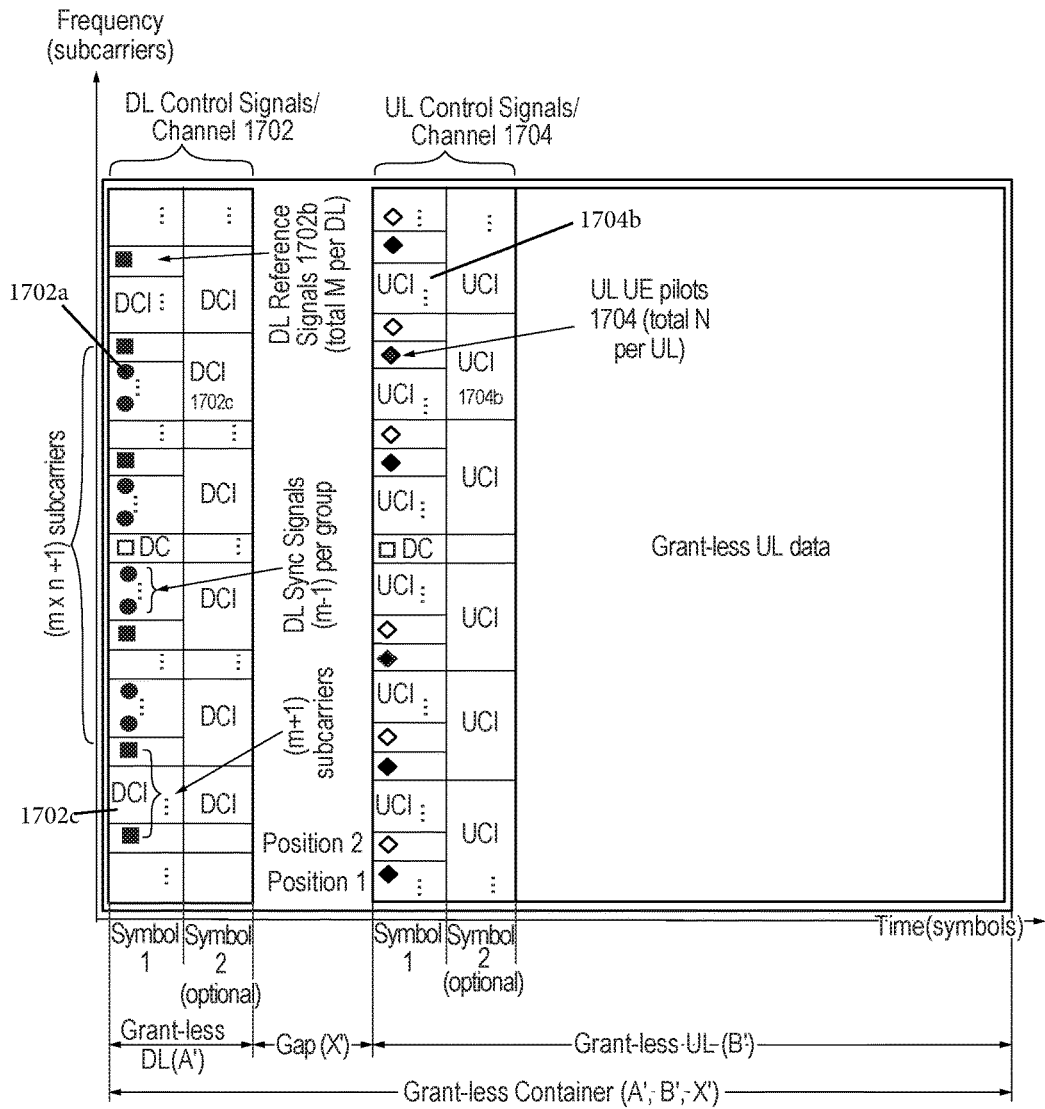
FIG. 17 depicts example physical control signals and channels for grant-less UL transmissions in accordance with an example embodiment.

Referring now to FIG. 17, example grant-less physical control signals and channels 1702 and 1704 are shown. In accordance with the example, DL Synchronization Pilots 1702a may be included in the DL control channel 1702. The DL Synchronization Pilot may be used for fast synchronization in frequency (e.g., subcarrier spacing) and time (e.g., for TA estimation as described above) prior to a grant-less UL transmission, while switching from a Grant-less Inactive state to a Grant-less Active State. DL reference signals 1702b may include in the DL control channel 1702. The DL Reference Signal 1702b may be used for radio channel estimation and radio link measurements, e.g. received power of the reference signals may be used for UL path loss estimation as proposed above). It is recognized herein that the reference signal sequence needs to be designed with good orthogonality or quasi-orthogonality to avoid intra-call interference among different TRPs and limit the inter-call interference at the cell edge. M sequence may be an example for its implementation. DL Control Information (DCI) 1702c may be included in the DL control channel 1702. DCI may contain the grant-less UL transmission configurations, which may include various parameters, for example and without limitation: grant-less access allocation parameters; grant-less Contention Space allocation parameters, Grant-less Contention Blocks; a set of codes, sequences, or inter-leaver patterns for UL NOMA; a DL reference signal's transmit power level; a coding rate and modulation for UL; parameters related to accessing priority and related random generation seed, code index, and/or other accessing parameters used for priority based contention accessing schemes; a schedule or time duration allocated to this CS (e.g., number of Intervals in time); an indication of numerologies supported; or a maximum number of CBs allowed in time and/or frequency per UE.

Still referring to FIG. 17, UL UE pilots 1704*a* may be included in the UL control channel/signal 1704. The UL UE pilot 1704*a* may be used to indicate the UE to the NR-node receiver (e.g., differentiated from other UEs sending grant-less UL transmissions). In an example, the pilot 1704*a* includes an ID of the UE. In another example, the pilot 1704*a* is scrambled with the UE ID assigned during attachment or a grant-less setup with the NR-node. To reduce the possible collision among UEs pilots, a UE, in some examples, may randomly select the start location for its pilot. For example, the UE may randomly select position 1 or 2 at the start point for its pilot as shown in FIG. 17. The selection of the position of the pilot may also be based, at least in part, on the UE ID. UL Control Information (UCI) 1704*b*, which may be included in the UL control signal/channel 1704 may contain the grant-less UL transmission configurations, which may include the following indications, presented by way of example and without limitation: an index of codes, sequences, or inter-leaver patterns for UL NOMA; the UL reference signal's transmit power level; Next transmission or schedule update Coding rate and modulation for UL; a number of CBs used for the UL transmission; a redundancy indication and index; latency indication for successful UL contention; a failure rate for UL contention; radio link measurements; and a device capability or service type that corresponds to the UCI.

Figure 18:
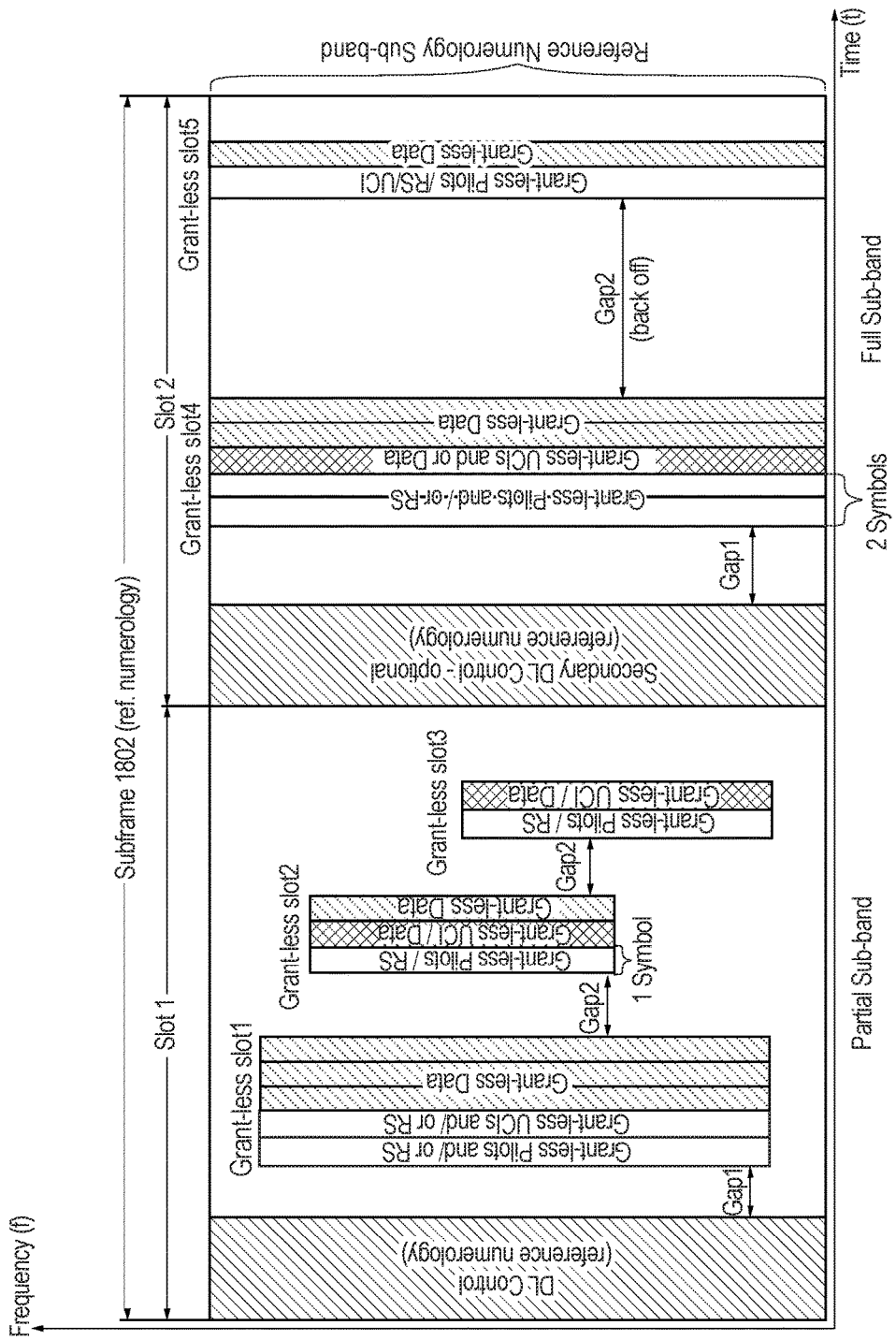
FIG. 18 shows an example of grant-less slot types with UL only (wide band)

Turning now to Grant-less UL Transmissions in a Subframe, with initial reference to FIG. 18, in an example subframe 1802 of a reference numerology, different kinds of grant-less slots may be allocated differently. Example wide band Grant-less Slots 1-5 are illustrated in FIG. 18. Different partial sub-band Grant-less Slots 1-3 are shown in Slot 1 of the reference numerology within the Subframe 1802, which may be statically configured (e.g., in SI), semi-statically signaled (e.g., RRC or MAC CE), or dynamically indicated (e.g., DCIs in the DL control channel in Slot 1), and different full sub-band Grant-less Slots 4 and 5 are shown in Slot 2 of the reference numerology within the Subframe 1802, which may be statically configured (e.g., in SI), semi-statically signaled (e.g., RRC or MAC CE), or dynamically indicated (e.g., DCIs in the DL control channel in Slot 1 or the Secondary DL control channel in Slot 2).

Figure 19:
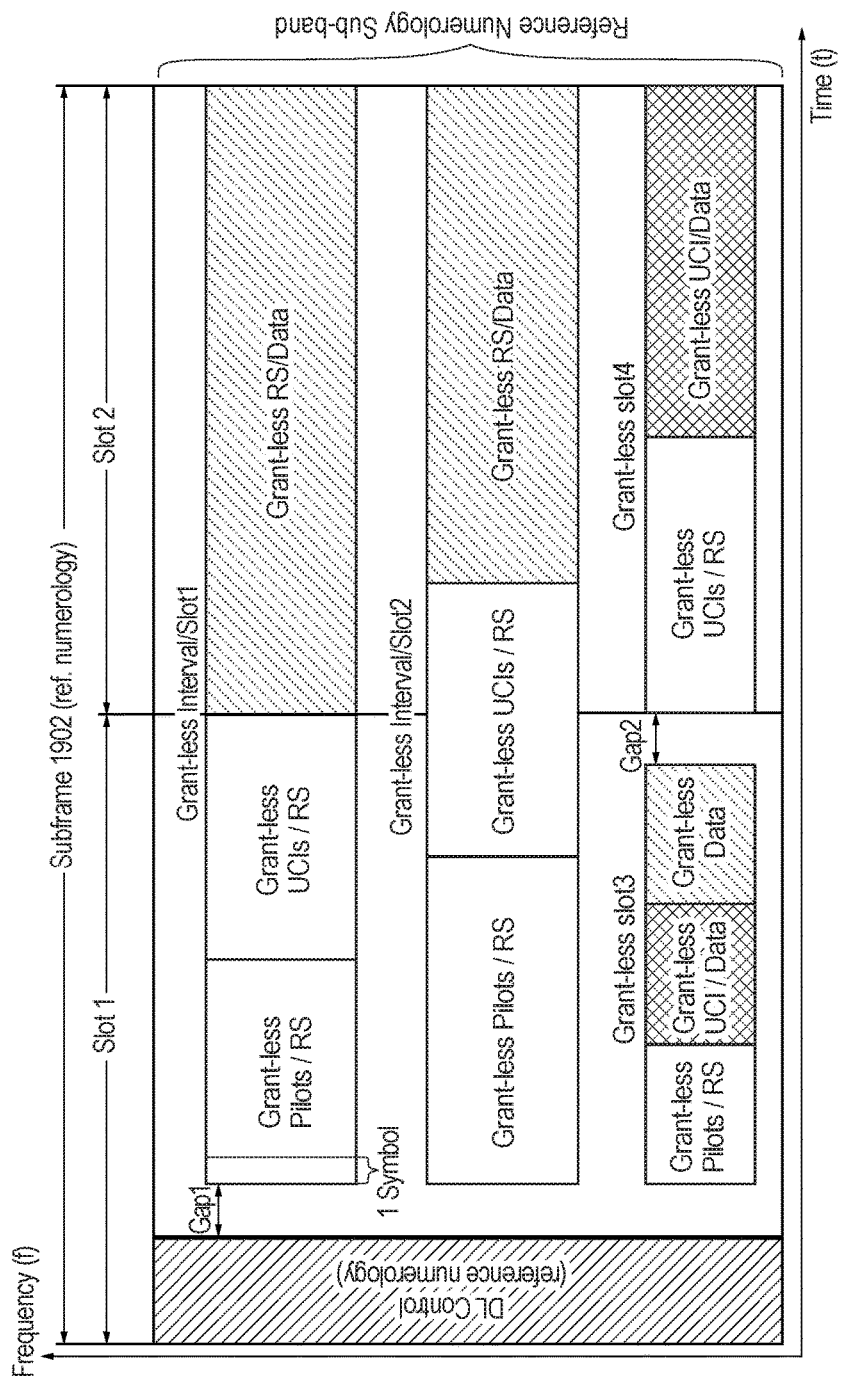
FIG. 19 shows an example of grant-less interval/slot types with UL only (narrow Band)

Example narrow band Grant-less Interval/Slots 1-5, which may cross the slot boundary of the reference numerology, such as shown by Grant-less Interval 1 and Grant-less Interval 2, are illustrated in FIG. 19. Different Grant-less Intervals or Slots are shown in an example subframe 1902 of the reference numerology. The Grant-less Interval/Slots 1-5 may be pre-defined or pre-configured by the system administration; statically or semi-statically configured via a higher layer, such as viaRRC signaling or MAC CEs; or dynamically signaled by the Grant-less DCIs carried on a DL Control Channel and/or a Secondary DL Control channel, if applicable.

Figure 20:
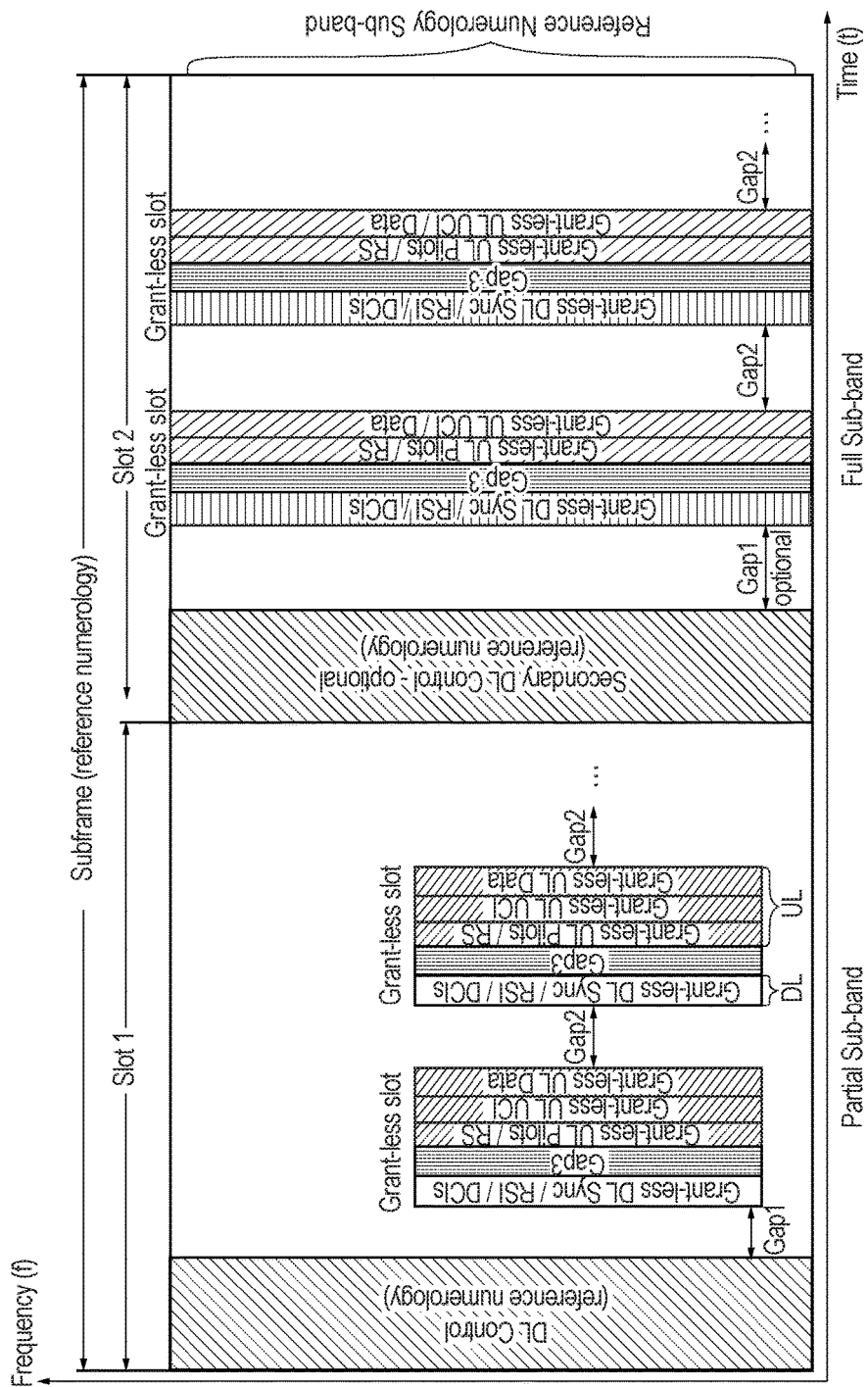
FIG. 20 shows an example of a grant-less slot configuration with DL and UL (wide Band)
Figure 21:
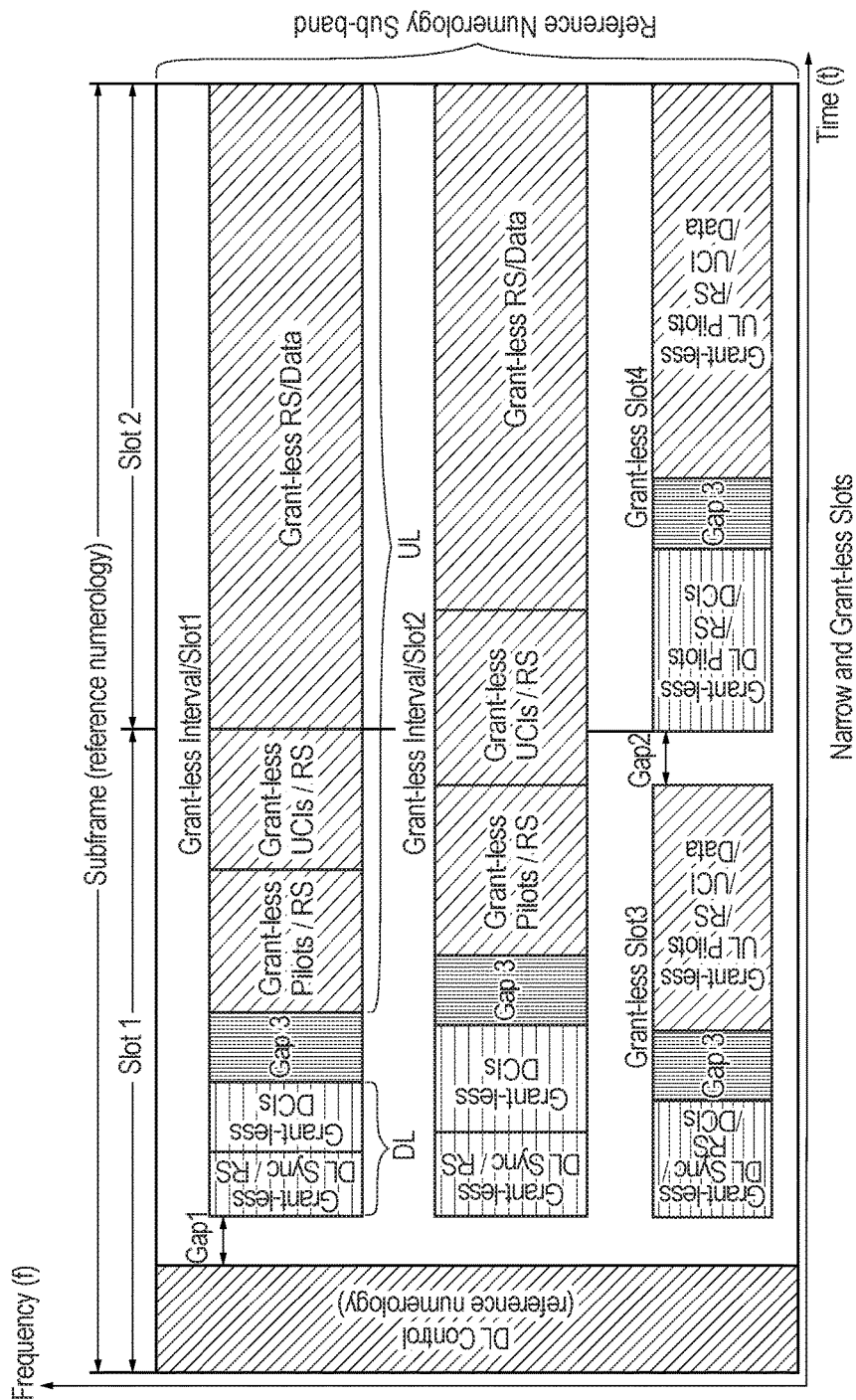
FIG. 21 shows an example of a grant-less slot configuration with DL and UL (narrow Band)

Examples of Grant-less Slot (e.g., Grant-less mini-slot) configurations, which may be statically configured (e.g., in SI), semi-statically signaled (e.g., RRC or MAC CE), or dynamically indicated (DCIs in the DL control channel in Slot 1 or Slot 2), containing Grant-less DL Signals and/or Control Info (e.g., DCI), Grant-less UL Pilots/Preambles, Control Info (e.g., UCI), and Data are illustrated in FIG. 20 and FIG. 21. A Grant-less Slot configuration, such as the example configurations shown in FIGS. 18-21, may contain the following parameters, presented by way of example and without limitation: Gap 1, which may refer to a gap in time from the DL Control of the reference numerology, which may dynamically indicate the Grant-less slot configuration with the reference numerology (e.g, Slot 1), or from the secondary DL control that may dynamically indicate the Grant-less slot configuration with the reference numerology sot (e.g., Slot 2), if applicable; Gap 2, which may be optional, and which may refer to a in time between Grant-less Slots; Length of a Grant-less DL, which may refer to a number of symbols carrying Grant-less; DL Sync, for time and frequency synchronization; DL Reference Signals for DL path loss, DL propagation delay, DL radio link measurements, and for decoding the DL Control Info; DL Control Info carrying the configurations for the Grant-less UL transmission, such as a contention resource pool (e.g., Contention Space) allocation (partial sub-band of full sub-band in frequency) in the unit of Contention Blocks, or a grant-less signature pool (e.g., UE pilots) to differentiate multiple UEs that are multiplexed; an NR-node DL time stamp; a DL Reference Signal power level; hybrid automatic repeat request (HARQ) or re-transmission scheme; Length of the Grant-less UL, which may indicate a number of symbols carrying the Grant-less; UL UE pilots/preambles used; UL Control Info (UCI) for supporting the NR-node to decode the UL Data (e.g., UE ID, Contention Blocks used, UL HARQ scheme, Index of the UL Signature, re-transmission scheme and/or redundancy index, UL Reference Signal power level, Radio link measurement, Latency for successful UL contention or failure rate for UL contention, Device capability or service type, location, mobility, schedule (e.g. next UL transmission), etc.); UL Data, which may be carried on the same symbol carrying the UL UCIs for small size data if wide band Grant-less is configured; and Gap 3, which may refer to gap in time between the Grant-less DL and UL (if applicable).

Figure 22:
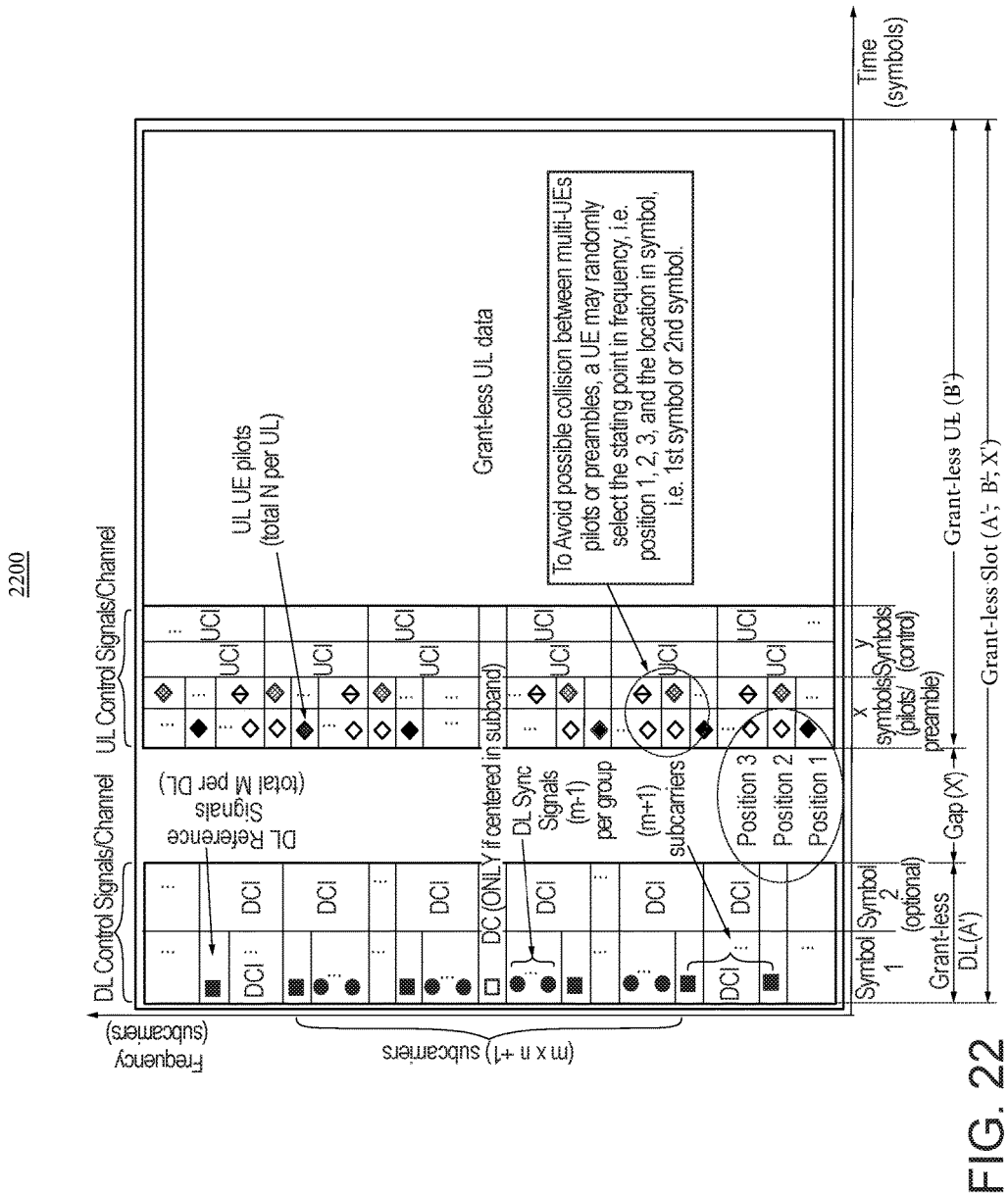
FIG. 22 shows an example of a grant-less slot structure and content.

The above mentioned example configuration parameters or control info may be pre-defined or pre-configured by the system administration, or statically or semi-statically configured by a higher layer, such as via RRC signaling or MAC CEs, or dynamically indicated by the DCIs in one or more DL control channels, such that a UE may determine from the parameters where a Grant-less slot is allocated. The UE, based on the received parameters, may also identify the parameters and/or control info associated with the slot structure and DL and UL configurations. An example Grant-less Slot structure and contents 2200 are depicted in FIG. 22.

Figure 23A:
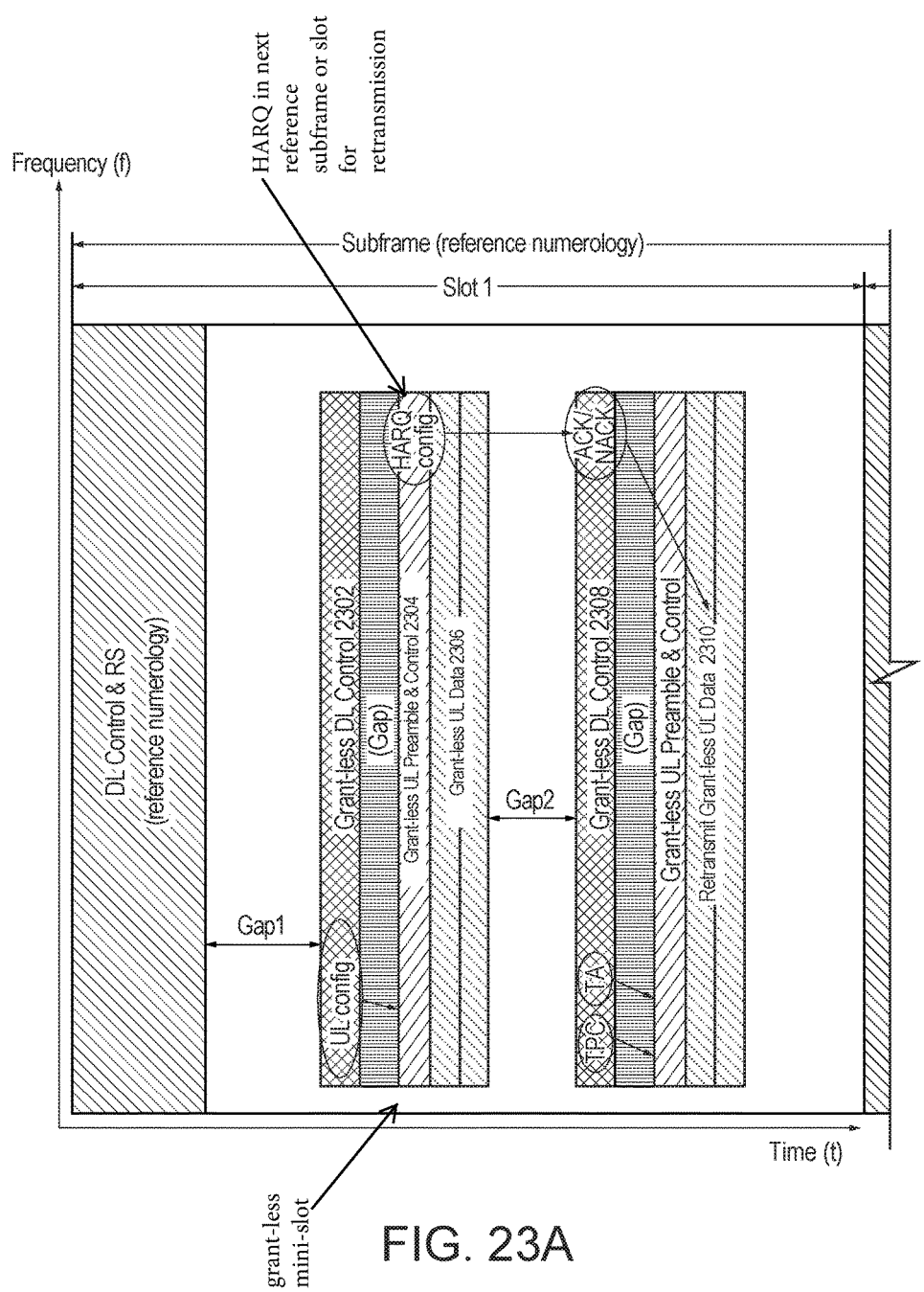
FIGS. 23A and 23B show an example of retransmission in wide band grant-less mini-slots, in accordance with an example embodiment.
Figure 23B:
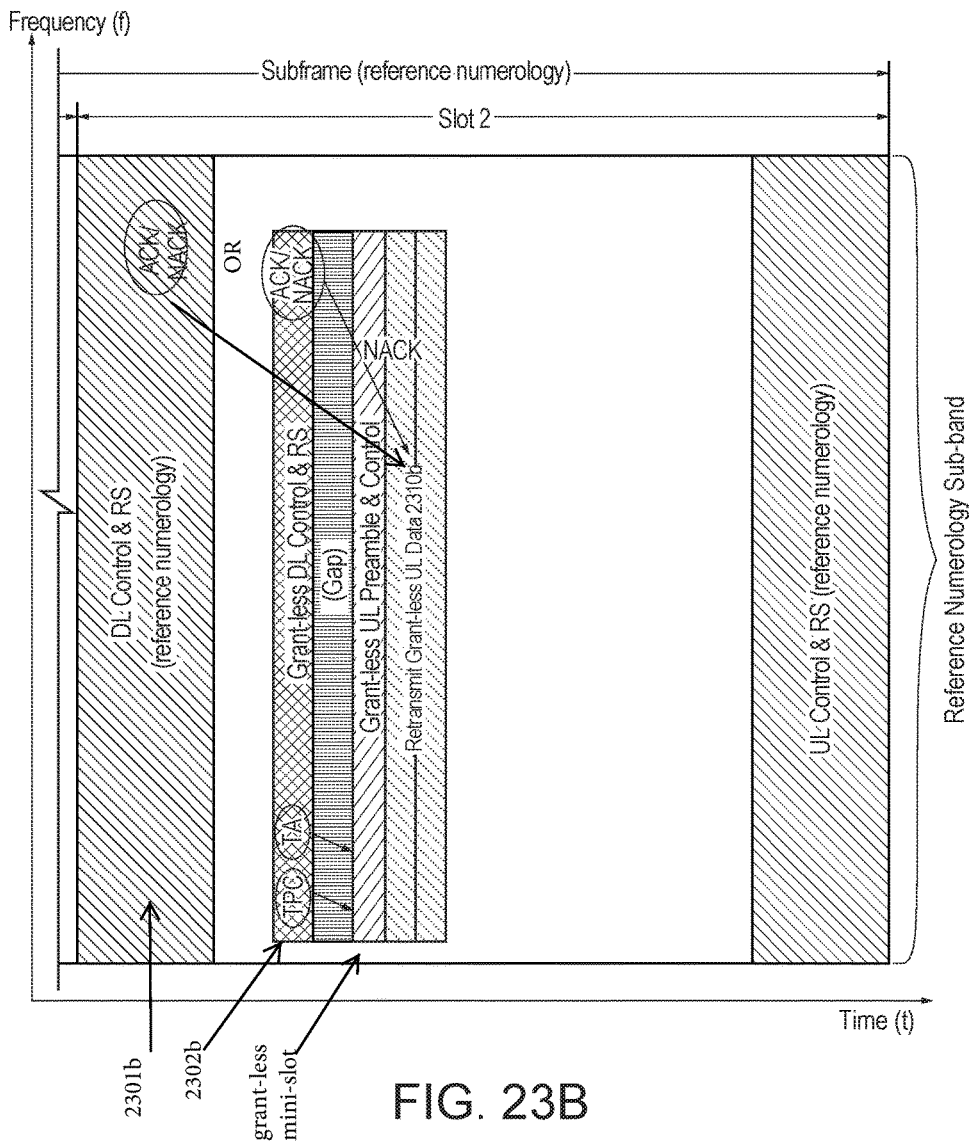
Figure 24A:
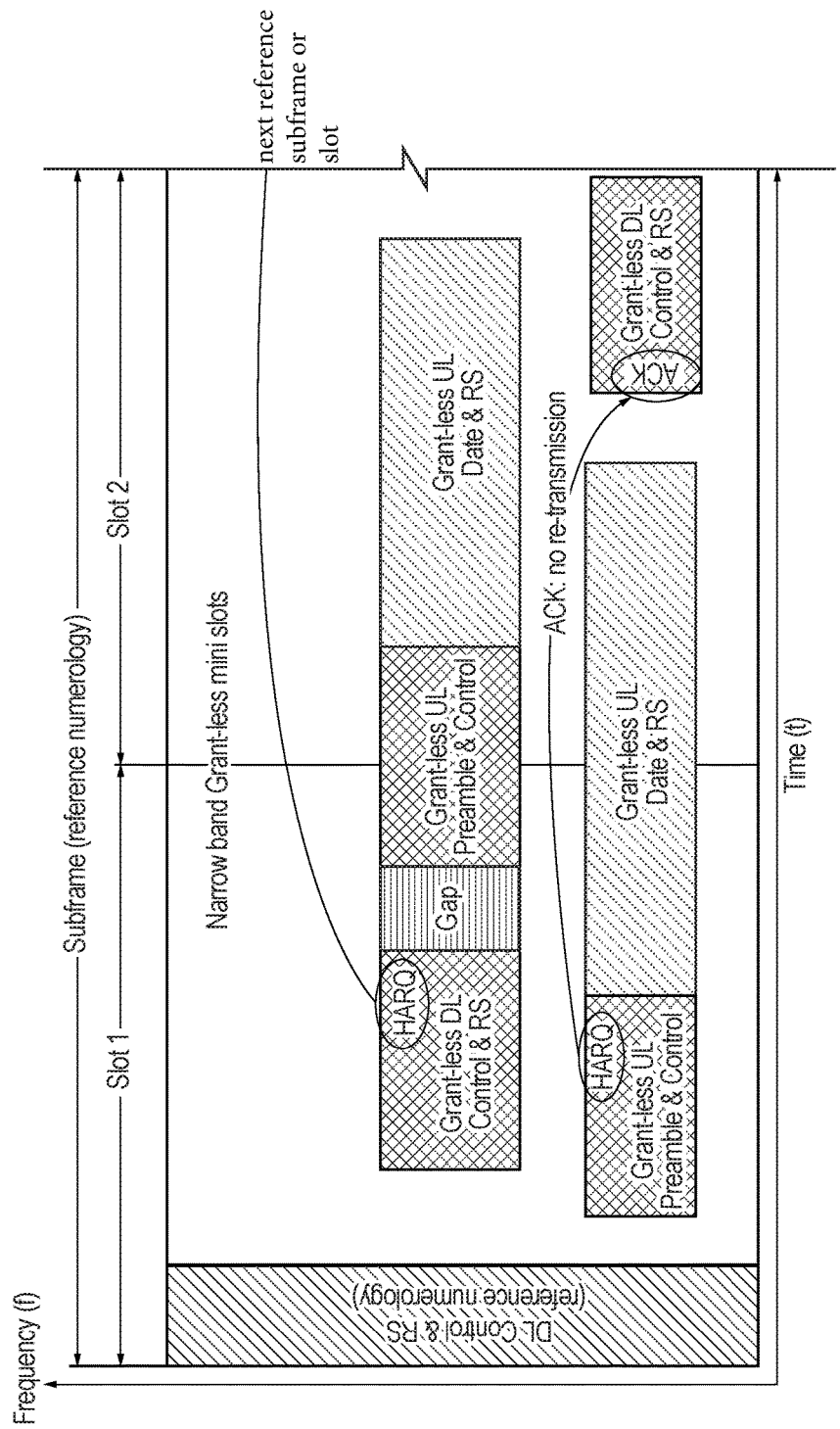
FIGS. 24A and 24B show an example of retransmission in narrow band grant-less mini-slots, in accordance with an example embodiment.
Figure 24B:
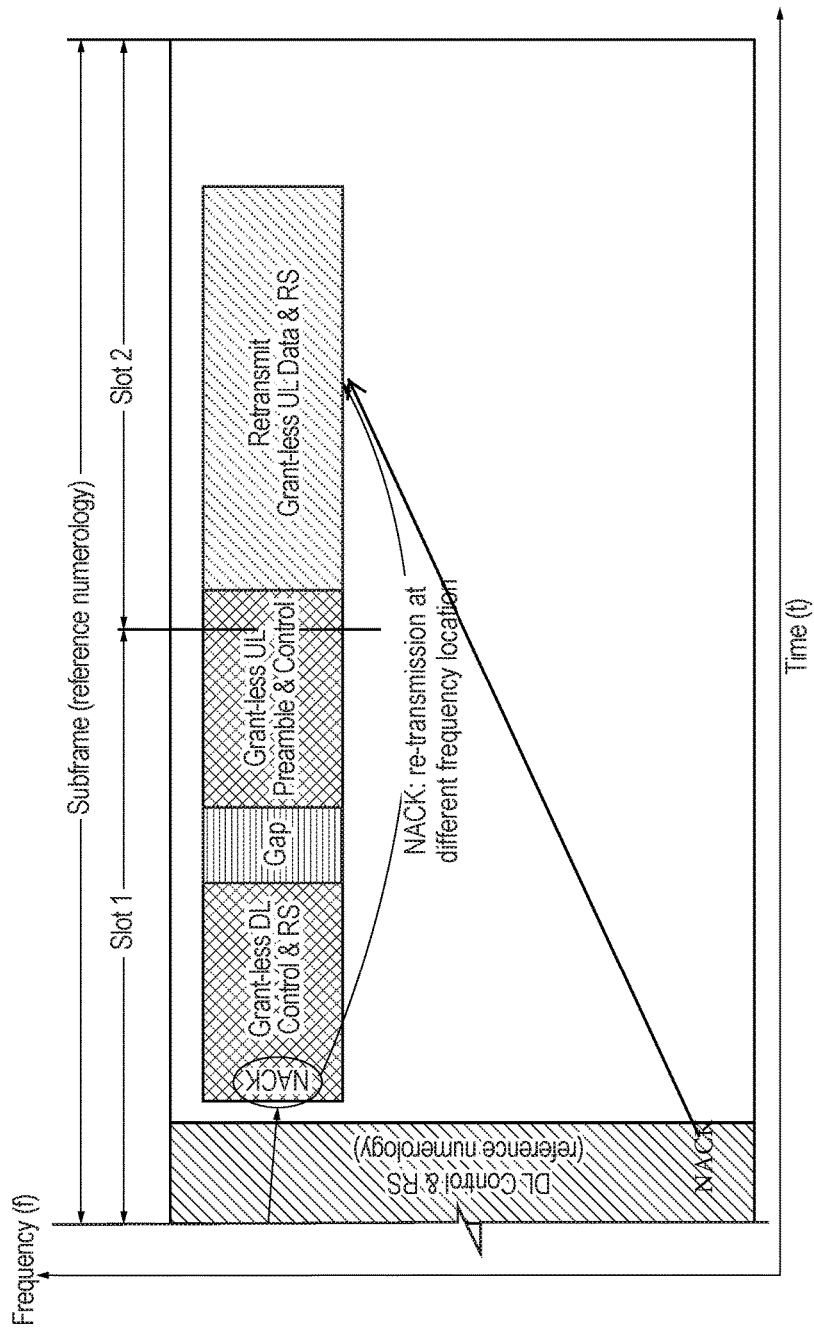

Referring now to FIGS. 23A and 23B, retransmissions in wide band grant-less mini-slots are illustrated in accordance with an example embodiment. FIGS. 24A and 24B depict example retransmissions in narrow band grant-less mini-slots in accordance with another example embodiment. As shown, for example, a Grant-less DL control channel 2302 may contain DCI for configuring the Grant-less UL transmission(s), and the Grant-less UL control channel 2304 may contain UCI for a hybrid automatic repeat request (HARQ) scheme for the grant-less UL transmission 2306. For example, the HARQ, such as a ACK/NACK delivery with the next Grant-less mini-slot 2308 for example. The ACK/NACK may be sent in the same reference numerology slot on the Grant-less DL control as transmission 2306 (e.g., Slot 1 as shown in FIG. 23A) or the next slot reference numerology slot (e.g., Slot 2 as shown in FIG. 23B) on a shared DL control 2301*b* or a Grant-less DL control 2302*b*. The ACK/NACK carried on the Grant-less DL control channel 2308 in the next Grant-less mini-slot determines whether the grant-less UL data is re-transmitted at 2310/2320*b* or not. For example, if a NACK is received, in some cases, the UL portion 2306 of the Grant-less mini-slot 2306 is retransmitted. In some examples, a Time Adjustment (TA), a Transmit Power Control (TPC), a Modulation and Coding Scheme (MCS), etc. are carried on the Grant-less DL control channel in the next Grant-less mini-slot, such that the retransmission parameters are indicated. As shown, for example in FIG. 24B, the retransmission may be conducted at a different frequency from the original transmission.

Referring now to FIGS. 25A to 26B, an example system 2500 is shown which includes an mMTC UE 2502, an NR-node 2504, and a core network (CN) 2506. The NR-node 2504 comprises a RAN slice management function or apparatus (node) 2508 and an mMTC slice 2510. The CN 2506 includes a CN Slice Management function or apparatus (node) 2512 and an mMTC slice 2514. The mMTC 2514 may include a mobility management node or apparatus 2516, gateways 2518 (e.g., SWG, PGW) and a subscription management function or apparatus (node) 2520 (e.g., HSS). It will be appreciated that the example system 2500 is simplified to facilitate description of the disclosed subject matter and is not intended to limit the scope of this disclosure. Other devices, systems, and configurations may be used to implement the embodiments disclosed herein in addition to, or instead of, a system such as the system illustrated in FIGS. 25A to 26B, and all such embodiments are contemplated as within the scope of the present disclosure.

Figure 25A:
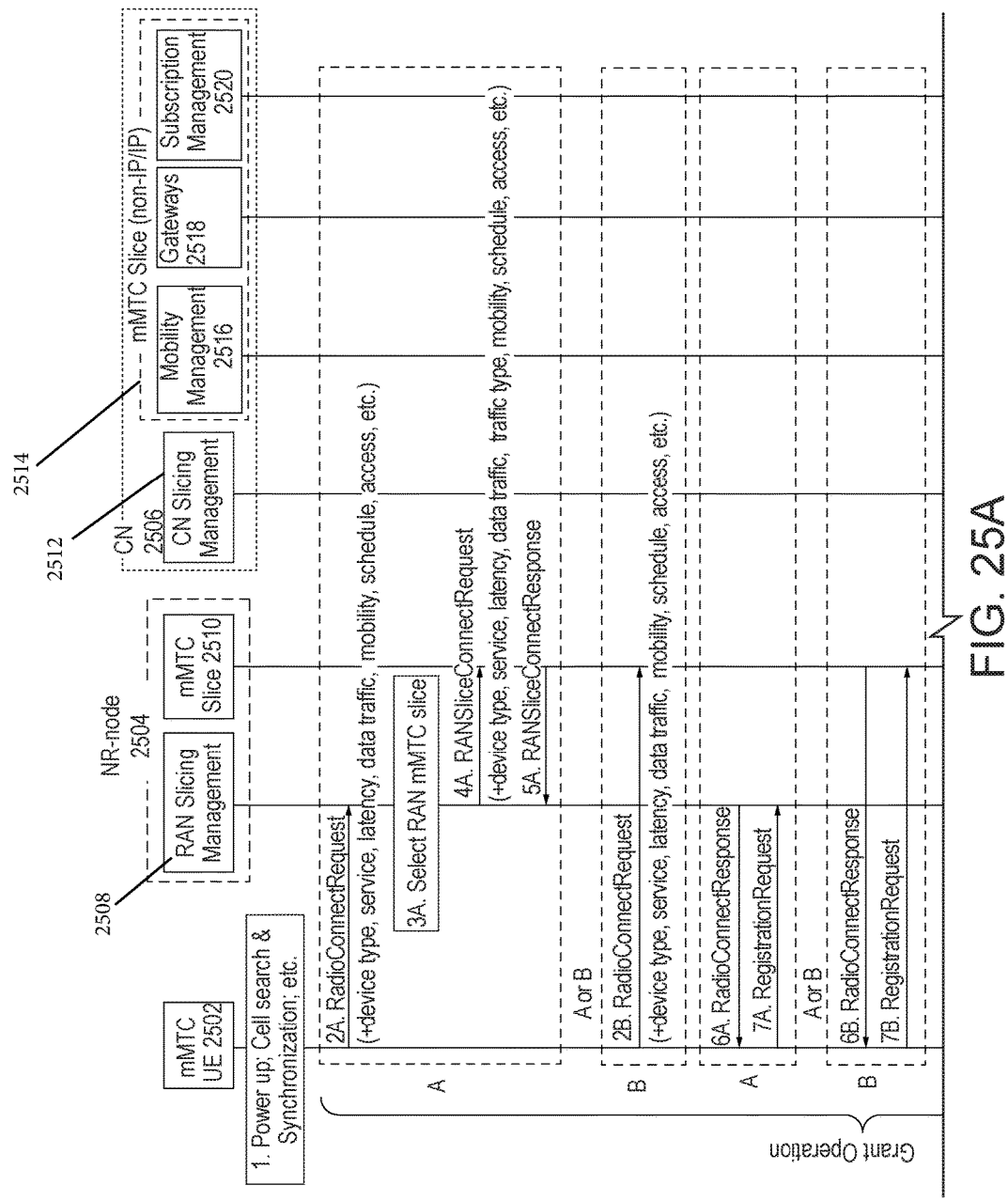

Referring in particular to FIG. 25A, at 1, in accordance with the illustrated example, the UE 2502 after power up. After powering, the UE 2502 may conduct cell search and synchronization, and then the UE may acquire system information, for example, from MIB and SIBs. At 2, the UE 2502 sends a Radio Connection Request to the NR-node 2504. In particular, the UE may send Radio Connection Request message to the RAN slicing management apparatus 2508 (at 2A) or the mMTC slice 2510 (at 2B). The request may be a request for access to a UE selected RAN slice 2510 at the NR-node 2504. The request may include various context information associated with the UE 2502. The context information may include, for example and without limitation, a device type (e.g., mMTC, URLLC) of the UE 2502, a service associated with the UE 2502 (e.g., forest fire monitoring or traffic monitoring), a latency requirement (e.g, 100 ms or ultra-low latency of 0.5 ms, data traffic context (e.g., data packet size or data rate), a traffic type (e.g., non-IP or IP based); mobility context associated with the UE 2502 (e.g., static, pedestrian, vehicular), a planned schedule of data transmissions from the UE 2502, type of access that can be performed by the UE 2502 (e.g., grant access, grant-less access, or access that switches between grant and grant-less). In some cases, operations 3, 4, and 5 are not performed when the UE selects the slice 2510.

In some cases, for example when the UE 2502 does not select a slice, the RAN Slicing Management 2508, at 3A, selects the slice 2510 as the UE's radio accessing slice, for example, based on the UE context in the request at 2A. The selection may further be based on RAN traffic loading and resource allocations. At 4A, in accordance with the illustrated example, the RAN Slicing Management 2508 sends a RAN Slice Connection Request to the mMTC Slice 2510 that was selected. The request may also forward all or some of the UE's context from 2A, so that a radio connection can be established between the UE 2502 and the mMTC slice 2510. At 5A, the mMTC Slice 510 may send a RAN Slice Connection Response to the RAN Slicing Management 2508. The response may indicate whether the slice connection request has been accepted. If the request is rejected, the one or more reasons for the rejection may be included in the response message.

At 6, in accordance with the illustrated example, the RAN Slicing Management 2508 (at 6A) or the mMTRC Slice 2510 (at 6B) sends a RAN Slice Connection Response to the UE 2502. In this message, the RAN Slice Management 2508 or the RAN mMTC Slice 2510 may confirm whether the radio connection request has been accepted. If the request is rejected, one or more reasons for the rejection may also be included in the response message. In the illustrated example, the UE 2502 receives a confirmation that a successful radio connection with the mMTC Slice 2510 has been established. At 7, the UE may send a registration request to the RAN Slicing Management 2508 (at 7A) or the RAN mMTC Slice 2510 (at 7B). The registration request may be sent to establish a secured service connection with the Core Network (CN) 2506.

Figure 25B:
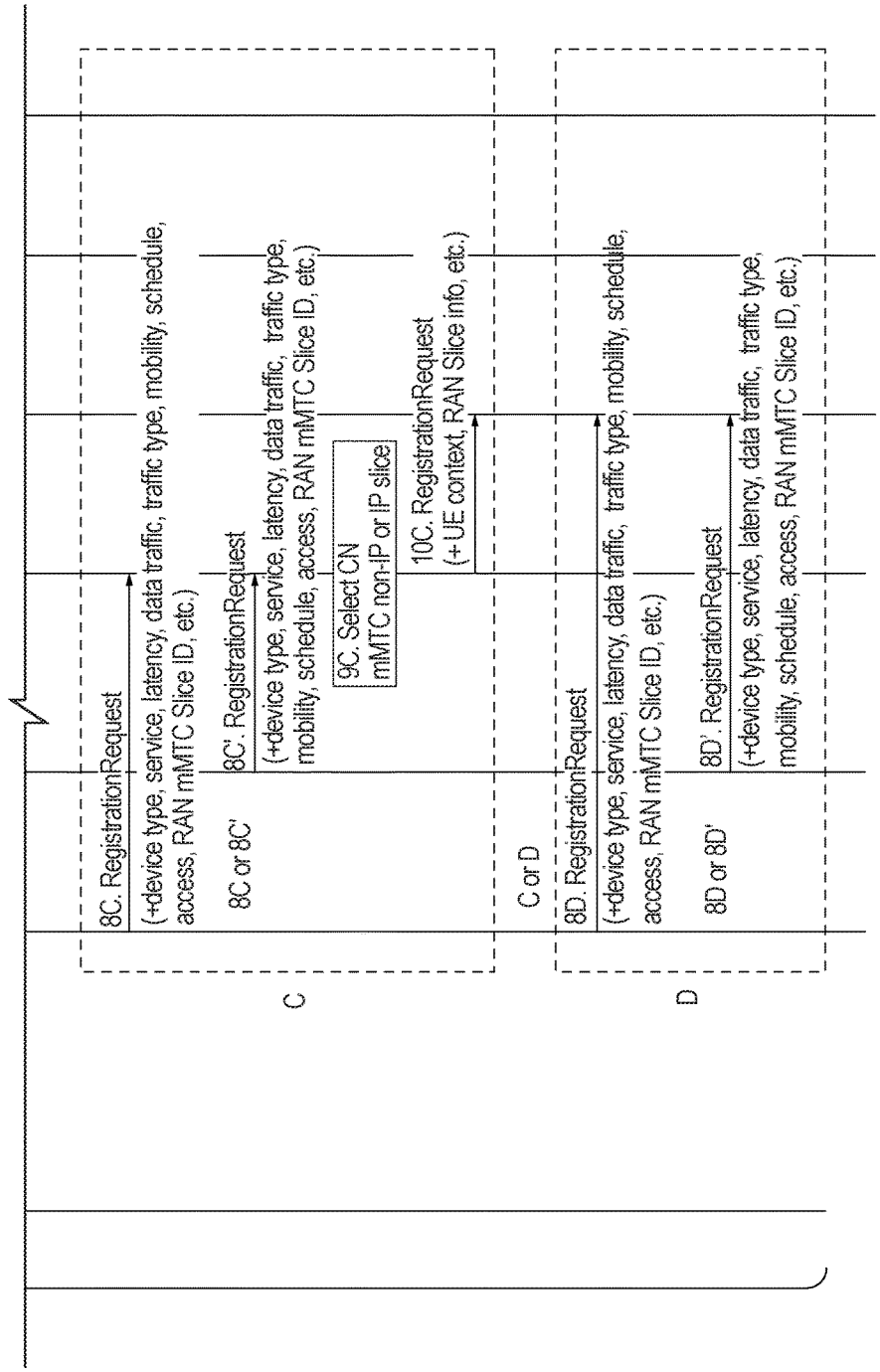
Figure 26B:
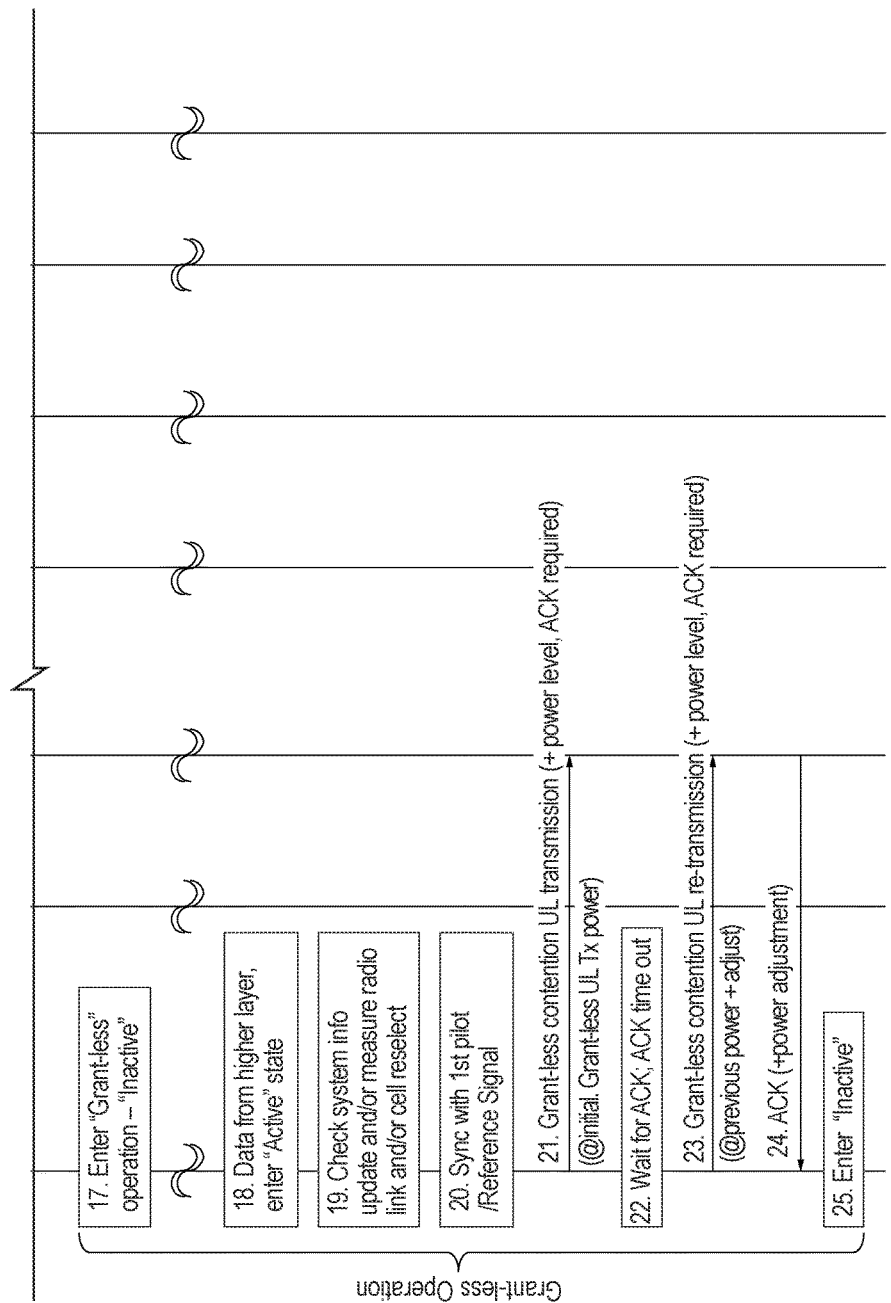
Figure 27A:
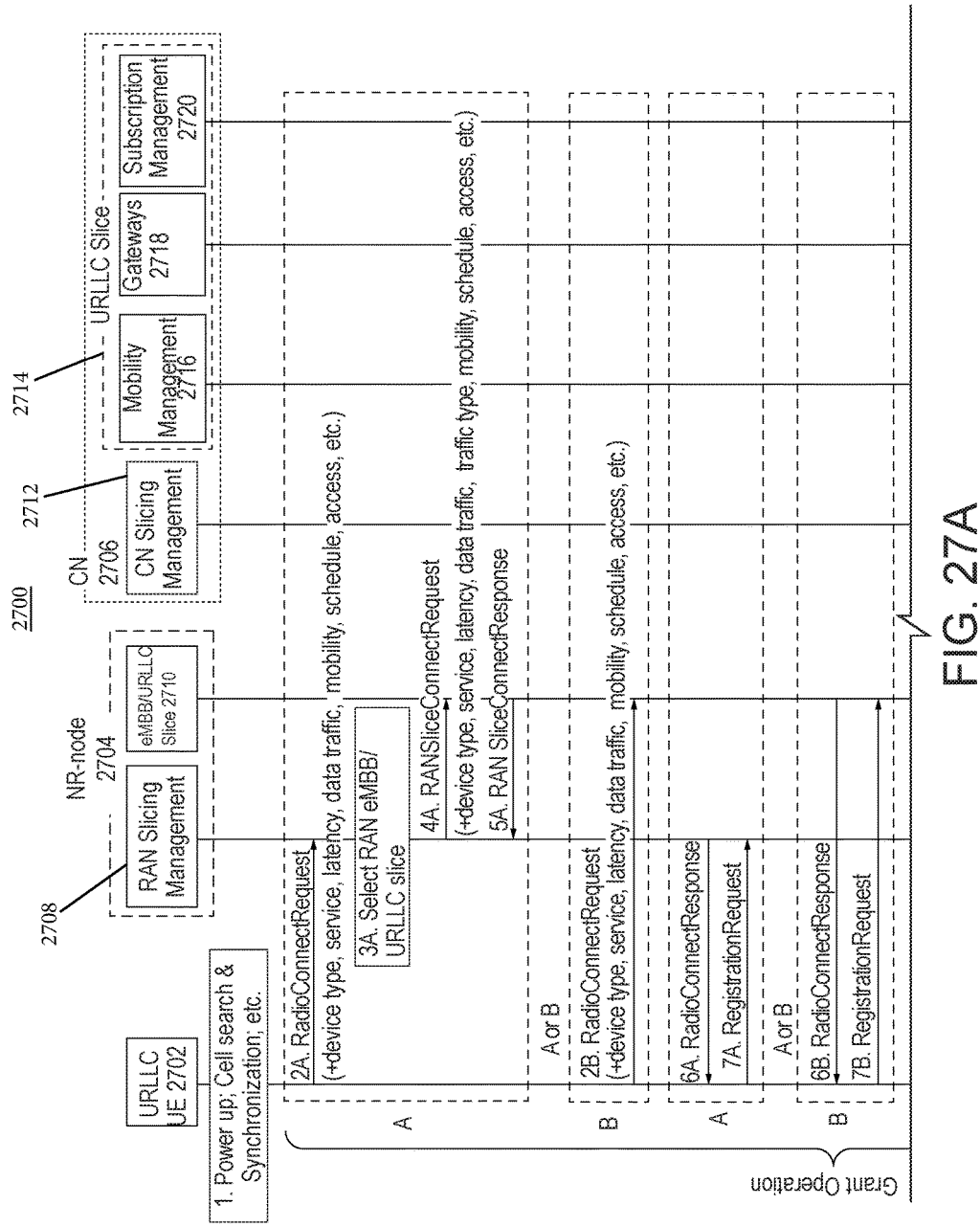
FIGS. 27A-28B depict another example call flow for grantless UL transmission for Ultra-Reliable and Low Latency Communications (URLLC) devices in accordance with another example embodiment.
Figure 27B:
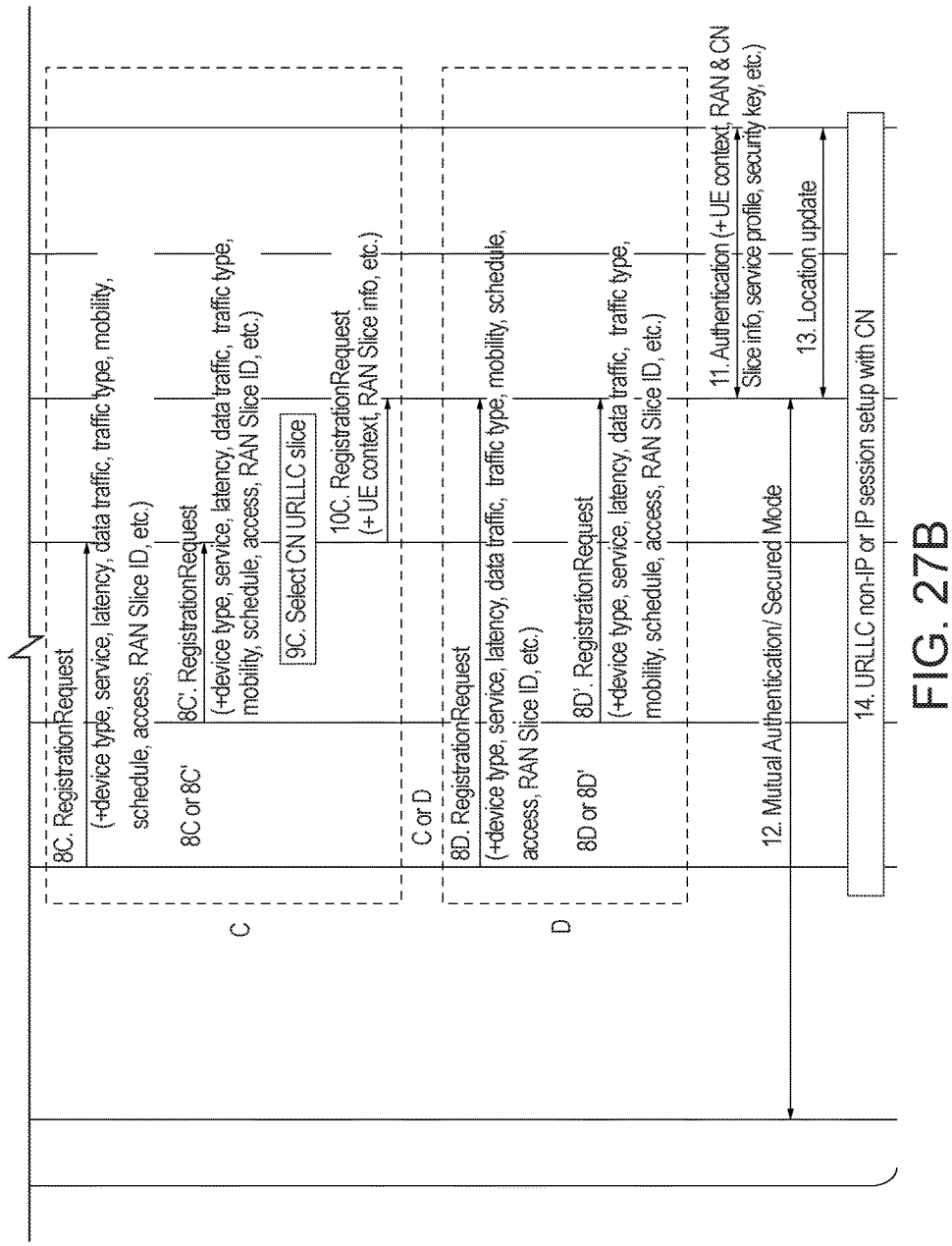
Figure 28A:
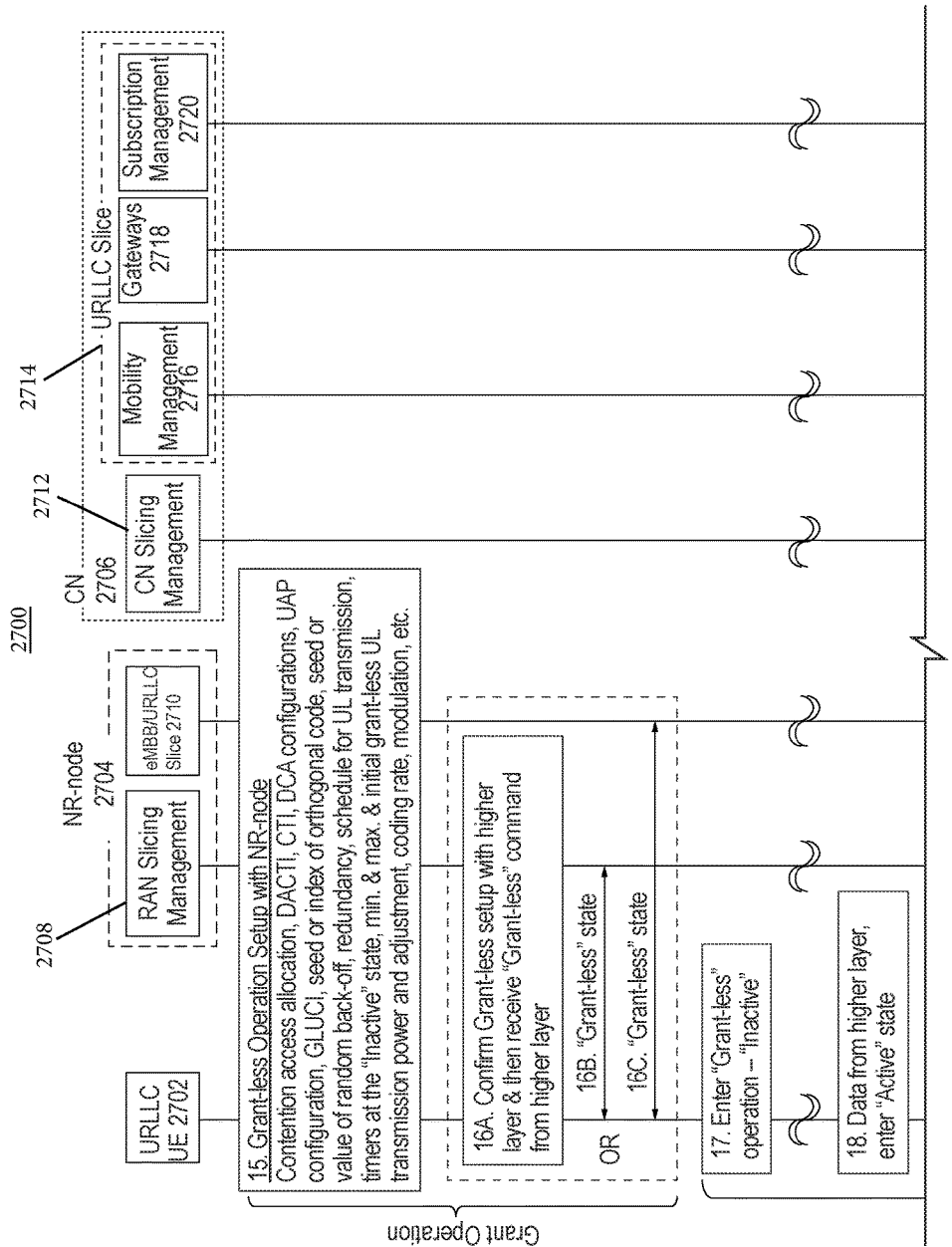
Figure 28B:
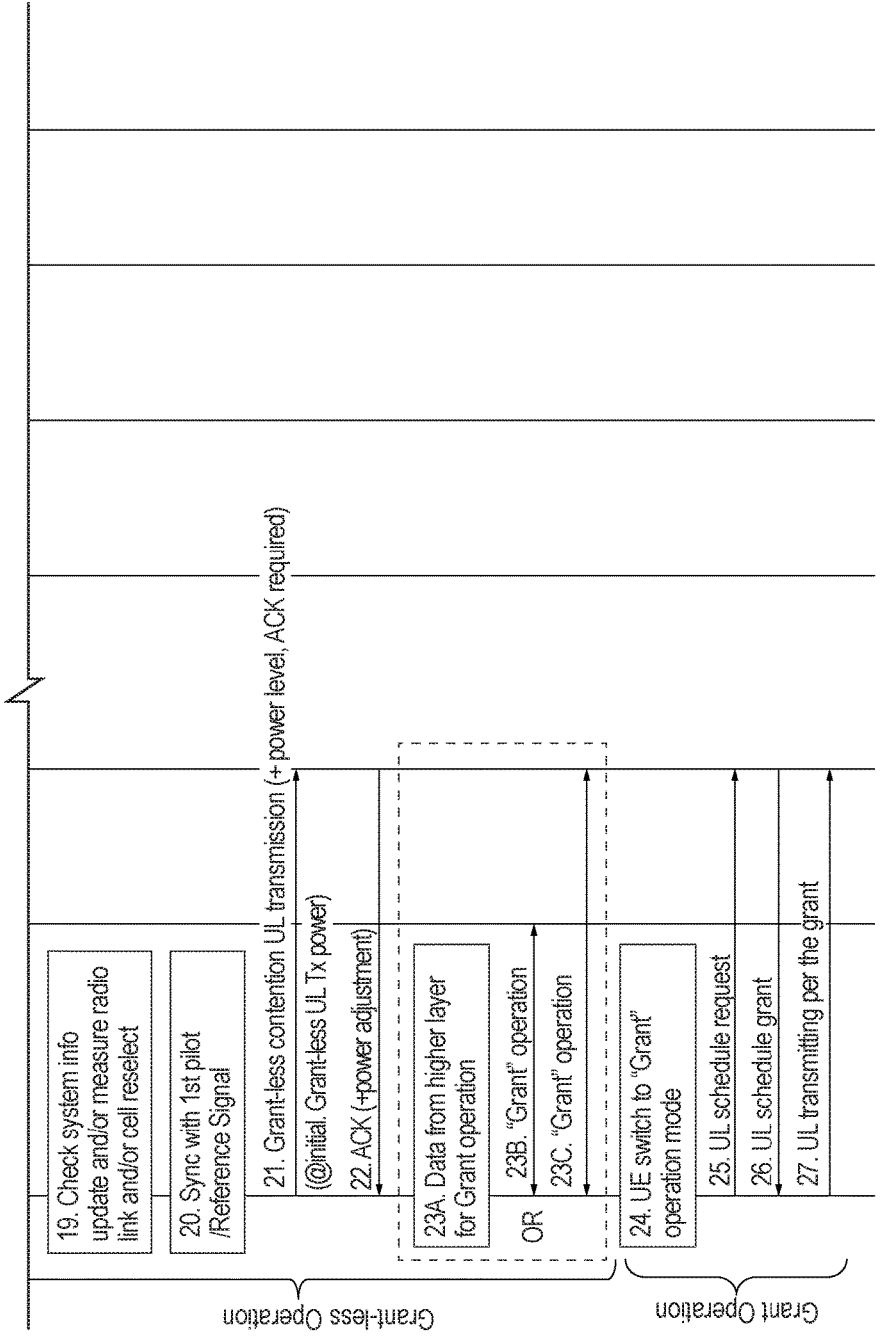

Referring now to FIG. 25B, at 8, the registration request is sent to CN Slicing Management apparatus 2512 (8C and 8C') or the CN mMTC slice 2514 (8D and 8D'). The request may be sent by the RAN Slicing Management 2508 (8C and 8D) or the mMTC Sliced 2510 (8C' and 8D'). The request may include the context information associated with the UE, information associated with the mMTC slice 2510, such as the slice ID for example. In some cases, operations 9 and 10, which are now described, are skipped when the NR-node 2504 selects the CN slice 2514. At 9C, in accordance with the illustrated example, the CN Slicing Management apparatus 2512 selects the mMTC IP traffic slice 2514, for example, based on the UE context, the RAN mMTC Slice 2510, traffic loading of the CN 2506, available mMTC slices, or the like. At 10C, in accordance with the illustrated example, the CN Slicing Management node 2512 sends a registration request to the Mobility Management node 2516. The Registration Request may include the UE's context information and information associated with the RAN mMTC Slice 2510.

Referring now to FIG. 26A, continuing with the illustrated example, at 11, the Mobility Management node 2516 exchanges messages with the Subscription Management node 2520, so as to authenticate the UE 2502 for access to services. After the authentication, at 12, the Mobility Management node 2516 exchanges messages with the UE 2502, such that the UE 2502 and the Mobility Management node 2516 mutual authenticate each other, and then establish a Secured Mode between them. At 13, in accordance with the illustrated example, the Mobility Management node 2516 may exchange messages with the Subscription Management node 2520, so that a location of the UE 2502 is updated. Location Update: Mobility Management exchanges messages with the Subscription Management for Location Update. At 14, an IP session may be established between the RAN mMTC slice 2510 and the CN mMTC slice 2514. The IP session may also be established within the CN mMTC slice 2514.

With continuing reference to FIG. 26A, in accordance with the illustrated example, at 15, grant-less operations are setup. The NR-node 2504, in particular the -RAN mMTC Slice 2510, may exchange messages with the UE 2502 to configure the Grant-less operation parameters described herein, for example. Example parameters include, without limitation: contention access allocation parameters; grant-less configuration parameters (e.g., DACTI, CTI, DCA, UAP, GLUCI, etc.); seed or index of the orthogonal code for code-domain multiple accessing; seed or value of the random back-off for priority collision avoidance contention access; redundancy parameters for reliable transmissions; timers at the Inactive state (e.g., for listening to a broadcasting channel for pages or for system information changes, for conducting measurements for the radio link management, for updating statuses related to reachability and mobility, etc.); grant-less power control values (e.g., minimum and maximum UL transmission power levels and incremental adjustments, which may be calculated by the NR-node 2504 based, at least in part, the path loss and required received signal quality during the message exchanges described above between the UE 2502 and the NR-node 2504); parameters related to a schedule for grant-less UL transmissions; a coding rate; modulation scheme, etc.

At 16A, in accordance with the illustrated example, the UE 2502 confirms the grant-less configuration (allocation) with a higher layer of the UE 2502 as compared to the physical layer. Alternatively, or additionally, the UE 2502 may confirm the Grant-less setup with the NR-node 2504, in particular the RAN Slicing Management node 2508 (at 16B) or the mMTC slice 2510 (at 16C). Accordingly, the UE 2502 may receive an entering "Grant-less" operation mode command from the higher layer or from the NR-node 2504. At 17, the UE 2502 enters into an inactive state (e.g., lower power state with no data to transmit) of the Grant-less operation mode. The inactive state may be preconfigured. In some cases, the inactive state may be triggered by the higher layer or the NR-node's command to operate in Grant-less mode after registration. In some cases, the UE 2502 may automatically enter the inactive state in Grant-less operation mode if configured to do so. At 18, in accordance with the illustrated example, the UE 2502 receives data from the higher layer that it needs to transmit in an UL transmission. Example data includes, without limitation, "keep alive" small data, measurement data, data associated with a reachability and mobility status of the UE 2502, or the like. At 19, the UE 2502 may need to check system information on a broadcast channel. By way of further examples, at 19, the UE 2502 may need to conduct a radio link measurement, or select a new cell based on system information or results of the radio link measurement. At 20, in accordance with the illustrated example, the UE 2502 synchronizes with reference signals or an available synchronization pilot, for instance the first available synchronization pilot, at the symbol timing boundary for allocating a contention access area.

At 21, in accordance with the illustrated example, the UE 2502 sends a grantless UL transmission to the NR-node 2504, in particular the RAN mMTC slice 2510. In some cases, the UE 2502 may conduct contention access for the grant-less UL transmission (without redundant versions) at the initial UL transmitting power, which may defined at the Grant-less setup stage (at 15) or signaled by the NR-node 2504 via System Information broadcasting or RRC signaling. In some cases, the UE 2502 may indicate if an acknowledgement (ACK) is required for this transmission at the transmitting power level. The UE 2502 may also include radio link measurements, a reachability or mobility status, or other information with the UL data transmission at 21. At 22, the UE 2502 may wait for an ACK response, to its UL transmission, from the mMTC slice 2510. The UE 2502 may wait until an ACK timer expires if, for example, an ACK is required. At 23, in accordance with an example, the UE 2502 conducts a re-transmission of the UL message. The UE 2502 may conduct contention access again, for example, if reliable transmission is required for its grant-less UL data. At 24, in accordance with the illustrated example, the NR-node 2504, in particular the mMTC slice 2510, sends an ACK message to the UE 2502 that indicates that the UL transmission from the UE 2502 was successfully received. The message at 24 may also include a power adjustment value for the UE's next grant-less UL transmission, thereby providing quasi-closed-loop Power Control. At 25, the UE 2502 may enter an inactive state of grantless operation mode. The inactive state generally refers to a state in which the UE is not transmitting. The inactive state may be preconfigured or triggered by the higher layer's command after a grant-less UL transmission. The inactive state may also be triggered when the UE 2502 or receives an ACK from the NR-node 2502, for example, when an ACK is required for the transmission. In some cases, the UE 2502 may automatically enter the inactive state after a grant-less UL transmission, if, for example, the UE 2502 is configured to do so.

Referring also to FIGS. 27A to 28B, an example of grant-less UL transmission for URLLC devices is illustrated. An example system 2700 is shown which includes an URLLC UE 2702, an NR-node 2704, and a core network (CN) 2706. The NR-node 2704 comprises a RAN slice management function or apparatus (node) 2708 and a RAN URLLC slice 2710. The CN 2706 includes a CN Slice Management function or apparatus (node) 2712 and an URLLC slice 2714. The URLLC slice 2714 may include a mobility management node or apparatus 2716, one or more gateways 2718 (e.g., SWG, PGW) and a subscription management function or apparatus (node) 2720 (e.g., HSS). It will be appreciated that the example system 2700 is simplified to facilitate description of the disclosed subject matter and is not intended to limit the scope of this disclosure. Other devices, systems, and configurations may be used to implement the embodiments disclosed herein in addition to, or instead of, a system such as the system illustrated in FIGS. 27A to 28B, and all such embodiments are contemplated as within the scope of the present disclosure.

The example embodiment for URLLC devices illustrated in FIGS. 27A to 28B may be similar to the example embodiment for mMTC devices described above, and therefore similar operations are described with reference to FIGS. 25A to 26B. With respect to URLLC devices, however, that the context information associated with the UE 2702 may include a value that indicates that the UE 2702 can switch between grant and grant-less operations. Further, an eMBB/URLLC slice may be selected at the NR-node 2704 in order to optimize the overall system resource utilization. In an example, the URLLC slice 2714 is selected to meet short latency requirements across the system (network) 2700. In some examples, the UE 2702 conducts its grant-less UL transmission with redundancies. In one example, at 24, the UE 2702 switches from a grant-less operation mode to a grant operation mode after receiving a command from the higher layer. By way of example, the UE 2702 may include a traffic monitor that switches from a grant-less mode to a grant operation mode to upload the images of a traffic accident to the network.

Referring now to FIGS. 29A to 30B, the example system 2500 is shown. In the illustrated example, grant-less UL operations are performed for the mMTC device 2502. In accordance with the illustrated example, the RAN Slicing Management node 2508 and the CN Slicing Management node 2512 may be logical entities that perform common control functions in the RAN and the CN 2506, respectively. For example, the RAN Slicing Management node 2508 and the CN Slicing Management node 2512 may exchange service subscription and policy information, which may be used to validate a request for access to a slice. Such information may also be used to establish security settings, power charging parameters, or the like. The RAN Slicing Management node 2508 and the CN Slicing Management node 2512 may also exchange context information associated with the UE 2502. Such context information may include, for example, mobility information, location information, transmission schedule information, data traffic information, etc. The context information may allow the appropriate, for instance optimal, slice to be selected in the RAN and the CN 2506.

The Mobility Management node 2516 and the Subscription Management node 2520 may represent common functions for the CN slices (slice common) associated with a service provider. In some cases, the Mobility Management node 2516 and the Subscription Management node may be part of the CN Slicing Management 2506, or may represent specific functions inside the CN slice 2514 provided by a specific service provider (slice specific), as shown.

Figure 29A:
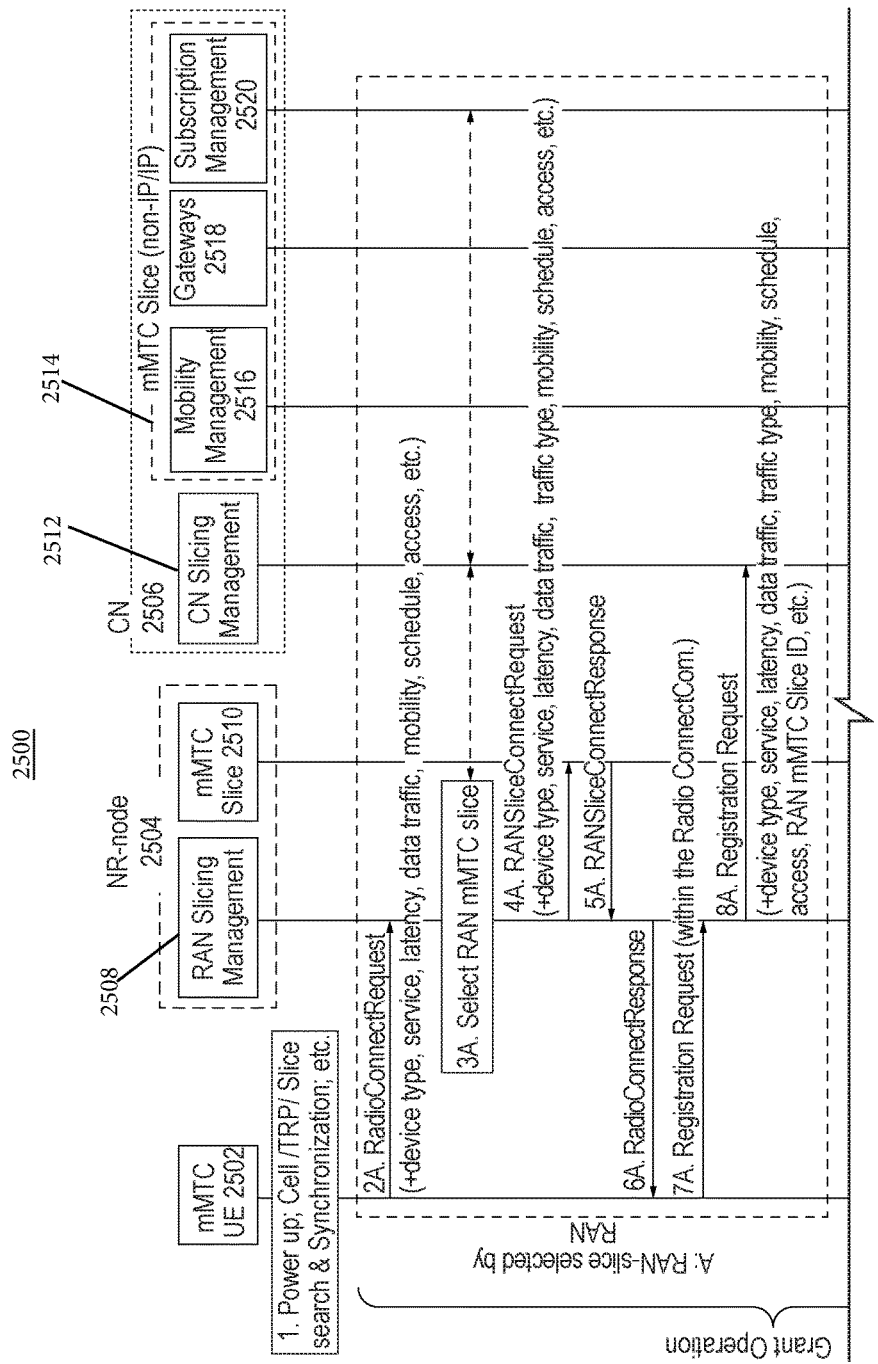
FIGS. 29A-30B depict an example procedure for grant-less UL transmission for mMTC devices in accordance with an example embodiment.
Figure 29B:
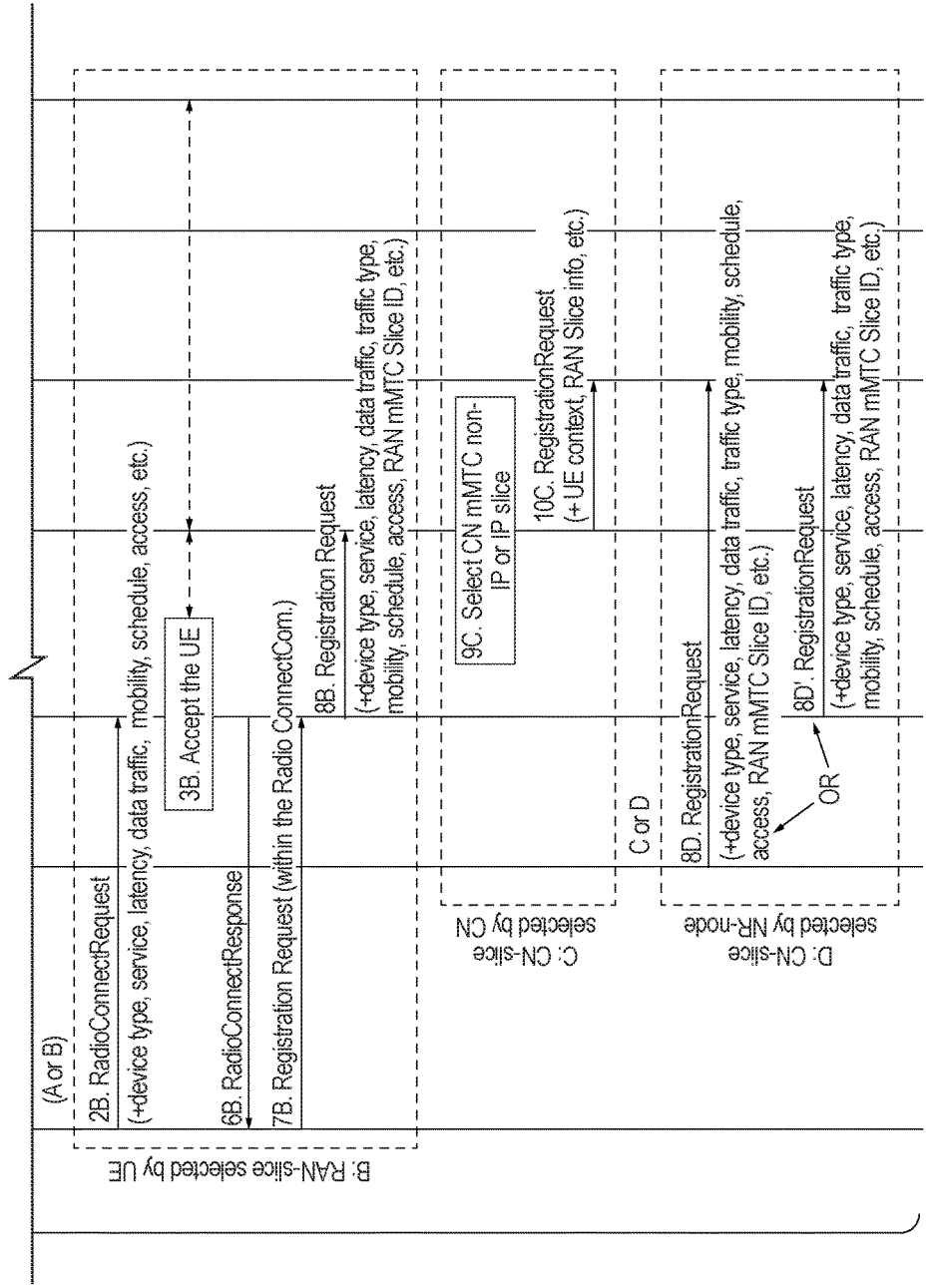

Referring in particular to FIGS. 29A and 29B, at 1, in accordance with the illustrated example, the UE 2502 powers up. After power up, the UE 2502 may conduct cell/TRP/slice search and synchronization. The UE 2502 may further acquire system information from MIB and SIBs. At this time, in some cases, the UE 2502 may be in similar states as EMM-deregistered, ECM-Idle, and RRC-Idle, as defined in the current LTE system. At 2, the UE 2502 may send a Radio Connection Request to the RAN Slicing Management node 2508 (at 2A) or the mMTC Slice 2510 (at 2B). The request may include various context information associated with the UE 2502, such as, for example and without limitation: a device type (e.g., mMTC or URLLC), a service (e.g., service for forest fire monitoring or traffic monitoring); a latency requirement (e.g., 100 ms or ultra-low latency 0.5 ms); context related to data traffic (e.g., data packet size and/or data rate and/or duty cycle); CN traffic type (e.g., non-IP or IP based); mobility context (e.g., static, pedestrian, or vehicular, or low speed in a confined area, etc.); location context (e.g., UE tracking area at RAN); schedule context (e.g., schedule of data transmissions); access context (e.g., grant or grant-less accessing, whether switchable between grant and grant-less, accessing priority, etc.). In some cases, operations 4 and 5 are not performed, for example, when the UE 2502 selects the RAN slice 2510.

At 3A, the RAN Slicing Management node 2508 may select the RAN slice 2510. The selection may be based, at least in part, on the context information associated with the UE 2502, traffic loading and resource allocations at various RAN slices, a relevant service profile or subscription, a charging policy, or the like. Information may be stored at the NR-node 2504, or received from the CN 2506 via the CN slicing Management node 2512 and/or the Subscription Management entity 2520 on the CN 2506. At 3A, the RAN Slicing Management 2508 selects the mMTC slice 2510 as the radio accessing slice for the UE 2510. At 3B, the RAN slice 3510 may determine to accept the UE's connection request for the RAN-selected or UE-selected RAN slice 3510. At 4A, the RAN Slicing Management 2508 may send a RAN slice connection request to the mMTC Slice 2510. The connection request may include the context information associated with the UE 2502, so that a radio connection can be established between the UE 2502 and the slice 2510. At 5A, in accordance with the illustrated example, the mMTC Slice 2510 sends a RAN Slice Connection Response to the RAN Slicing Management 2508. The response may indicate whether the slice connection request has been accepted. If the request is rejected, the reasons for rejection may be included in the response message. If the request is accepted if accepted, radio configuration parameters (e.g., SRB1-like and/or DBR-like dedicated radio resource configuration for the UE 2502) for the selected RAN slice 2510 may be included in the response.

Still referring to FIGS. 29A and 29B, at 6, in accordance with the illustrated examples, the RAN Slicing Management 2508 (at 6A) or the mMTC Slice 2510 (at 6B) sends a Radio Connection Response to the UE 2502. The response may indicate that radio connection is confirmed by the RAN Slice Management 2508 or the RAN mMTC Slice 2510. If the request for the selected RAN slice 2510 is rejected, the reasons for rejection may also be included in the response message. If the request is accepted, the radio configuration parameters (e.g., SRB1-like and/or DRB-like dedicated resource configuration for the UE 2502) for the selected RAN slice 2510 may be included in the response. In some cases, the RAN Slicing Management 2508 or the selected RAN slice 2510 may send (e.g, within the response message) an SBR1 and/or DRB resource (e.g., SRB and/or DRB configuration) that is dedicated to the UE 2502. Thus, the UE 2502 may be confirmed as having a successful radio connection with the mMTC Slice 2510, which may be a NAS connection with the selected RAN slice 2510. At 7, in accordance with the illustrated examples, the UE 2502 may send a registration request to the RAN Slicing Management 2508 (at 7A) or the RAN mMTC Slice 2510 (at 7B). The registration request may sent at the NAS layer, and may be encapsulated in the Radio Connect Complete message, which may also include the radio configuration as instructed by the selected RAN slice 251. The RAN Slicing Management 2508 may send the registration request to the CN Slicing Management 2512 (at 8A) or the Mobility Management 2516 (at 8D). Alternatively, the RAN mMTC Slice 2510 may send the registration request to the Mobility Management 2516 (at 8D'). The registration request may be sent to the Mobility Management 2516 when the slice 2512 is selected by the NR-node 2510. In some examples, the registration request may be sent to the CN Slicing Management 2512 when the RAN slice 2510 is selected by the UE 2502 (at 8B). The registration request may include context information associated with the UE, and slice information (e.g., an ID) associated with the mMTC slice 2510.

In some examples, the NR-node 2504 or the CN 2506 may select the CN slice 2514 based on various context information associated with the UE 2502. For example, CN slice selection may be based, at least in part, on an ID of the UE assigned by the RAN-Slicing Management 2508 or the RAN slice 2510 in the NR-node 2508, the type of the UE 2502 (e.g., mMTC or URLLC), a service performed by the UE 2502 (e.g., forest fire monitoring or traffic monitoring), a latency requirement (e.g., long latency 100 ms or ultra-low latency 0.5 ms for the session or flow end-to-end delay); data traffic (e.g., data bit rate and/or traffic load for the session or flow); a route type (e.g., non-IP or IP based), mobility (e.g., static, pedestrian, or vehicular, or low speed in a confined area); a location (e.g., UE's tracking and/or routing area in the network, such as TAI and ECGI in LTE system); schedule (e.g, schedule of UL data transmissions); charge (e.g., on-line or off-line charging), etc.

In some cases, for example, when the NR-node 2504 selects the CN slide 2514, operations 9 and 10 are not performed. In other cases, at 9C, the CN Slice Management 2512 selects an mMTC IP traffic slice (slice 2514) based on at least a portion of the context information associated with the UE, the RAN mMTC Slice 2510, CN traffic loading and available mMTC slices, etc. At 10C, the CN Slicing Management 2506 may send a registration request to the Mobility Management node 2616. The registration request may include context information associated with the UE 2502 and information related to the RAN mMTC slice 2510. At 10C, in some cases, the connection between the NAS layers of the UE 2502 and the Mobility Management 2516 or the CN slice 2514 is established. Then, the UE may transit to various states, like EMM-Registered, ECM-Connected and RRC-Connected state in LTE system.

Figure 30A:
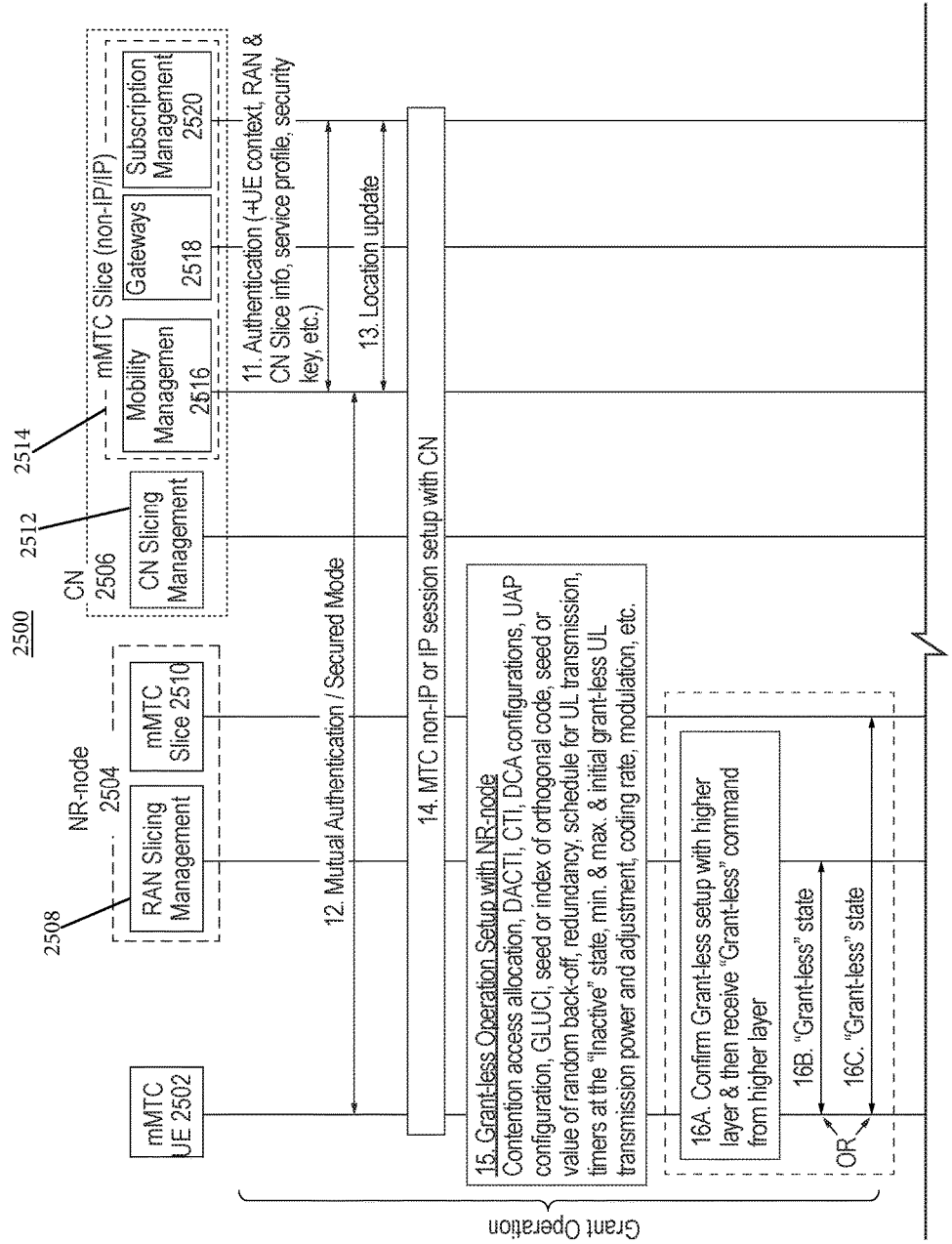
Figure 30B:
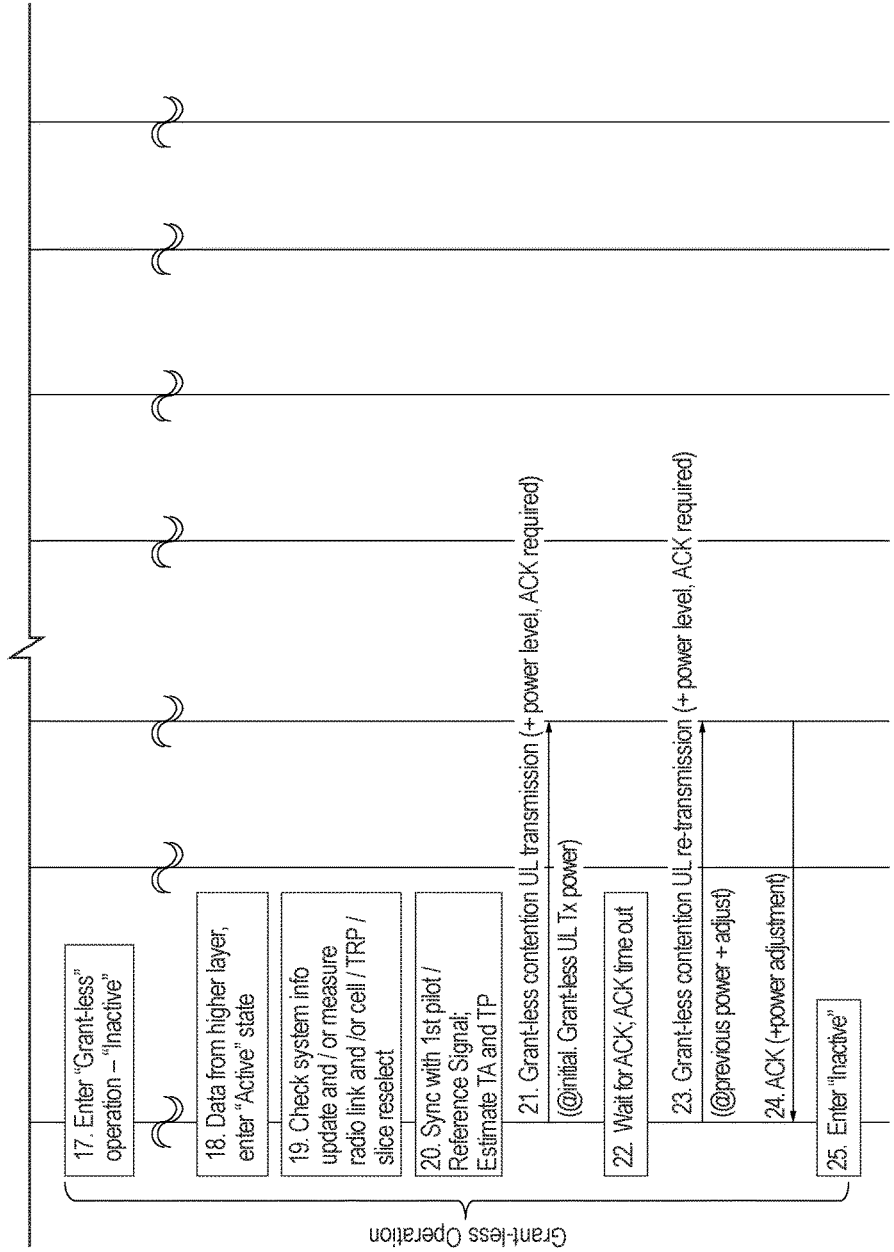
Figure 31A:
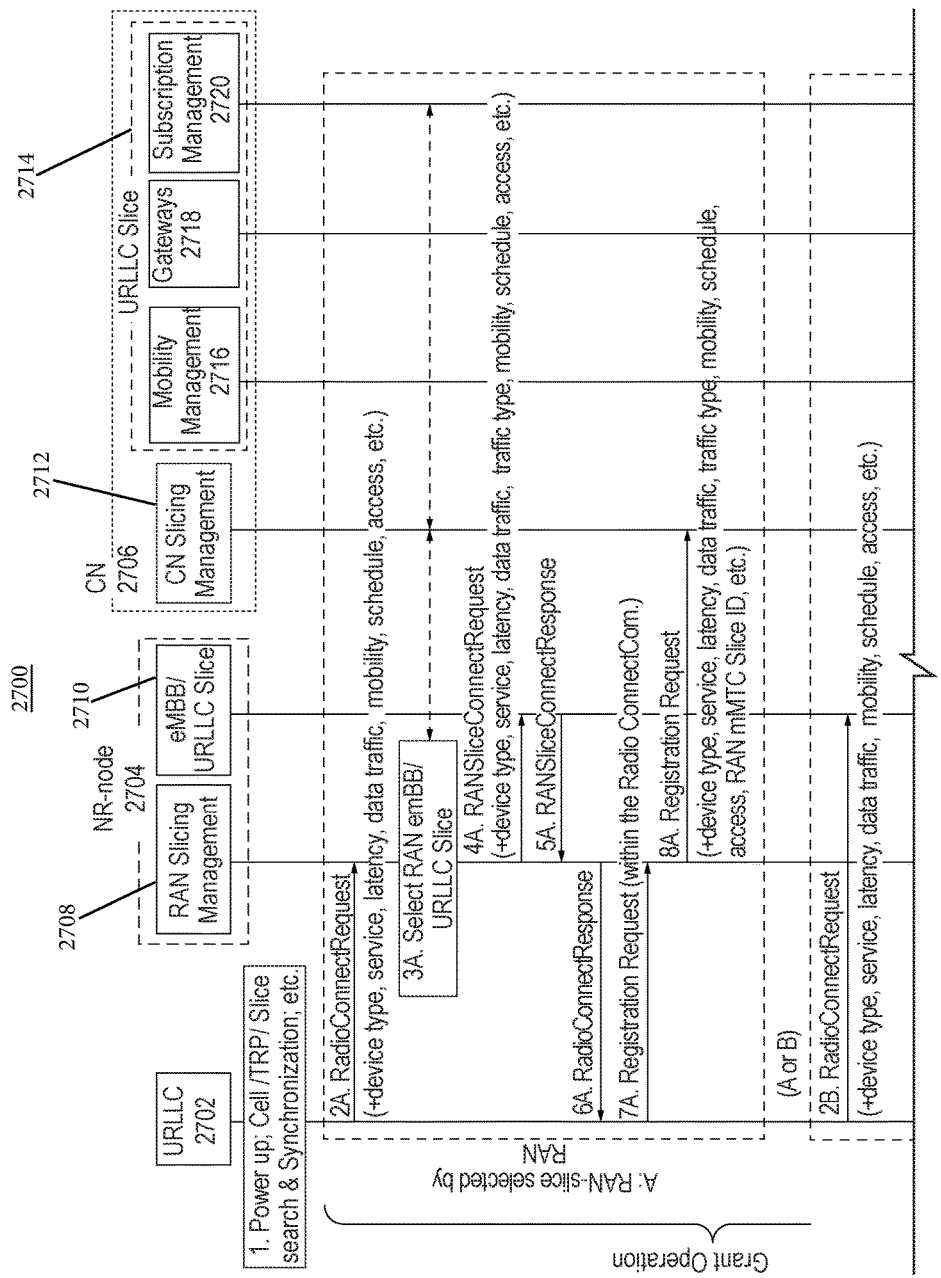
FIG. 31A-32B depict an example procedure for grant-less UL transmission for URLLC devices in accordance with an example embodiment.
Figure 31B:
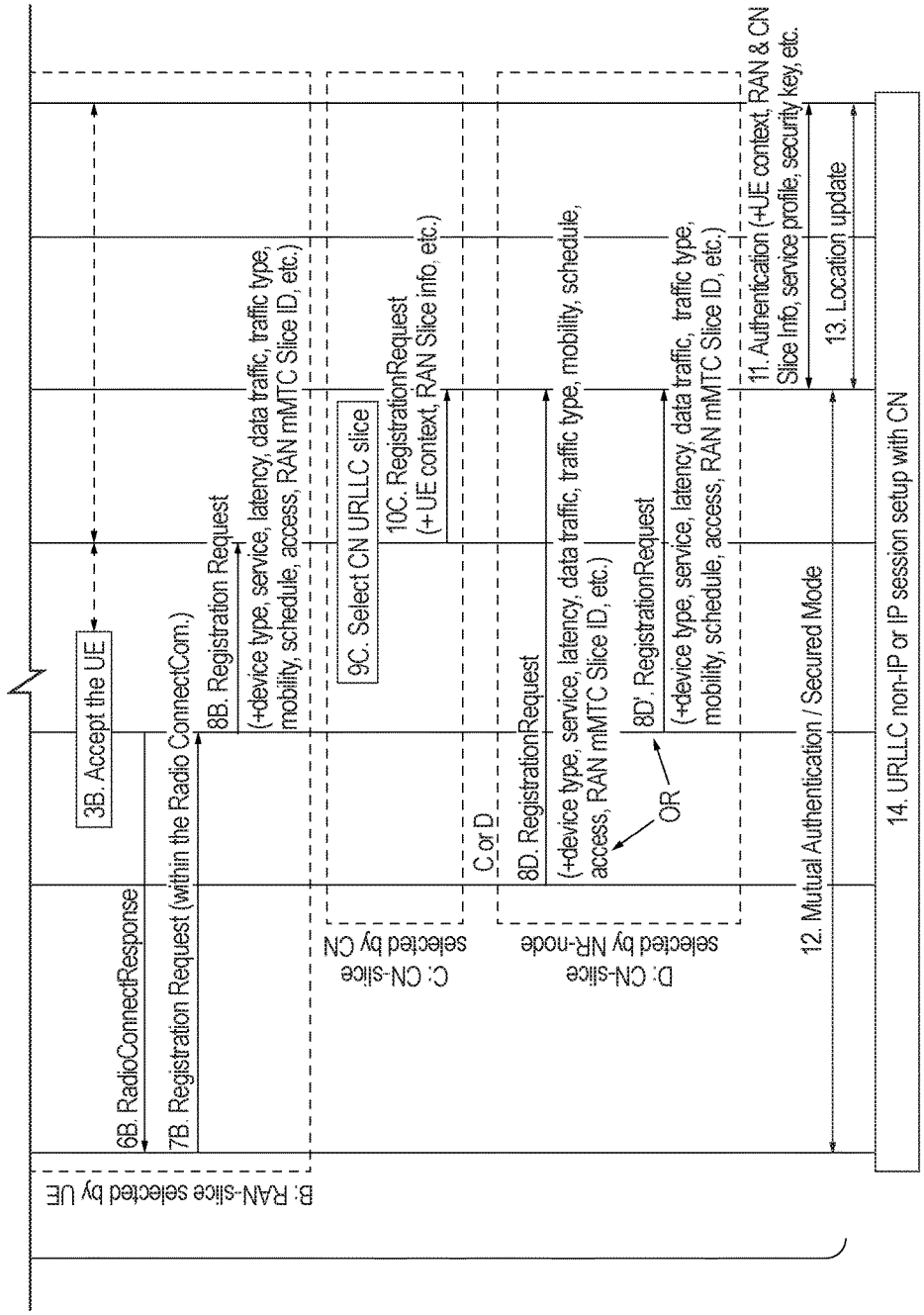
Figure 32A:
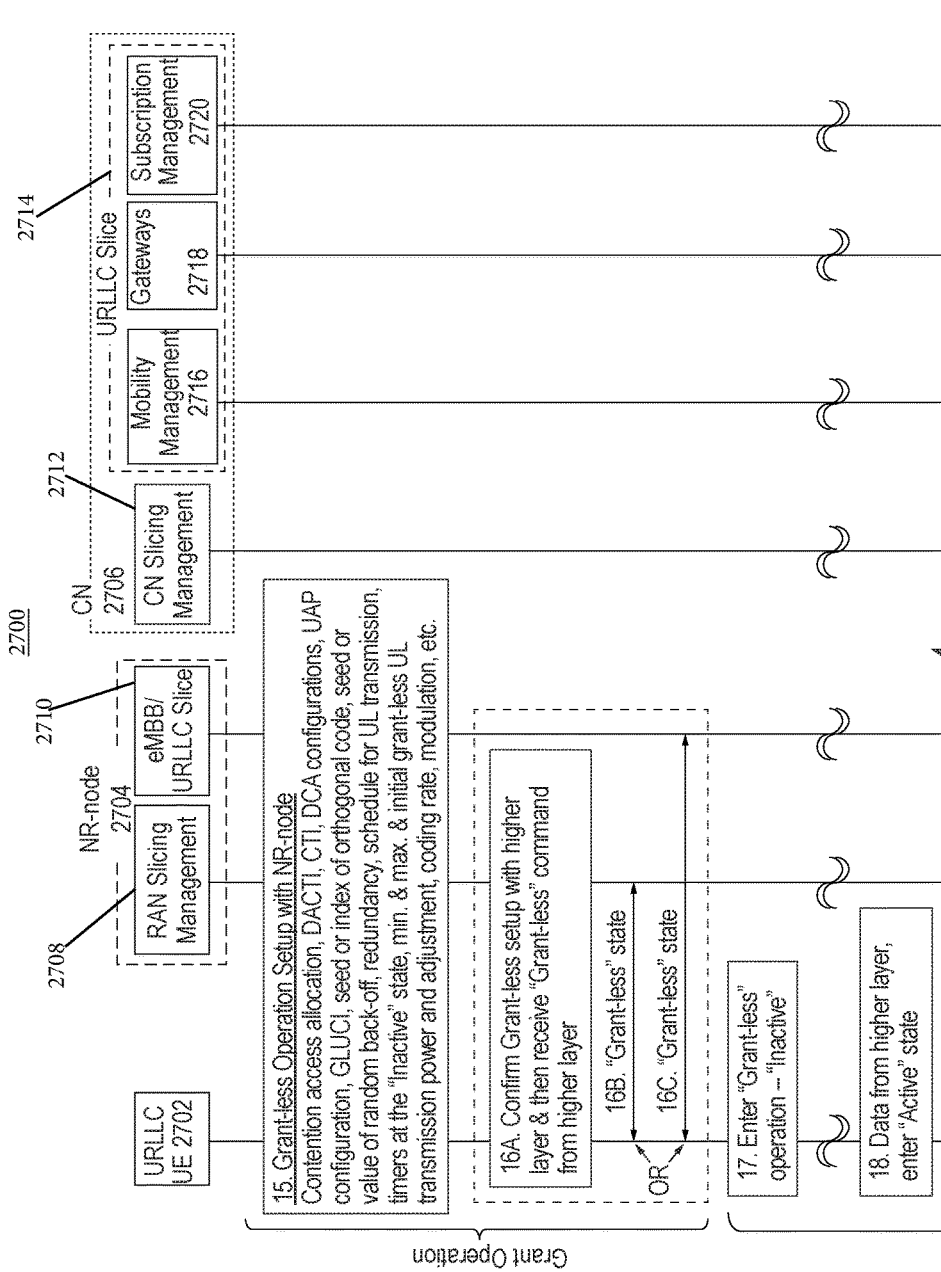
Figure 32B:
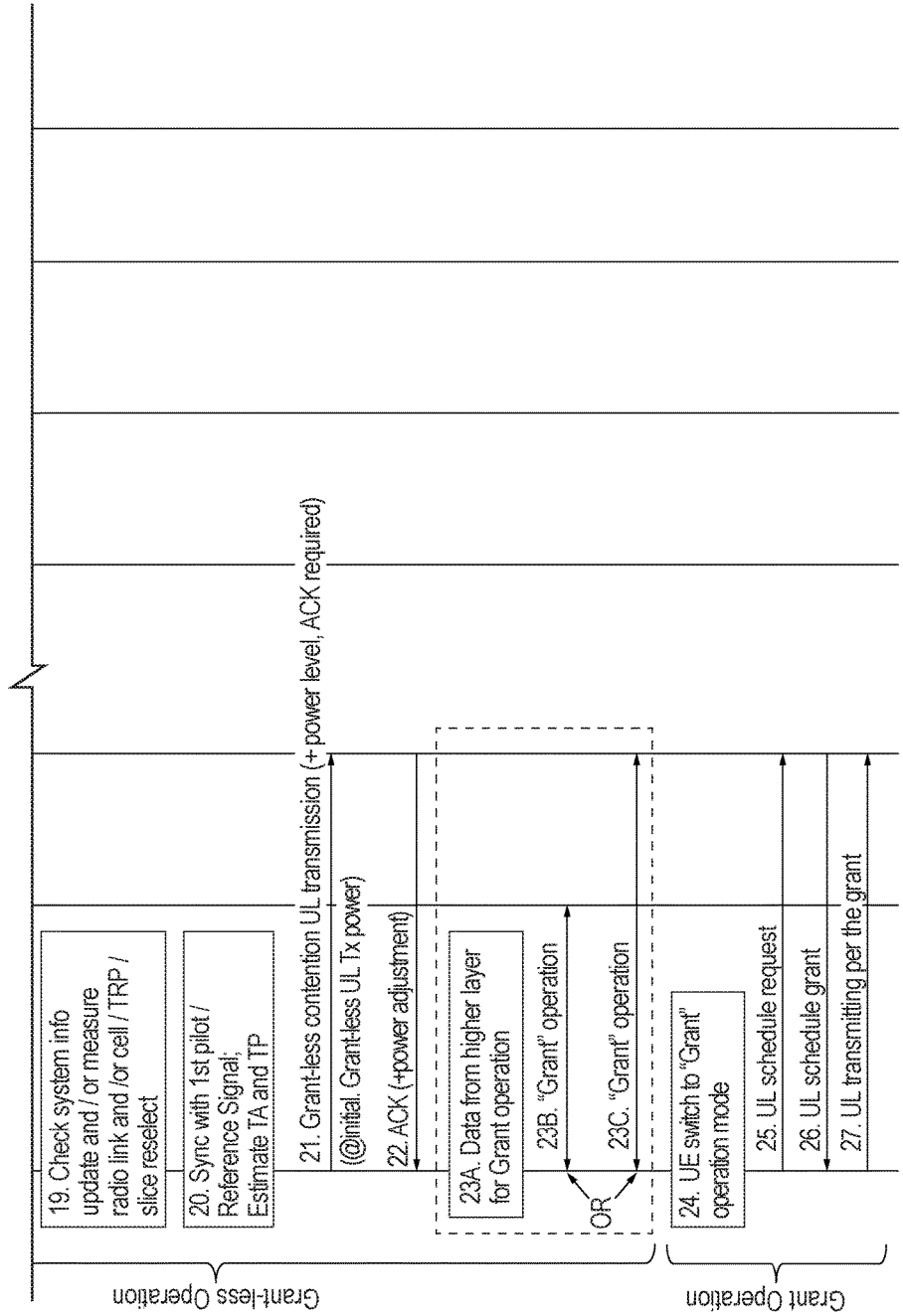

Referring now to FIG. 30A, at 11, in accordance with the illustrated example, the Mobility Management 2516 exchanges messages with the Subscription Management 2520 for authenticating the UE 2502 with the requested services. The exchanged messages may include, for example and without limitation, UE IDs (such as IMSI and Serving Network ID) and context, RAN slice and CN slice info (such as RAN slice ID and CN slice ID), service network ID, UE service profile or subscription and charging policy, an assigned UE default IP address, etc. The Security keys may be generated for establishing a secured connection in the CN 2506 and RAN. At 12, the Mobility Management node 2516 and the UE 2502, after the authentication with the Subscription Management 2520, may exchanges messages to mutual authenticate each other, and then to establish a Secured Mode for NAS signaling between them. At 23, in accordance with the illustrated example, the Mobility Management 2516 and the Subscription Management 2520 exchange messages to update a location associated with the UE 2502. At 14, in accordance with the illustrated example, an IP or non-IP session is established within the CN mMTC slice 2514 on the radio bearer between the UE 2502 and the Mobility Management 2516 in the CN 2506, over the interface between the RAN mMTC slice 2510 and the CN mMTC Slice 2514 and the network connection bearer in the core network 2506.

At 15, grant-less operations are setup. The NR-node 2504, in particular the -RAN mMTC Slice 2510, may exchange messages with the UE 2502 to configure the Grant-less operation parameters described herein, for example. Example parameters include, without limitation: contention access allocation parameters; accessing priority and/or contention priority; grant-less configuration parameters (e.g., DACTI, CTI, DCA, UAP, GLUCI, etc.); seed or index of the orthogonal code for code-domain multiple accessing; seed or value of the random back-off for priority collision avoidance contention access; redundancy parameters for reliable transmissions; timers at the Inactive state (e.g., for listening to a broadcasting channel for pages or for system information changes, for conducting measurements for the radio link management, for updating statuses related to reachability and mobility, etc.); grant-less power control values (e.g., minimum and maximum UL transmission power levels and incremental adjustments, which may be calculated by the NR-node 2504 based, at least in part, the path loss and required received signal quality during the message exchanges described above between the UE 2502 and the NR-node 2504); parameters related to a schedule for grant-less UL transmissions; a coding rate; modulation scheme, etc. At 16A, in accordance with the illustrated example, the UE 2502 confirms the grant-less configuration (allocation) with a higher layer of the UE 2502 as compared to the physical layer. Alternatively, or additionally, the UE 2502 may confirm the Grant-less setup with the NR-node 2504, in particular the RAN Slicing Management node 2508 (at 16B) or the mMTC slice 2510 (at 16C). Accordingly, the UE 2502 may receive an entering "Grant-less" operation mode command from the higher layer or from the NR-node 2504.

Referring now to FIG. 20B, at 17, the UE 2502 enters into an inactive state of the Grant-less operation mode. The inactive state may be preconfigured. In some cases, the inactive state may be triggered by the higher layer or the NR-node's command to operate in Grant-less mode after registration. In some cases, the UE 2502 may automatically enter the inactive state in Grant-less operation mode if configured to do so. At 18, in accordance with the illustrated example, the UE 2502 receives data from the higher layer that it needs to transmit in an UL transmission. Example data includes, without limitation, "keep alive" small data, measurement data, data associated with a reachability and mobility status of the UE 2502, or the like. At 19, the UE 2502 may need to check system information on a broadcast channel. By way of further examples, at 19, the UE 2502 may need to conduct a radio link measurement, or select a new cell based on system information or results of the radio link measurement. At 20, in accordance with the illustrated example, the UE 2502 synchronizes with reference signals or an available synchronization pilot, for instance the first available synchronization pilot, at the symbol timing boundary for allocating a contention access area. The UE 2502 may also estimate the Time Advance (TA) for grant-less UL synchronization, at 20. Further, the UE 2502 may estimate the Transmit Power (TP) level, using the received DL reference signal, for the UL transmission.

At 21, in accordance with the illustrated example, the UE 2502 sends a grantless UL transmission to the NR-node 2504, in particular the RAN mMTC slice 2510. In some cases, the UE 2502 may conduct contention access for the grant-less UL transmission (without redundant versions) at the initial UL transmitting power, which may defined at the Grant-less setup stage (at 15) or signaled by the NR-node 2504 via System Information broadcasting or RRC signaling. In some cases, the UE 2502 may indicate if an acknowledgement (ACK) is required for this transmission at the transmitting power level. The UE 2502 may also include radio link measurements, a reachability or mobility status, or other information with the UL data transmission at 21. At 22, the UE 2502 may wait for an ACK response, to its UL transmission, from the mMTC slice 2510. The UE 2502 may wait until an ACK timer expires if, for example, an ACK is required. At 23, in accordance with an example, the UE 2502 conducts a re-transmission of the UL message with an adjusted (e.g., increased) TP level if reliable transmission is required. The UE 2502 may conduct contention access again, for example, if reliable transmission is required for its grant-less UL data. At 24, in accordance with the illustrated example, the NR-node 2504, in particular the mMTC slice 2510, sends an ACK message to the UE 2502 that indicates that the UL transmission from the UE 2502 was successfully received. The message at 24 may also include a power adjustment value for the UE's next grant-less UL transmission, thereby providing quasi-closed-loop Power Control. At 25, the UE 2502 may enter an inactive state of grantless operation mode. The inactive state generally refers to a state in which the UE is not transmitting. The inactive state may be preconfigured or triggered by the higher layer's command after a grant-less UL transmission. The inactive state may also be triggered when the UE 2502 or receives an ACK from the NR-node 2502, for example, when an ACK is required for the transmission. In some cases, the UE 2502 may automatically enter the inactive state after a grant-less UL transmission, if, for example, the UE 2502 is configured to do so.

Referring also to FIGS. 31A to 32B, an example embodiment for URLLC devices is illustrated in which may be similar to the example embodiment for mMTC devices described above, and therefore similar operations are described with reference to FIGS. 29A to 30B. With respect to URLLC devices, however, the context information associated with the UE 2702 may include a value that indicates that the UE 2702 can switch between grant and grant-less operations. Further, at 3A or 2B, an eMBB/URLLC slice 2710 may be selected at the NR-node 2704 in order to optimize the overall system resource utilization. In an example, at 9C or 8D, the URLLC slice 2714 is selected to meet short latency requirements across the system (network) 2700. In some examples, the UE 2702 conducts its grant-less UL transmission with redundancies, for example, by using multiple contention blocks for sending the same data. In one example, at 24, the UE 2702 switches from a grant-less operation mode to a grant operation mode after receiving a command from the higher layer. By way of example, the UE 2702 may include a traffic monitor that switches from a grant-less mode to a grant operation mode to upload the images of a traffic accident to the network.

Figure 33A:
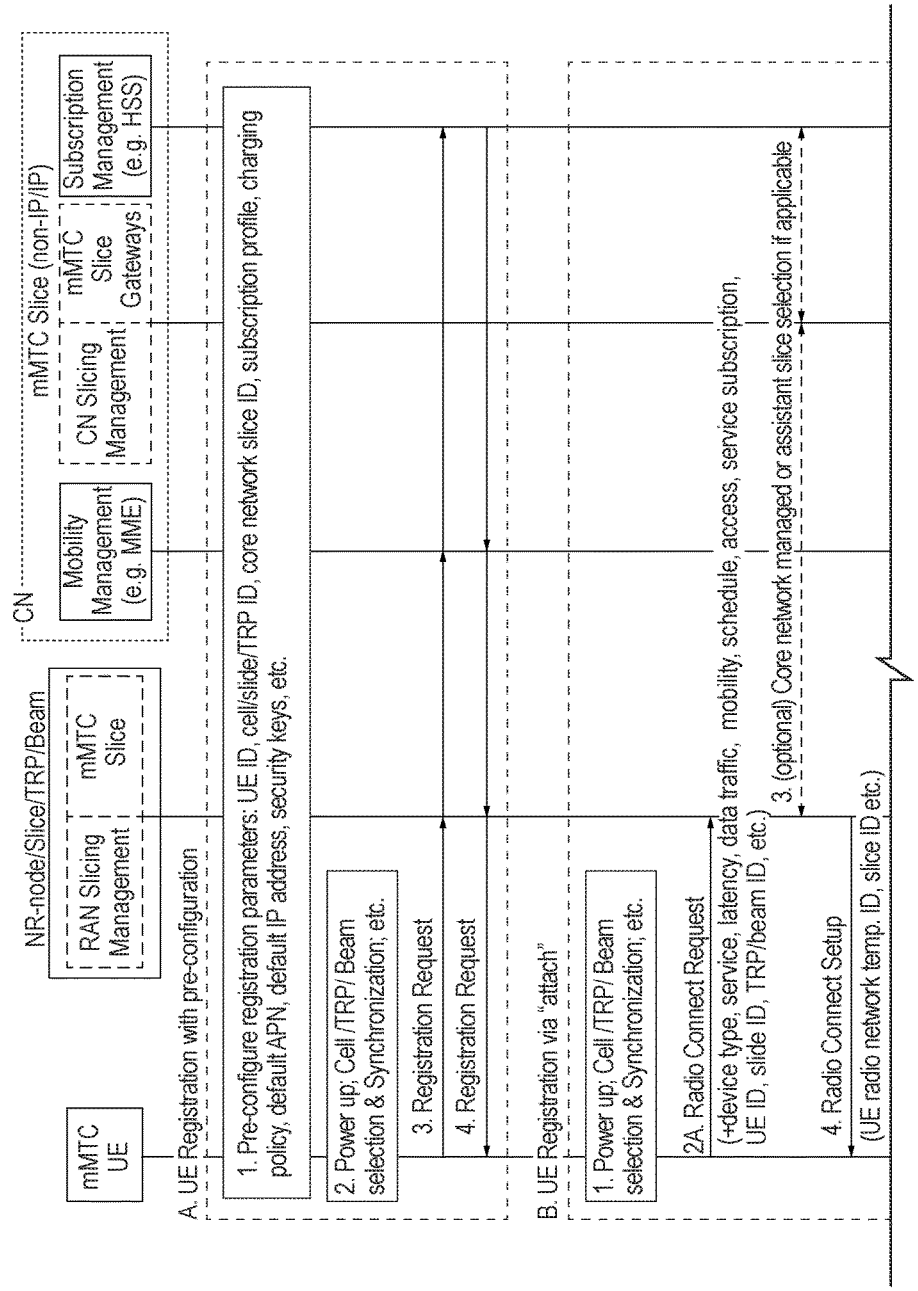
FIGS. 33A and 33B depict an example call flow for registration and grant-less setup in accordance with an example embodiment.
Figure 33B:
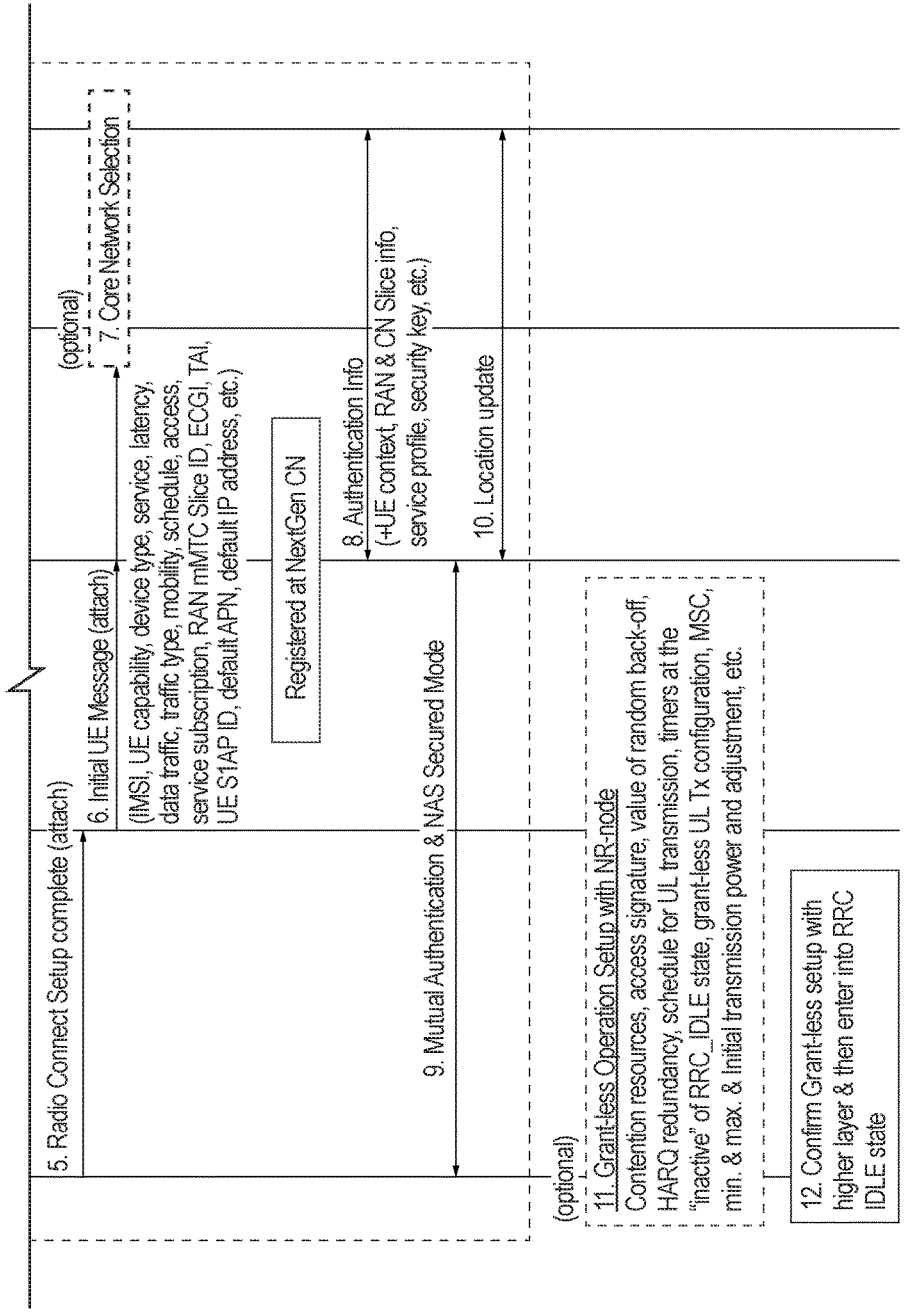
Figure 34A:
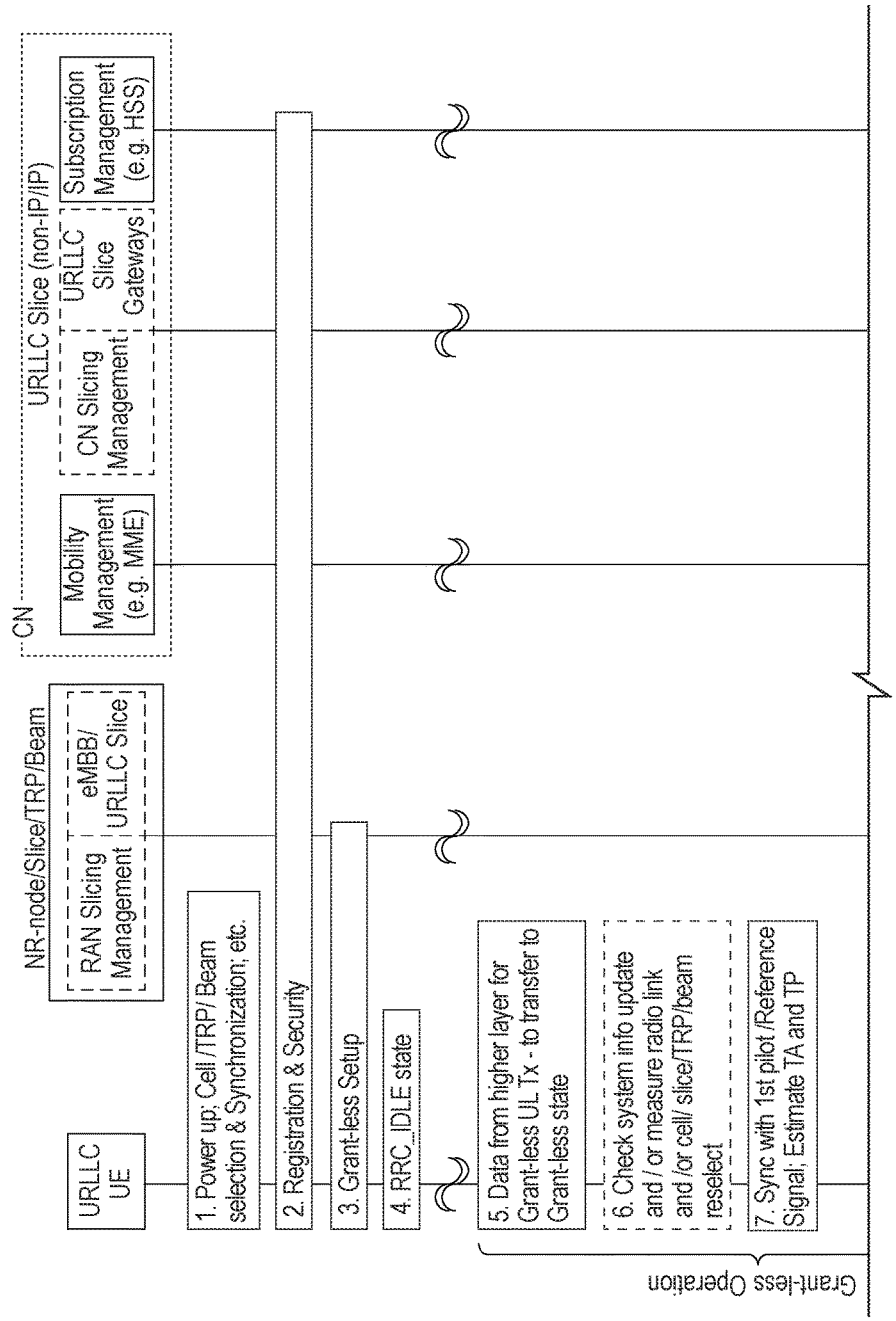
FIGS. 34A and 34B depict an example call flow for grant-less and grant UL transmissions for URLLC devices, in accordance with an example embodiment.
Figure 34B:
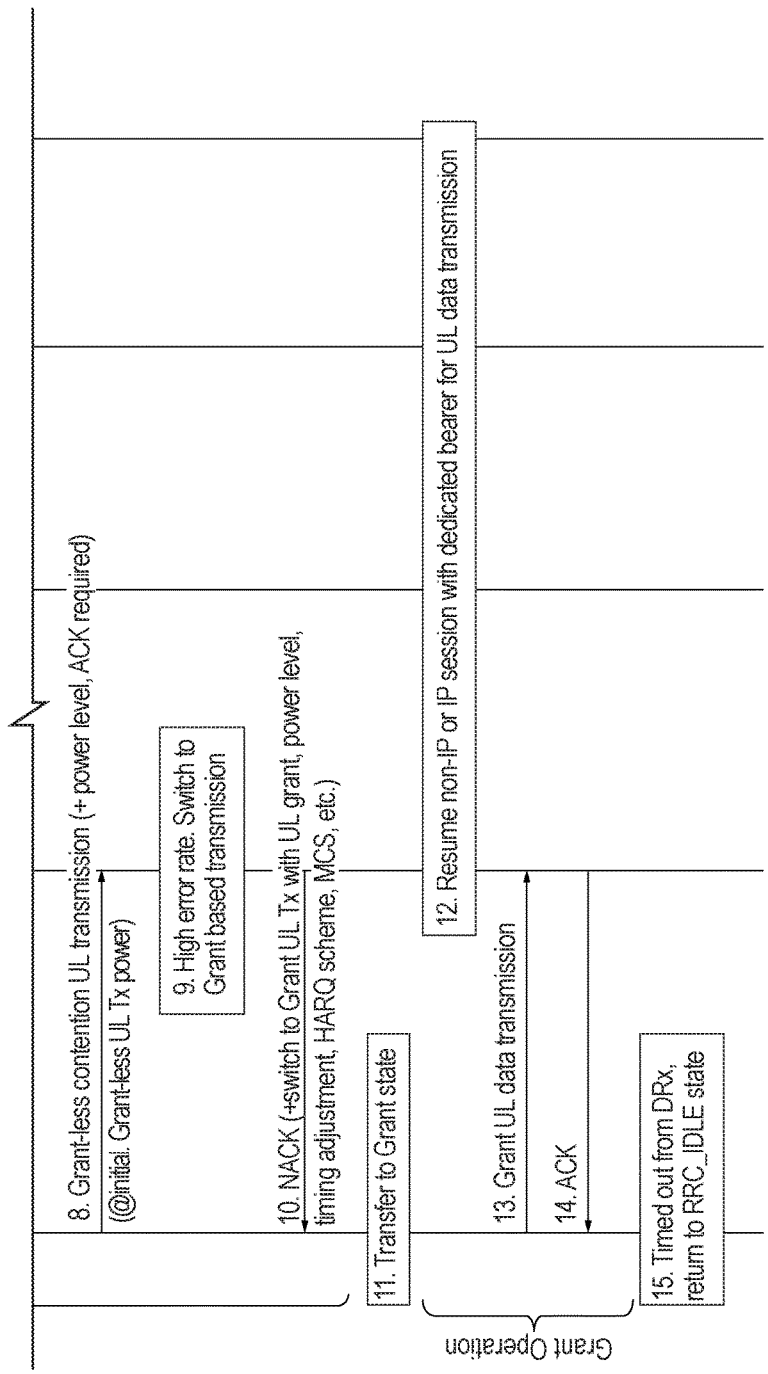
Figure 35A:
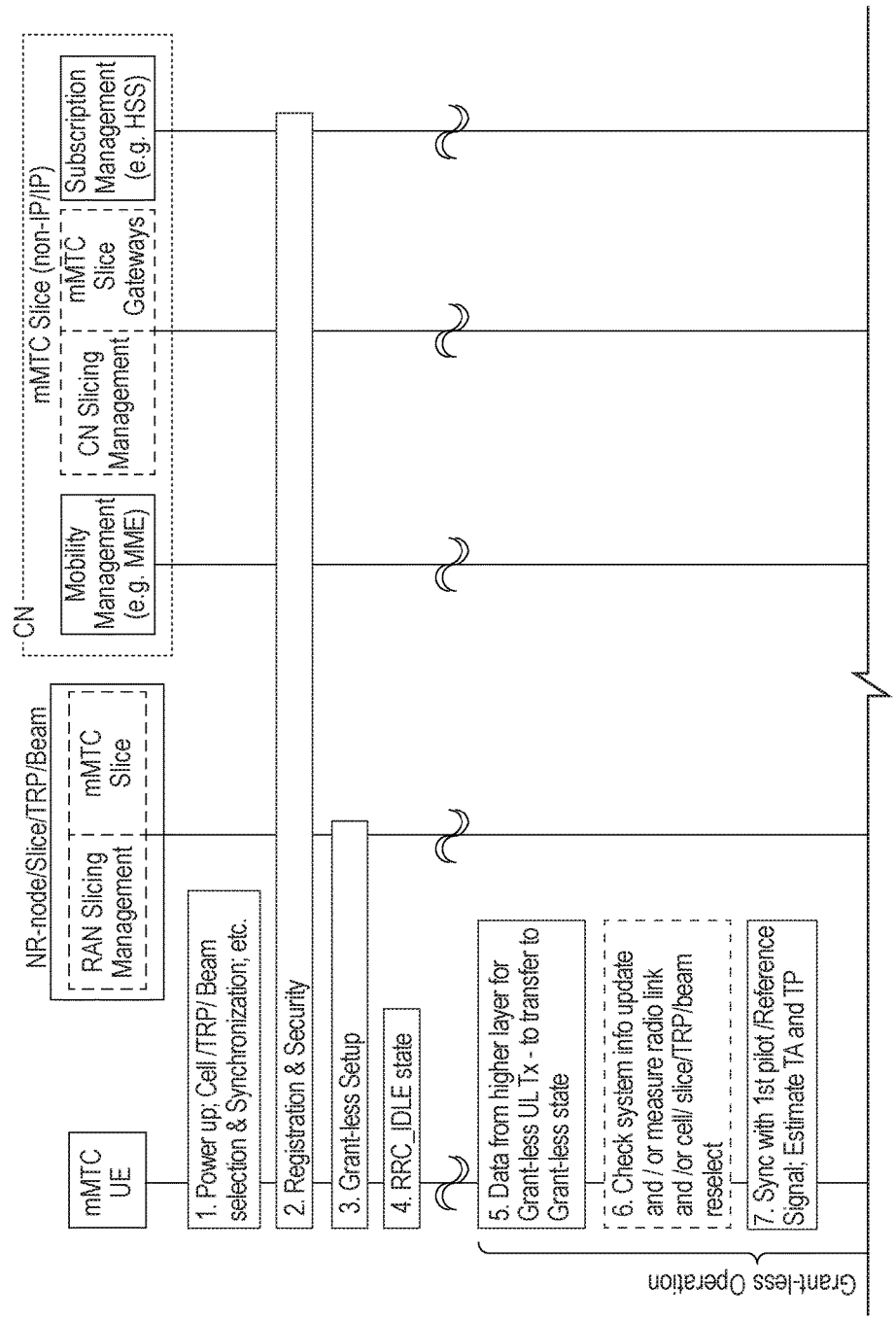
FIGS. 35A and 35B depict an example call flow for grant-less and grant UL transmissions for mMTC devices, in accordance with an example embodiment.
Figure 35B:
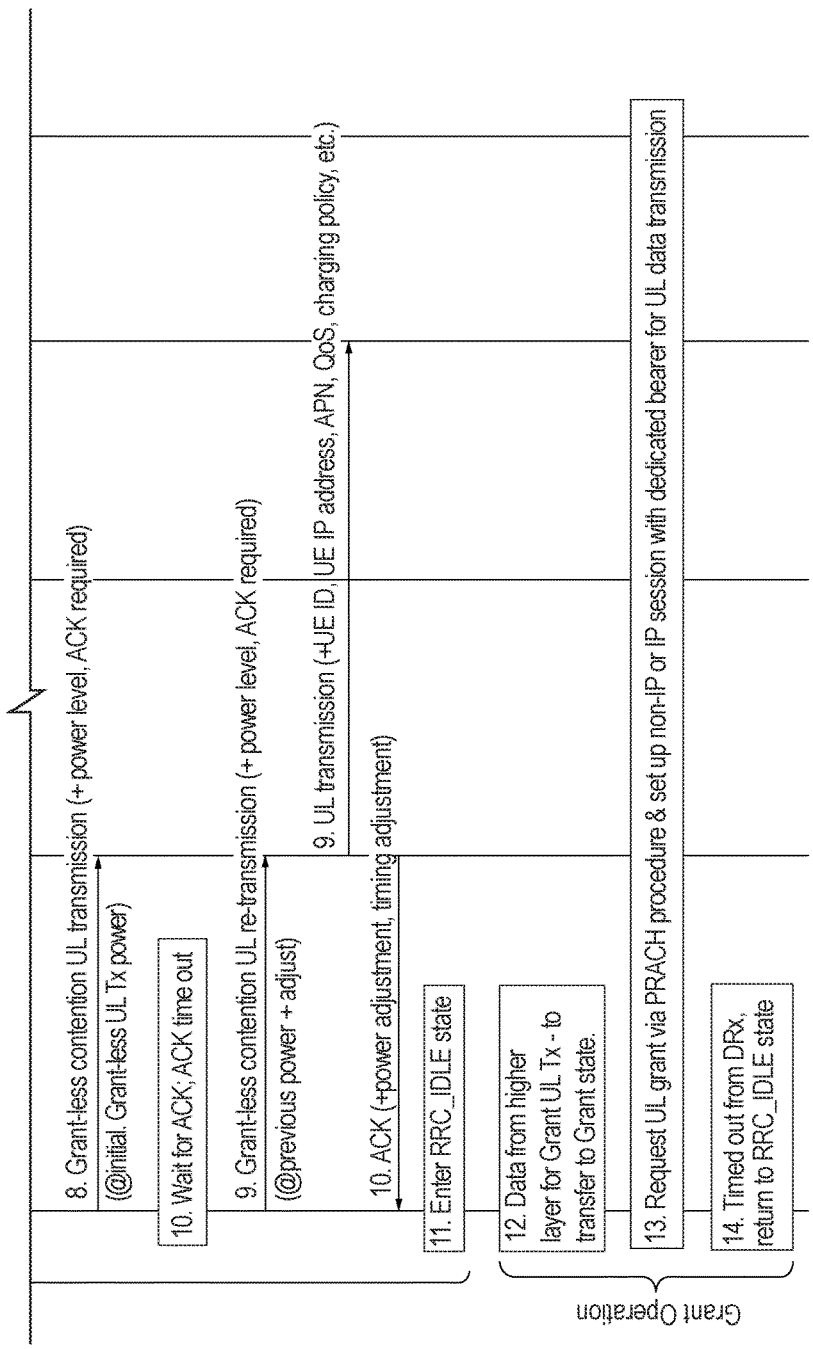

Turning now to example Grant-less and Grant UL Transmissions, as shown in FIGS. 33A and 33B, a UE may be preconfigured with a registration to a subscription management node in the core network. Alternatively, the UE may be registered via "attach" procedures, where the UE may be assigned with a radio network temp ID for grant-less access. The UE may set up grant-less related parameters, which may be referred to generally as its grant-less configuration, after the registration (if applicable). In some cases, a that is UE pre-configured for registration may also be pre-configured with grant-less parameters. FIGS. 34A and 34B depict an example of grant-less and grant operations for URLLC devices, wherein the UE (URLLC device) transitions between the grant-less and grant states in accordance with direction by the NR-node. In FIG. 35A, at 4, the UE radio network temp ID is indicated to the UE. At 9, 10, and 11, a switch to the grant state is indicated by the NR-node/TRP/Slice, for example, based on performance (e.g., error rate). FIGS. 35A and 35B depict an example of grant-less and grant operation for mMTC devices, wherein the UE (mMTC device) transitions between the grant-less and grant states as commanded by a higher layer (as compared to the physical layer).

Referring now to FIG. 36, an example graphical user interface (GUI) 3600 for configuring a UE's grantless operations is depicted. In particular, using the GUI 3600, a user may configure a UE to only transmit UL data using grant-less operations. Alternatively, using the GUI 3600, a user may enable a UE to switch between grant and grantless operations, such that the UE can operate in duel states. It will be understood that the GUI can be adapted to display or configure additional, or alternative, parameters as desired. Further, the GUI can display parameters in various visual depictions as desired.

Thus, as described above, an apparatus may configure plurality of devices to operate in a grant-less mode in accordance with a respective grant-less access allocation, such that, when the plurality of devices transmit messages uplink in the network, the messages are transmitted using frequency resources defined by the respective grant-less access allocation, and the plurality of devices transmit the messages without being granted access to transmit the messages, so as to operate in the grant-less mode. In an example, the plurality of devices include a first set of devices and a second set of devices that have different operating requirements as compared to the first set of devices. For example, the first set of devices may be Ultra-high Reliability and Low Latency Communications (URLLC) devices, and the second set of devices may be massive Machine Type Communication (mMTC) devices. The apparatus may configure the first set of devices, such that, when the first set of devices transmit messages uplink in the network, the messages are transmitted within a first sub-band of the frequency resources. The apparatus may configure the second set of devices, such that, when the second set of devices transmit messages uplink in the network, the messages are transmitted within a second subband of the frequency resources that is separate from the first subband. In an example, the first sub-band defines a first slice of the network for a first type of device or service, and the second sub-band defines a second slice of the network for a second type of device or service that is different than the first type of device or service. In another example, the apparatus may configure the second set of devices, such that, when the second set of devices transmit messages uplink in the network, the messages are transmitted within the first sub-band of the frequency resources, and the messages are transmitted so as to have a higher priority than the messages transmitted by the first set of devices. In another example, as described above, the first-subband may be shared by granted enhanced mobile broad band (mMBB) devices that are overriden by the URLLC devices whether there is a conflict between their respective message transmissions.

In yet another example, the apparatus may configure the first set of devices, such that, when the first set of devices transmit messages uplink in the network, the messages are transmitted within a first sub-band of the frequency resources, and within a second sub-band of the frequency resources, wherein the first set of devices share the first sub-band and the second sub-band with a third set of devices. The apparatus may further configure the second set of devices, such that, when the second set of devices transmit messages uplink in the network, the messages are transmitted within a guard band that is between the first sub-band and the second sub-band. As also described above, the apparatus may obtain context information associated with each of the plurality of devices, and based, at least in part, on the context information, the apparatus may determine the respective grant-less allocation for which each device of the plurality of devices is configured. The context information may include at least one of a device type associated with each device, a service associated with each device, a latency requirement of each device, mobility associated with each device, a traffic type associated with each device, or a planned schedule of data transmissions from each device.

As also described above, an apparatus may send a first access allocation signal to at least one device, wherein the first access allocation signal comprises a first access allocation scheme and an indication of a first dynamic access configuration time interval. The apparatus may receive, from the at least one device, a first grant-less uplink transmission during the first dynamic access configuration time interval. The first grant-less uplink transmission may be sent in accordance with the first access allocation scheme. Further, based on traffic associated with the at least one device, the apparatus may send a second access allocation signal to the at least one device, wherein the second access allocation signal comprises a second access allocation scheme and an indication of a second dynamic access configuration interval that is different than the first dynamic access configuration time interval. In response, the apparatus may receive a second grant-less uplink transmission during the second dynamic access configuration time interval. In an example, the second grant-less uplink transmission is sent in accordance with the second allocation scheme that is different than the first allocation scheme. In another example described above, the apparatus may receive a request from the at least one device for the first dynamic access configuration time interval, and the apparatus may send the first allocation access signal to the at least one device in response to the request. The first access allocation signal may be periodically transmitted to a plurality of devices within a coverage area of the apparatus. Alternatively, the first access allocation signal may be sent over a first channel dedicated to access allocation signals or a second channel that is shared with other control signals.

In yet another example described above, an apparatus obtains a first dedicated contention area and a contention time interval, and, without being granted specific resources for transmission, the apparatus transmits a message uplink in the network during the contention time interval and within the dedicated contention area. The apparatus may receive a negative acknowledgement. In response to the negative acknowledgement, the apparatus may re-transmit the message uplink in the network during the contention time interval and within a second dedicated contention area. In an alternative example, the apparatus waits for a predetermined time, and when the predetermined time elapses without receiving a positive acknowledgement, the apparatus re-transmits the message uplink in the network during the contention time interval and within a second dedicated contention area.

The various techniques described herein may be implemented in connection with hardware, firmware, software or, where appropriate, combinations thereof. Such hardware, firmware, and software may reside in apparatuses located at various nodes of a communication network. The apparatuses may operate singly or in combination with each other to affect the methods described herein. As used herein, the terms "apparatus," "network apparatus," "node," "entity," "function," "device," and "network node" may be used interchangeably, without limitation unless otherwise specified.

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), and LTE-Advanced standards. 3GPP has begun working on the standardization of next generation cellular technology, called New Radio (NR), which is also referred to as "5G". 3GPP NR standards development is expected to include the definition of next generation radio access technology (new RAT), which is expected to include the provision of new flexible radio access below 6 GHz, and the provision of new ultra-mobile broadband radio access above 6 GHz. The flexible radio access is expected to consist of a new, non-backwards compatible radio access in new spectrum below 6 GHz, and it is expected to include different operating modes that can be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 6 GHz, with cmWave and mmWave specific design optimizations.

It will be understood that for different RAN architectures, the grant-less UL control and management described above may be conducted at an NR-node, Transmission and Reception Point (TRP), Remote Radio Head (RRH), or the like, as well as the central controller in RAN or the control function in a RAN slice. Embodiments described herein proposed may also applicable to TRP, RRH, central controller, and control function in different RAN architectures.

3GPP has identified a variety of use cases that NR is expected to support, resulting in a wide variety of user experience requirements for data rate, latency, and mobility. The use cases include the following general categories: enhanced mobile broadband (e.g., broadband access in dense areas, indoor ultra-high broadband access, broadband access in a crowd, 50+ Mbps everywhere, ultra-low cost broadband access, mobile broadband in vehicles), critical communications, massive machine type communications, network operation (e.g., network slicing, routing, migration and interworking, energy savings), and enhanced vehicle-to-everything (eV2X) communications. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, and virtual reality to name a few. All of these use cases and others are contemplated herein.

Figure 37A:
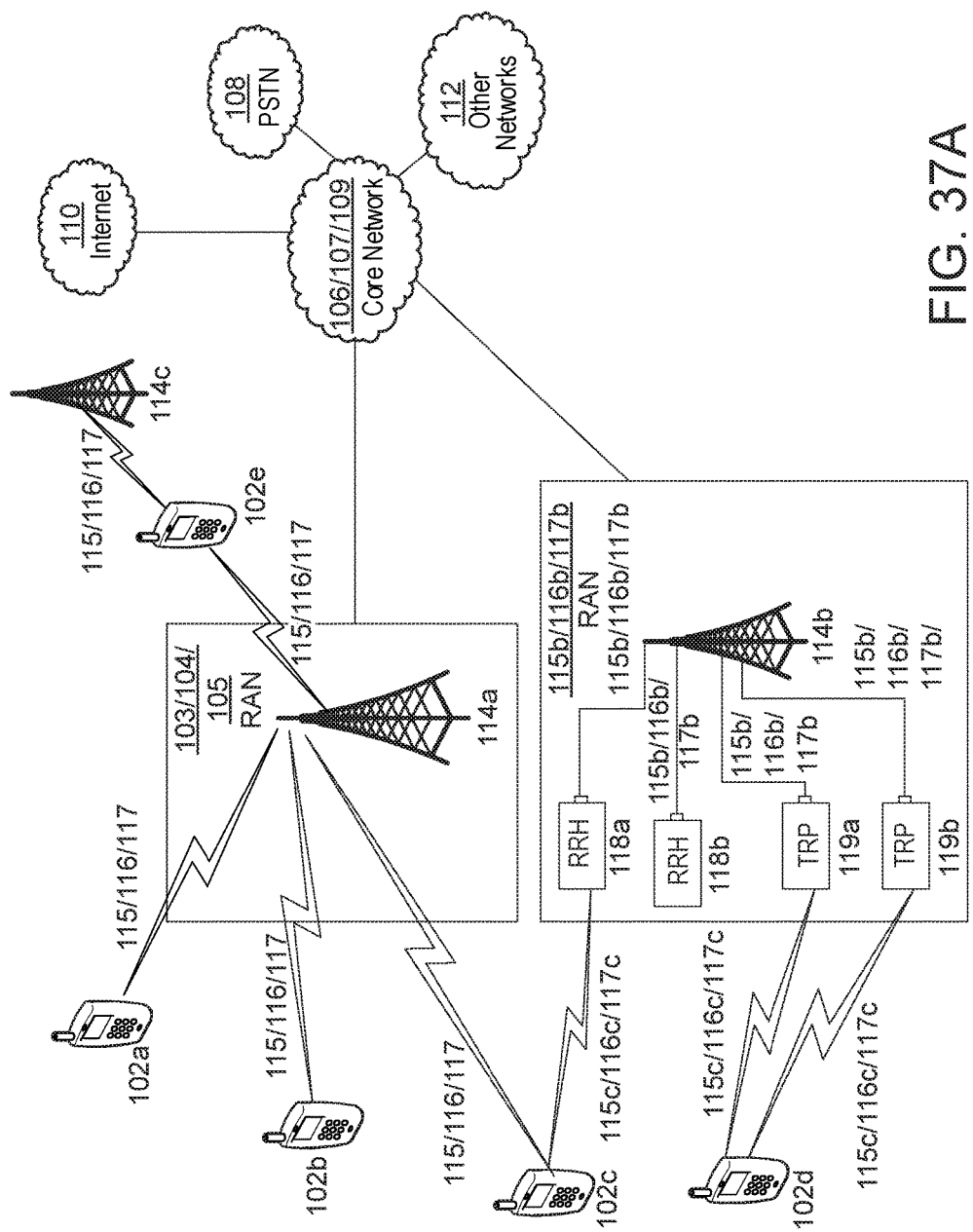
FIG. 37A illustrates one embodiment of an example communications system in which the methods and apparatuses described and claimed herein may be embodied.

FIG. 37A illustrates one embodiment of an example communications system 100 in which the methods and apparatuses described and claimed herein may be embodied. As shown, the example communications system 100 may include wireless transmit/receive units (WTRUs) 102a, 102b, 102c, and/or 102d (which generally or collectively may be referred to as WTRU 102), a radio access network (RAN) 103/104/105/103b/104b/105b, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d, 102e may be any type of apparatus or device configured to operate and/or communicate in a wireless environment. Although each WTRU 102a, 102b, 102c, 102d, 102e is depicted in FIGS. 37A-37E as a hand-held wireless communications apparatus, it is understood that with the wide variety of use cases contemplated for 5G wireless communications, each WTRU may comprise or be embodied in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, truck, train, or airplane, and the like.

The communications system 100 may also include a base station 114a and a base station 114b. Base stations 114a may be any type of device configured to wirelessly interface with at least one of the WTRUs 102a, 102b, 102c to facilitate access to one or more communication networks, such as the core network 106/107/109, the Internet 110, and/or the other networks 112. Base stations 114b may be any type of device configured to wiredly and/or wirelessly interface with at least one of the RRHs (Remote Radio Heads) 118a, 118b and/or TRPs (Transmission and Reception Points) 119a, 119b to facilitate access to one or more communication networks, such as the core network 106/107/109, the Internet 110, and/or the other networks 112. RRHs 118a, 118b may be any type of device configured to wirelessly interface with at least one of the WTRU 102c, to facilitate access to one or more communication networks, such as the core network 106/107/109, the Internet 110, and/or the other networks 112. TRPs 119a, 119b may be any type of device configured to wirelessly interface with at least one of the WTRU 102d, to facilitate access to one or more communication networks, such as the core network 106/107/109, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114b may be part of the RAN 103b/104b/105b, which may also include other base stations and/or network elements (not shown), such as a base station controller (BSC), a radio network controller (RNC), relay nodes, etc. The base station 114a may be configured to transmit and/or receive wireless signals within a particular geographic region, which may be referred to as a cell (not shown). The base station 114b may be configured to transmit and/or receive wired and/or wireless signals within a particular geographic region, which may be referred to as a cell (not shown). The cell may further be divided into cell sectors. For example, the cell associated with the base station 114a may be divided into three sectors. Thus, in an embodiment, the base station 114a may include three transceivers, e.g., one for each sector of the cell. In an embodiment, the base station 114a may employ multiple-input multiple output (MIMO) technology and, therefore, may utilize multiple transceivers for each sector of the cell.

The base stations 114a may communicate with one or more of the WTRUs 102a, 102b, 102c over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114b may communicate with one or more of the RRHs 118a, 118b and/or TRPs 119a, 119b over a wired or air interface 115b/116b/117b, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115b/116b/117b may be established using any suitable radio access technology (RAT).

The RRHs 118a, 118b and/or TRPs 119a, 119b may communicate with one or more of the WTRUs 102c, 102d over an air interface 115c/116c/117c, which may be any suitable wireless communication link (e.g., radio frequency (RF), microwave, infrared (IR), ultraviolet (UV), visible light, cmWave, mmWave, etc.). The air interface 115c/116c/117c may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b and TRPs 119a, 119b in the RAN 103b/104b/105b and the WTRUs 102c, 102d, may implement a radio technology such as Universal Mobile Telecommunications System (UMTS) Terrestrial Radio Access (UTRA), which may establish the air interface 115/116/117 or 115c/116c/117c respectively using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a in the RAN 103/104/105 and the WTRUs 102a, 102b, 102c, or RRHs 118a, 118b and TRPs 119a, 119b in the RAN 103b/104b/105b and the WTRUs 102c, 102d, may implement a radio technology such as Evolved UMTS Terrestrial Radio Access (E-UTRA), which may establish the air interface 115/116/117 using Long Term Evolution (LTE) and/or LTE-Advanced (LTE-A). In the future, the air interface 115/116/117 may implement 3GPP NR technology.

In an embodiment, the base station 114a and the WTRUs 102a, 102b, 102c may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 37A may be a wireless router, Home Node B, Home eNode B, or access point, for example, and may utilize any suitable RAT for facilitating wireless connectivity in a localized area, such as a place of business, a home, a vehicle, a campus, and the like. In an embodiment, the base station 114c and the WTRUs 102e may implement a radio technology such as IEEE 802.11 to establish a wireless local area network (WLAN). In an embodiment, the base station 114c and the WTRUs 102e may implement a radio technology such as IEEE 802.15 to establish a wireless personal area network (WPAN). In yet an embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 37A, the base station 114b may have a direct connection to the Internet 110. Thus, the base station 114c may not be required to access the Internet 110 via the core network 106/107/109.

The RAN 103/104/105 and/or RAN 103b/104b/105b may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication.

Although not shown in FIG. 37A, it will be appreciated that the RAN 103/104/105 and/or RAN 103b/104b/105b and/or the core network 106/107/109 may be in direct or indirect communication with other RANs that employ the same RAT as the RAN 103/104/105 and/or RAN 103b/104b/105b or a different RAT. For example, in addition to being connected to the RAN 103/104/105 and/or RAN 103b/104b/105b, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d, 102e to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 and/or RAN 103b/104b/105b or a different RAT.

Some or all of the WTRUs 102a, 102b, 102c, 102d in the communications system 100 may include multi-mode capabilities, e.g., the WTRUs 102a, 102b, 102c, 102d, and 102e may include multiple transceivers for communicating with different wireless networks over different wireless links. For example, the WTRU 102e shown in FIG. 37A may be configured to communicate with the base station 114a, which may employ a cellular-based radio technology, and with the base station 114c, which may employ an IEEE 802 radio technology.

Figure 37B:
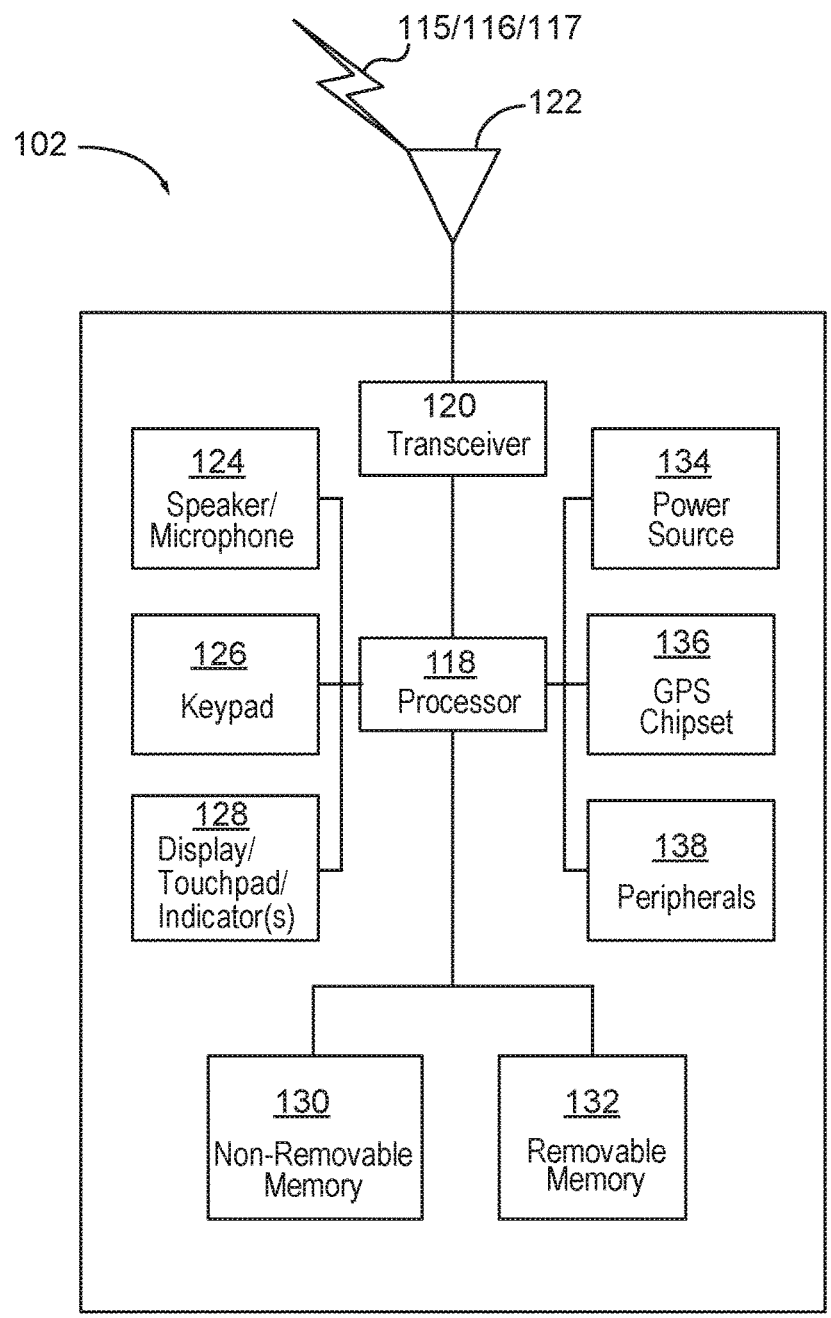
FIG. 37B is a block diagram of an example apparatus or device configured for wireless communications in accordance with the embodiments illustrated herein.

FIG. 37B is a block diagram of an example apparatus or device configured for wireless communications in accordance with the embodiments illustrated herein, such as for example, a WTRU 102. As shown in FIG. 37B, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 37B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 37B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in an embodiment, the transmit/receive element 122 may be an antenna configured to transmit and/or receive RF signals. In an embodiment, the transmit/receive Although not shown in FIG. 37A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, e.g., the WTRUs 102a, 102b, 102c, and 102d may include multiple transceivers for communicating with different wireless networks over different wireless links. For example, the WTRU 102c shown in FIG. 37A may be configured to communicate with the base station 114a, which may employ a cellular-based radio technology, and with the base station 114b, which may employ an IEEE 802 radio technology.

FIG. 37B is a block diagram of an example apparatus or device configured for wireless communications in accordance with the embodiments illustrated herein, such as for example, a WTRU 102. As shown in FIG. 37B, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 37B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 37B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 37B as a single element, the WTRU 102 may include any number of transmit/receive elements 122. More specifically, the WTRU 102 may employ MIMO technology. Thus, in an embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit). The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In an embodiment, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The WTRU 102 may connect to other components, modules, or systems of such apparatuses or devices via one or more interconnect interfaces, such as an interconnect interface that may comprise one of the peripherals 138.

Figure 37C:
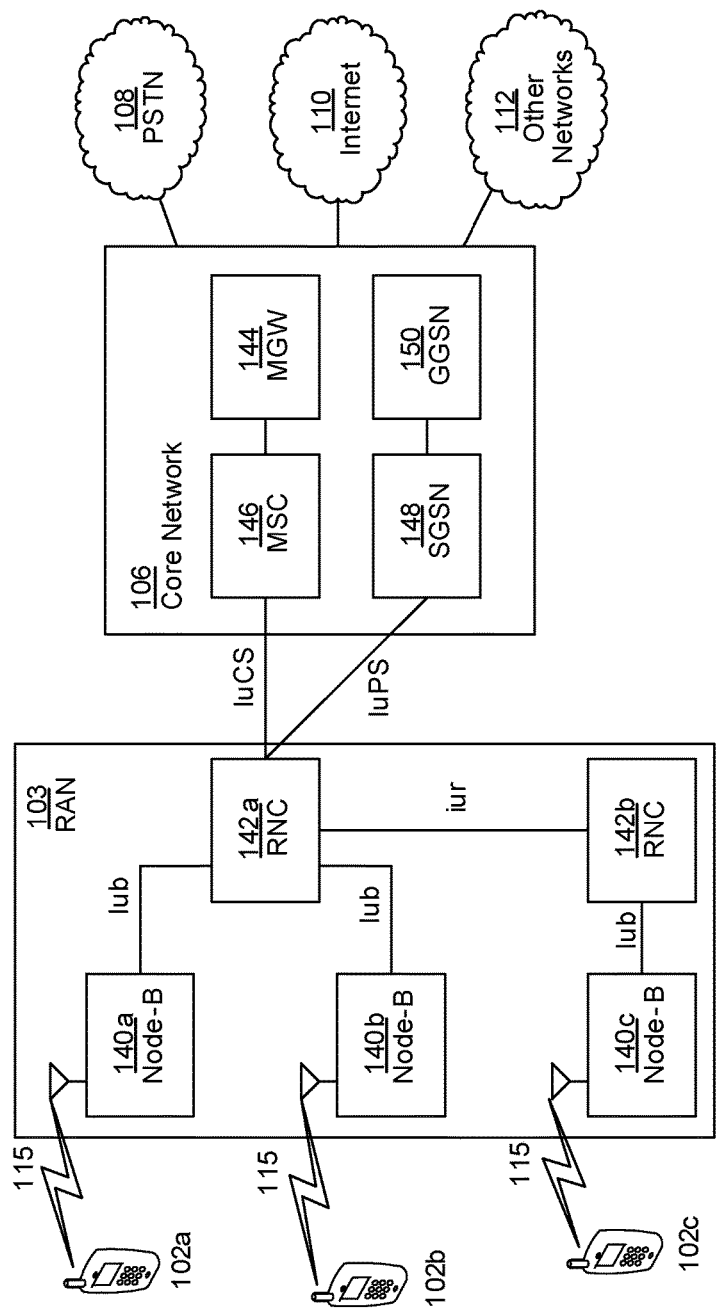
FIG. 37C is a system diagram of an example radio access network (RAN) and core network in accordance with an example embodiment.

FIG. 37C is a system diagram of the RAN 103 and the core network 106 according to an embodiment. As noted above, the RAN 103 may employ a UTRA radio technology to communicate with the WTRUs 102a, 102b, and 102c over the air interface 115. The RAN 103 may also be in communication with the core network 106. As shown in FIG. 37C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 37C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macro-diversity, security functions, data encryption, and the like.

The core network 106 shown in FIG. 37C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 37D:
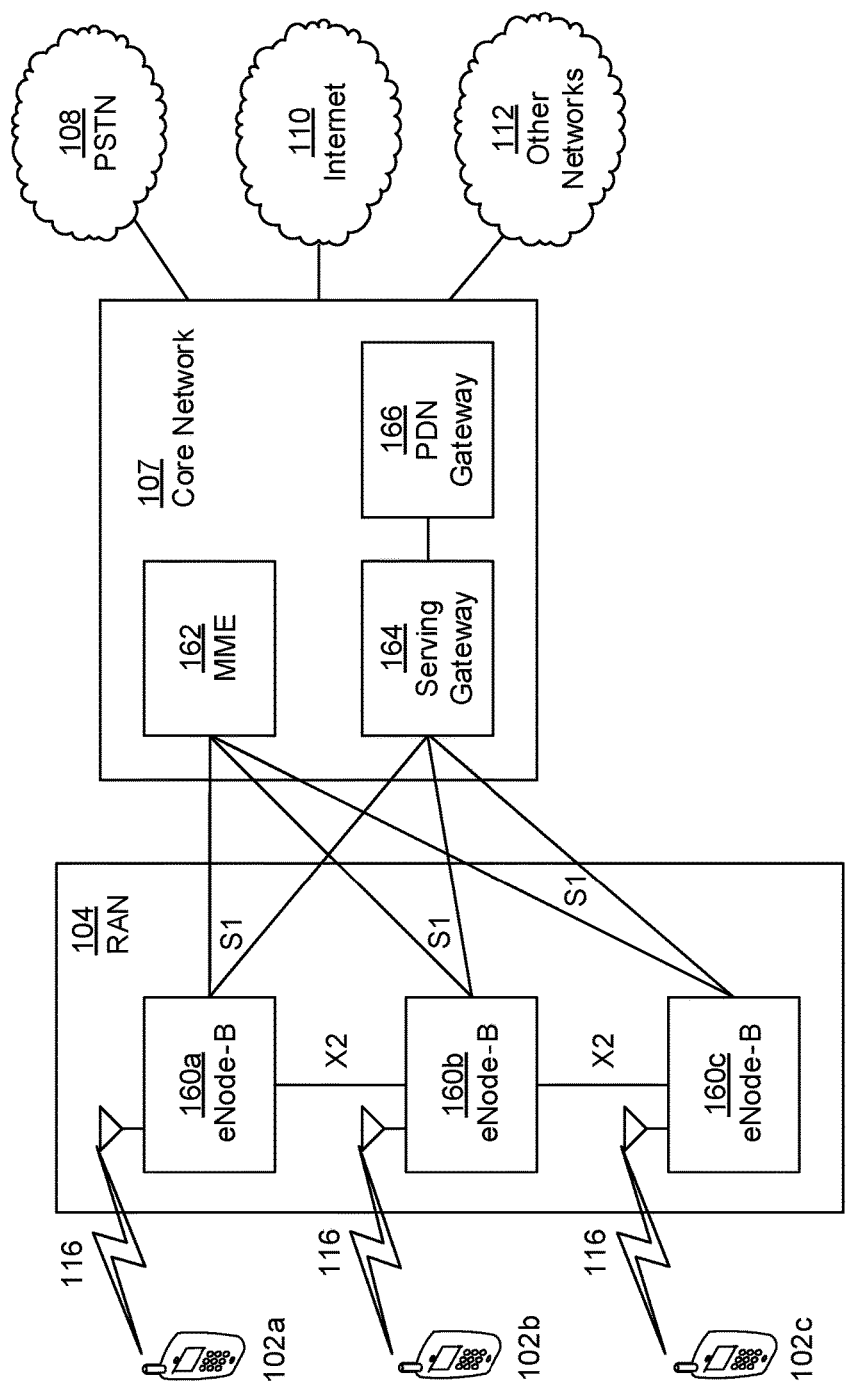
FIG. 37D is another system diagram of a RAN and core network according to another embodiment.

FIG. 37D is a system diagram of the RAN 104 and the core network 107 according to an embodiment. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In an embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 37D, the eNode-Bs 160a, 160b, 160c may communicate with one another over an X2 interface.

The core network 107 shown in FIG. 37D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 37E:
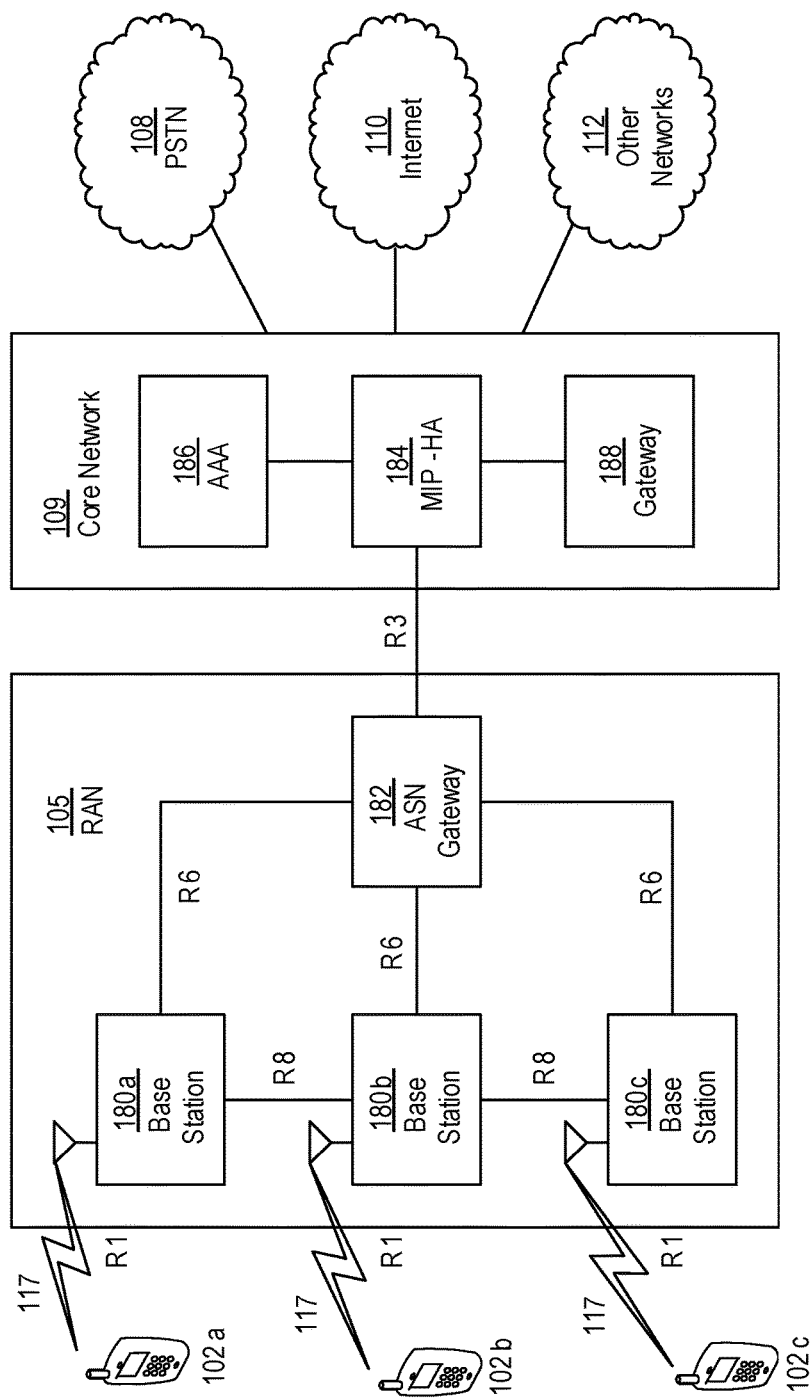
FIG. 37E is another system diagram of a RAN and core network according to another embodiment.

FIG. 37E is a system diagram of the RAN 105 and the core network 109 according to an embodiment. The RAN 105 may be an access service network (ASN) that employs IEEE 802.16 radio technology to communicate with the WTRUs 102a, 102b, and 102c over the air interface 117. As will be further discussed below, the communication links between the different functional entities of the WTRUs 102a, 102b, 102c, the RAN 105, and the core network 109 may be defined as reference points.

As shown in FIG. 37E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell in the RAN 105 and may include one or more transceivers for communicating with the WTRUs 102a, 102b, 102c over the air interface 117. In an embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, and 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, and 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 37E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, and 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 37E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

The core network entities described herein and illustrated in FIGS. 37A, 37C, 37D, and 37E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 37A, 37B, 37C, 37D, and 37E are provided by way of example only, and it is understood that the subject matter disclosed and claimed herein may be embodied or implemented in any similar communication system, whether presently defined or defined in the future.

Figure 37F:
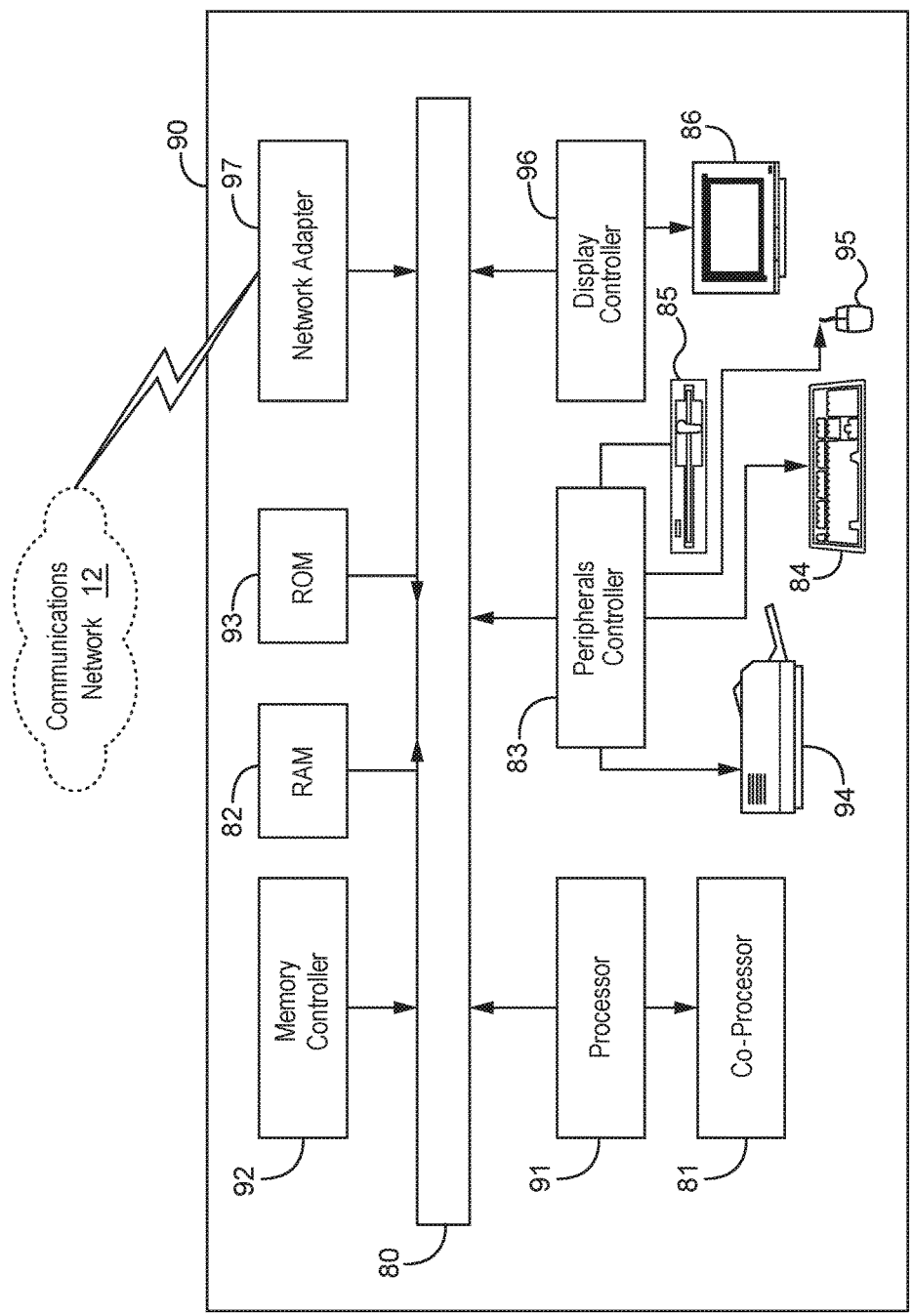
FIG. 37F is a block diagram of an exemplary computing system 90 in which one or more apparatuses of the communications networks illustrated in FIGS. 37C-F may be embodied.

FIG. 37F is a block diagram of an exemplary computing system 90 in which one or more apparatuses of the communications networks illustrated in FIGS. 37A, 37C, 37D and 37E may be embodied, such as certain nodes or functional entities in the RAN 103/104/105, Core Network 106/107/109, PSTN 108, Internet 110, or Other Networks 112. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adapter 97, that may be used to connect computing system 90 to an external communications network, such as the RAN 103/104/105, Core Network 106/107/109, PSTN 108, Internet 110, or Other Networks 112 of FIGS. 37A, 37B, 37C, 37D, and 37E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations or functions described herein may be implemented in the form of such computer executable instructions, executing on the processor of an apparatus or computing system configured for wireless and/or wired network communications. Computer readable storage media include volatile and nonvolatile, removable and non-removable media implemented in any non-transitory (e.g., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which can be used to store the desired information and which can be accessed by a computing system.

The following is a list of acronyms relating to access technologies that may appear in the above description. Unless otherwise specified, the acronyms used herein refer to the corresponding term listed below.

ACK Acknowledgement
AID Association Identifier (802.11)
AP Access Point (802.11)
APN Access Point Name
AS Access Stratum
BS Base Station
CA Collision Avoidance
CD Collision Detection
CFI Control Format Indicator
CN Core Network
CMAS Commercial Mobile Alert System
C-RNTI Cell Radio-Network Temporary Identifier
CSMA Carrier Sensing Multiple Access
CSMA/CD CSMA with Collision Detection
CSMA/CA CSMA with Collision Avoidance
DCA Dedicated Collision Area
DCI Downlink Control Information
DACTI Dynamic Access Configuration Time Interval
DL Downlink
DRX Discontinuous Reception
ECGI E-UTRAN Cell Global Identifier
ECM EPS Connection Management
eMBB enhanced Mobile Broadband
EMM EPS Mobility Management
eNB Evolved Node B
ETWS Earthquake and Tsunami Warning System
E-UTRA Evolved Universal Terrestrial Radio Access
E-UTRAN Evolved Universal Terrestrial Radio Access Network
FDM Frequency Division Multiplex
FFS For Further Study
GERAN GSM EDGE Radio Access Network
GSM Global System for Mobile communications
GUTI Globally Unique Temporary UE Identity
HE High Efficiency
HSS Home Subscriber Server
IE Information Element
IMSI International Mobile Subscriber Identity
IMT International Mobile Telecommunications
KPI Key Performance Indicators
LTE Long Term Evolution
MAC Medium Access Control
MBMS Multimedia Broadcast Multicast Service
MCL Maximum Coupling Loss
MIB Master Information Block
MME Mobile Management Entity
MTC Machine-Type Communications
mMTC Massive Machine Type Communication
NACK Negative Acknowledgement
NAS Non-access Stratum
NR New Radio
OBO OFDM Back-off (802.11)
OFDM Orthogonal Frequency Division Multiplex
PDCCH Physical Downlink Control Channel
PDSCH Physical Downlink Shared Channel
PHY Physical Layer
PCFICH Physical Control Format Indicator Channel
PDCP Packet Data Convergence Protocol
PHICH Physical Hybrid ARQ Indicator Channel
PPDU PLCP Protocol Data Unit (802.11)
PRACH Physical Random Access Channel
PRB Physical Resource Block
PUCCH Physical Uplink Control Channel
PUSCH Physical Uplink Shared Channel
QoS Quality of Service
RA Random Access
RACH Random Access Channel
RAN Radio Access Network (3GPP)
RMSU Reachability and Mobility Status Update
RB Resource Block
RLC Radio Link Control
RNTI Radio Network Temporary Identifier
RRC Radio Resource Control
RU Resource Unit (802.11)
SI System Information
SIB System Information Block
SR Scheduling Request
STA Station (802.11)
TAI Tracking Area Indicator
TAU Tracking Area Update
TBD To Be Defined
TDM Time Division Multiplex
TEID Tunnel Endpoint ID TRP Transmission and Reception Point
TTI Transmission Time Interval
UCI Uplink Control Information
UE User Equipment
UL Uplink
UR/LL Ultra Reliable-Low Latency
URLLC Ultra-Reliable and Low Latency Communications This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed:

1. An apparatus comprising a processor, a memory, and communication circuitry, the apparatus being connected to an access network via its communication circuitry, the apparatus further comprising computer-executable instructions stored in the memory of the apparatus which, when executed by the processor of the apparatus, cause the apparatus to perform operations comprising:
receiving a grant-less configuration that includes a first grant-less access allocation and/or a second grant-less access allocation, the first and second grant-less access allocations defining first and second time and frequency resources, respectively;
transmitting a message uplink in the access network using the first time and frequency resources defined by the first grant-less access allocation, so as to make a grant-less transmission in accordance with the grant-less configuration;
when a transmission redundancy value is greater than one, transmitting the message again uplink to the access network using the first and/or second time and frequency resources defined by the first and/or second grant-less access allocation, respectively.

2. The apparatus as recited in claim 1, wherein the first and second grant-less configurations are received via a static configuration carried on dedicated Radio Resource Control message sent to the apparatus.

3. The apparatus as recited in claim 1, the first and second grant-less access allocations are received via a dynamic indication carried on a downlink control channel from the access network.

4. The apparatus as recited in claim 3, wherein an activation indication and a deactivation indication are also received on the downlink control channel from the access network.

5. The apparatus as recited in claim 3, wherein the downlink control channel is a dedicated control channel.

6. The apparatus as recited in claim 3, wherein the downlink control channel is scrambled with a grant-less identifier.

7. The apparatus as recited in claim 6, wherein the grant-less identifier is from the access network.

8. The apparatus as recited in claim 1, wherein the first and second grant-less allocations comprise a respective time interval during which a specific access allocation scheme is applied.

9. The apparatus as recited in claim 8, wherein the time intervals each comprise one or more respective contention spaces available for selection for a grant-less transmission.

10. The apparatus as recited in claim 1, wherein the grant-less configuration further comprises the transmission redundancy value and a redundancy version associated with the transmission redundancy value.

11. The apparatus as recited in claim 1, wherein the grant-less configuration further comprises a modulation and coding scheme, and/or a frequency hopping scheme.

12. The apparatus as recited in claim 1, the apparatus further comprising computer-executable instructions stored in the memory of the apparatus which, when executed by the processor of the apparatus, cause the apparatus to perform further operations comprising:
transmitting an uplink grant-less transmission that includes a front-load reference signal that is allocated at a first symbol of the uplink grant-less transmission.

13. The apparatus as recited in claim 12, wherein the front-load reference signal further comprises a grant-less identifier.

14. An apparatus comprising a processor, memory, and communication circuitry, the apparatus being connected to a user equipment via its communication circuitry, the apparatus further comprising computer-executable instructions stored in the memory of the apparatus which, when executed by the processor of the apparatus, cause the apparatus to perform operations comprising:
sending a grant-less configuration that includes a first grant-less access allocation and/or a second grant-less allocation, the first and second grant-less access allocation defining first and second time and frequency resources, respectively;
receiving a message uplink from a user equipment at the first time and frequency resources defined by the first grant-less access allocation; and
when a transmission redundancy value is greater than one, receiving the message again at the first and/or second time and frequency resources.

15. The apparatus as recited in claim 14, wherein the grant-less configuration is sent on a dedicated Radio Resource Control channel to the user equipment.

16. The apparatus as recited in claim 14, wherein first and second grant-less access allocations are sent on one or more downlink control channels to the user equipment.

17. The apparatus as recited in claim 16, wherein the first and second grant-less access allocations are activated and/or deactivated on the one or more downlink control channels.

18. The apparatus as recited in claim 17, the apparatus further comprising computer-executable instructions stored in the memory of the apparatus which, when executed by the processor of the apparatus, cause the apparatus to perform further operations comprising:
sending a grant-less identifier, such that the downlink control channel is scrambled with the grant-less identifier.

19. A method performed by a user equipment (UE) for grant-less transmission to an access network, the method comprising:
receiving a grant-less configuration that includes a first grant-less access allocation and/or a second grant-less allocation, the first and second grant-less access allocations defining first and second time and frequency resources, respectively;
transmitting a message uplink to the access network using the first time and frequency resources defined by the first grant-less access allocation, so as to make a grant-less transmission in accordance with the grant-less configuration; and when a transmission redundancy value is greater than one, transmitting the message again uplink to the access network using the first and/or second time and frequency resources defined by the first and/or second grant-less access allocations, respectively.

* * * * *